(12) United States Patent
Gomez-Rosado et al.

(10) Patent No.: US 9,582,145 B2
(45) Date of Patent: Feb. 28, 2017

(54) LEARNING USER INTERFACE

(71) Applicant: Groupon, Inc., Chicago, IL (US)

(72) Inventors: David Gomez-Rosado, Petaluma, CA (US); Tihomir Tsankov Georgiev, Menlo Park, CA (US)

(73) Assignee: Groupon, Inc., Chicago, IL (US)

( * ) Notice: Subject to any disclaimer, the term of this patent is extended or adjusted under 35 U.S.C. 154(b) by 289 days.

(21) Appl. No.: 14/230,980

(22) Filed: Mar. 31, 2014

(65) Prior Publication Data

US 2015/0213357 A1 Jul. 30, 2015

Related U.S. Application Data

(60) Provisional application No. 61/932,046, filed on Jan. 27, 2014.

(51) Int. Cl.
| | |
|---|---|
| *G06N 5/02* | (2006.01) |
| *G06F 3/0481* | (2013.01) |
| *G06F 3/0484* | (2013.01) |
| *G06F 3/0482* | (2013.01) |
| *G06Q 30/06* | (2012.01) |
| *G06N 99/00* | (2010.01) |

(52) U.S. Cl.
CPC ........ *G06F 3/04817* (2013.01); *G06F 3/0482* (2013.01); *G06F 3/04842* (2013.01); *G06F 3/04845* (2013.01); *G06N 5/02* (2013.01); *G06N 99/005* (2013.01); *G06Q 30/0631* (2013.01); *G06Q 30/0641* (2013.01); *G06Q 30/0643* (2013.01)

(58) Field of Classification Search
None
See application file for complete search history.

(56) References Cited

U.S. PATENT DOCUMENTS

| 5,025,373 A | 6/1991 | Keyser, Jr. et al. |
| 8,112,299 B2 | 2/2012 | Kim et al. |
| (Continued) | | |

FOREIGN PATENT DOCUMENTS

| KR | WO 0211475 A1 * | 2/2002 | ........... G06F 3/0482 |
| WO | WO 02/11475 A1 | 2/2002 | |

OTHER PUBLICATIONS

Office Action for U.S. Appl. No. 14/453,913 dated Jan. 6, 2016.
(Continued)

*Primary Examiner* — Kakali Chaki
*Assistant Examiner* — Eric Nilsson
(74) *Attorney, Agent, or Firm* — Alston & Bird LLP

(57) ABSTRACT

Provided herein are method, apparatus, and computer program products for facilitating a learning user interface. The interface may be presented as a plurality of dynamic icons representing a plurality of items. The interface may be facilitated by receiving, by a processor, a selection indication associated with one item of the plurality of dynamic icons. The interface may be facilitated by determining, via the processor, at least one suggested item of the plurality of items based on the selection indication. The interface may also be facilitated by determining a visual bias for at least one suggested dynamic icon representing the at least one suggested item relative to at least one secondary dynamic icon and may be facilitated by applying the visual bias, via the interface, to the at least one suggested dynamic icon.

37 Claims, 43 Drawing Sheets

(56) References Cited

U.S. PATENT DOCUMENTS

| | | |
|---|---|---|
| 8,355,948 B2 | 1/2013 | Mason |
| 8,566,029 B1 | 10/2013 | Lopatenko et al. |
| 9,086,731 B2 | 7/2015 | Hisano et al. |
| 2004/0158499 A1 | 8/2004 | Dev et al. |
| 2006/0129386 A1 | 6/2006 | Lu et al. |
| 2007/0239650 A1 | 10/2007 | Zangwill |
| 2008/0250323 A1 | 10/2008 | Huff |
| 2008/0319835 A1 | 12/2008 | Tsuji |
| 2010/0076968 A1 | 3/2010 | Boyns et al. |
| 2012/0060092 A1 | 3/2012 | Hill et al. |
| 2012/0096383 A1 | 4/2012 | Sakamoto et al. |
| 2013/0132896 A1* | 5/2013 | Lee ............... G06F 17/30997 715/808 |
| 2013/0152001 A1* | 6/2013 | Lovitt ............... G06F 9/4443 715/765 |
| 2013/0253981 A1 | 9/2013 | Lipka et al. |
| 2014/0052580 A1 | 2/2014 | Ali et al. |
| 2014/0059599 A1* | 2/2014 | Sirpal ............... H04N 5/44 725/37 |
| 2014/0149932 A1* | 5/2014 | Wilder ............... G06F 3/04886 715/810 |
| 2015/0026010 A1 | 1/2015 | Ellison |
| 2015/0074728 A1 | 3/2015 | Chai et al. |
| 2015/0199082 A1 | 7/2015 | Scholler et al. |

OTHER PUBLICATIONS

International Search Report and Written Opinion from International Application No. PCT/US2015/13084, mailed Apr. 17, 2015.
Office Action for U.S. Appl. No. 14/453,913 dated Nov. 6, 2014.
Office Action for U.S. Appl. No. 14/453,913 dated Feb. 24, 2015.
U.S. Appl. No. 13/411,502, filed Mar. 2, 2012; In re: O'Brien et al., entitled *Relevance System for Consumer Deals*.
U.S. Appl. No. 13/829,581, filed Mar. 14, 2012: In re: Aggarwal et al., entitlted *Promotion Offering System*.
Office Action for U.S. Appl. No. 14/230,970 dated Apr. 5, 2016, 24 pages.
Final Office Action for U.S. Appl. No. 14/453,913 dated Jun. 13, 2016, 14 pages.
Office Action for U.S. Appl. No. 14/230,996 dated Jul. 1, 2016.
Office Action for U.S. Appl. No. 14/231,015 dated Aug. 2, 2016.
Office Action for U.S. Appl. No. 14/230,970 dated Aug. 22, 2016.
Office Action for U.S. Appl. No. 14/231,015 dated Dec. 13, 2016, 26 pages.

* cited by examiner

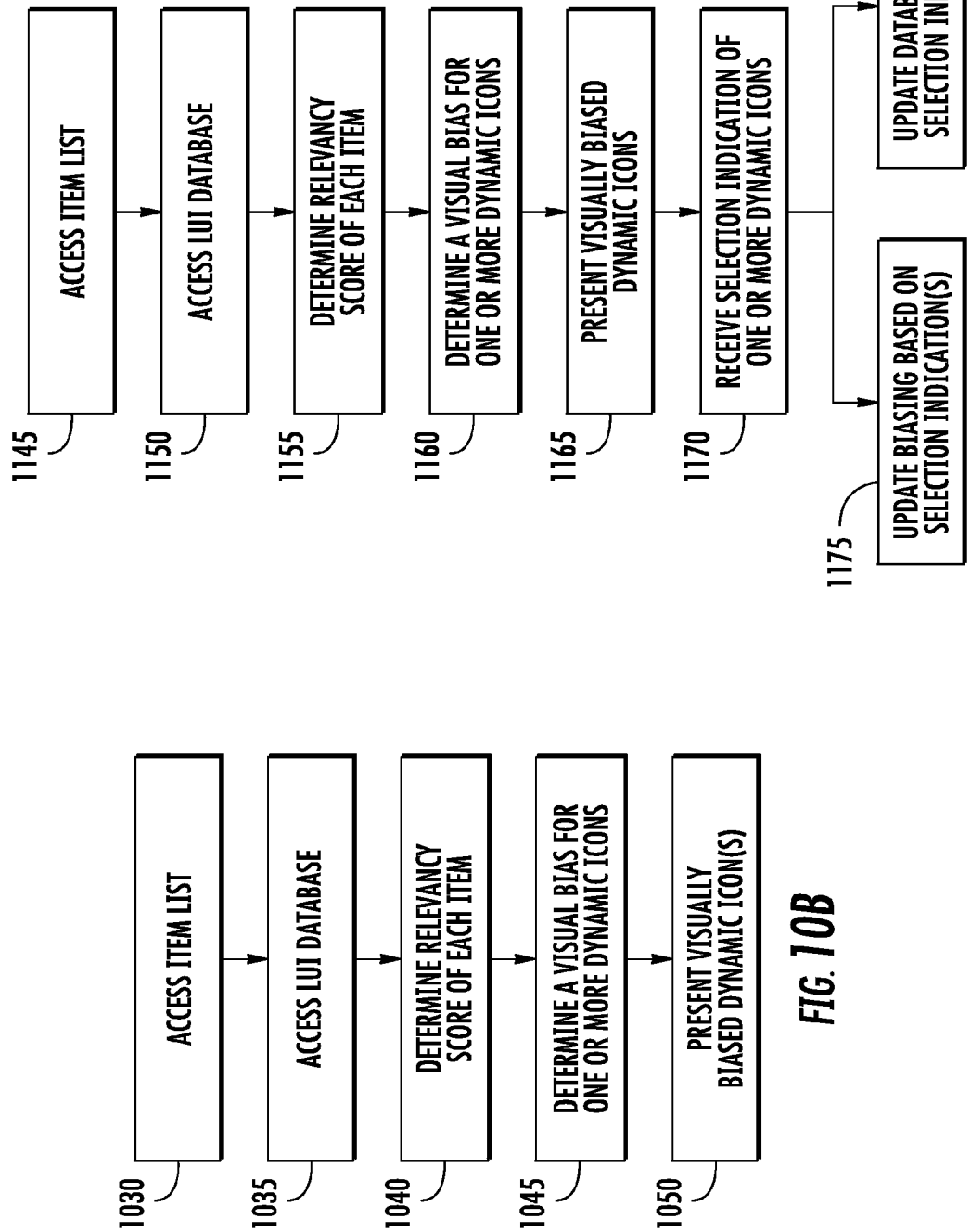

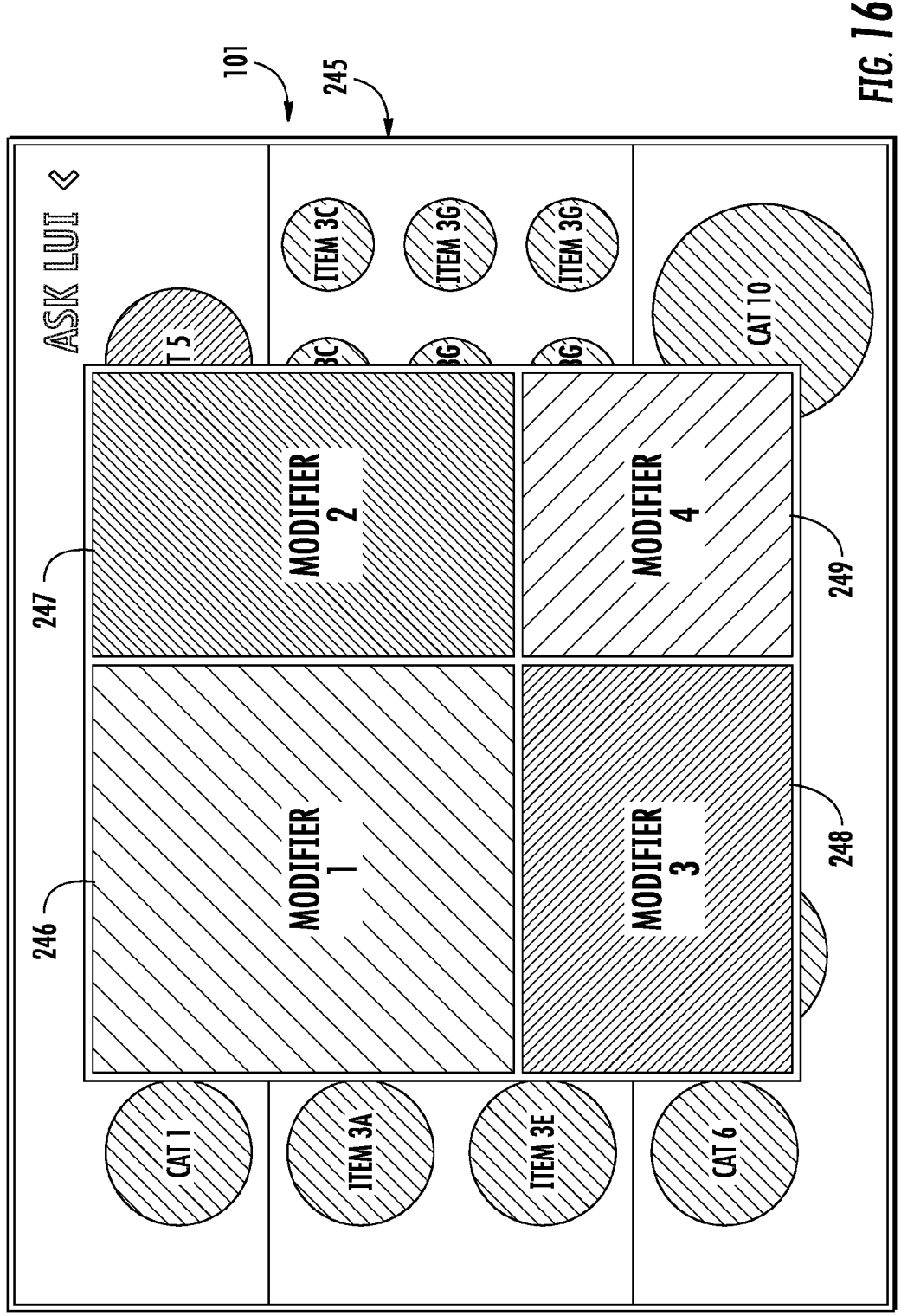

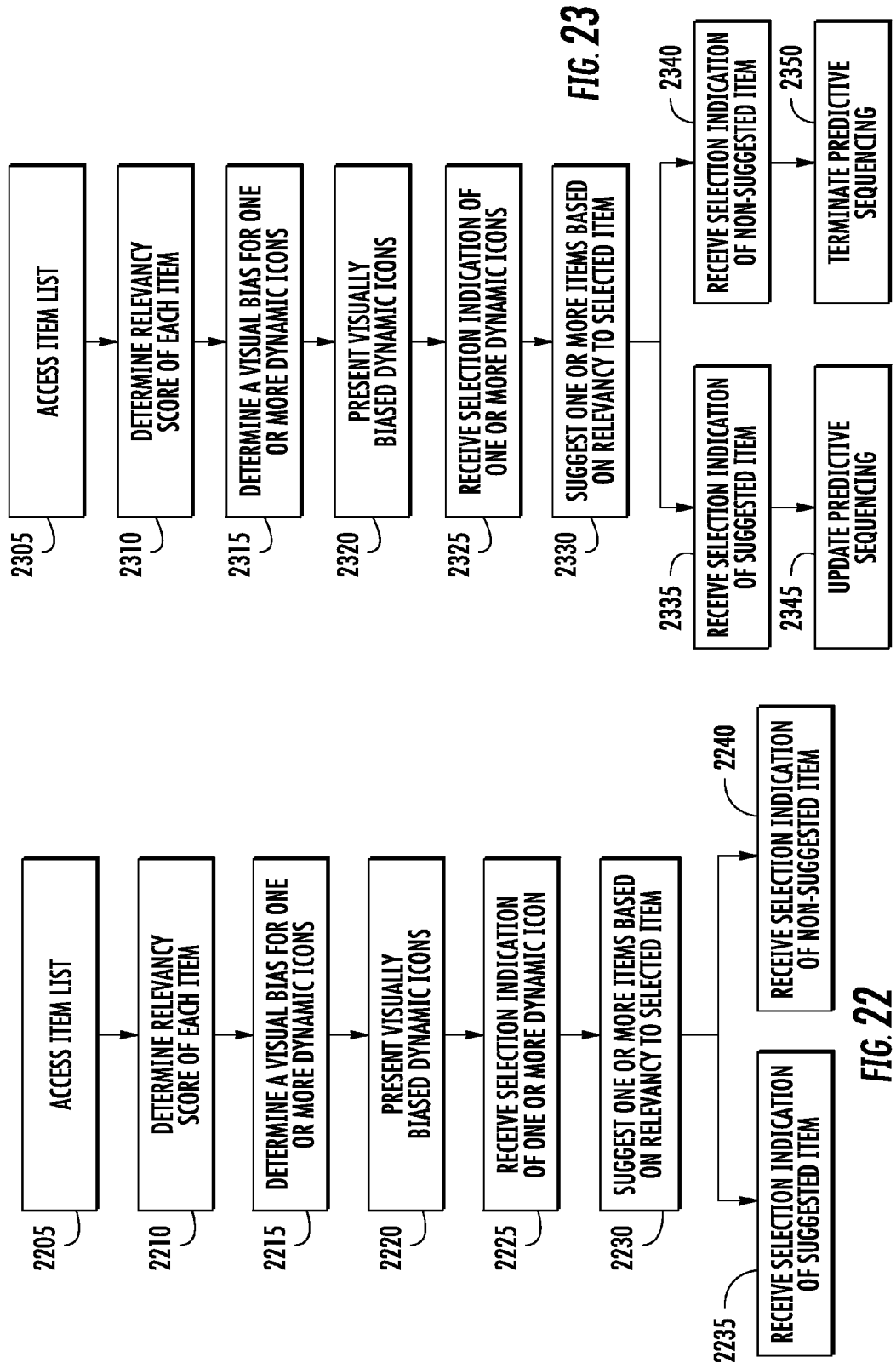

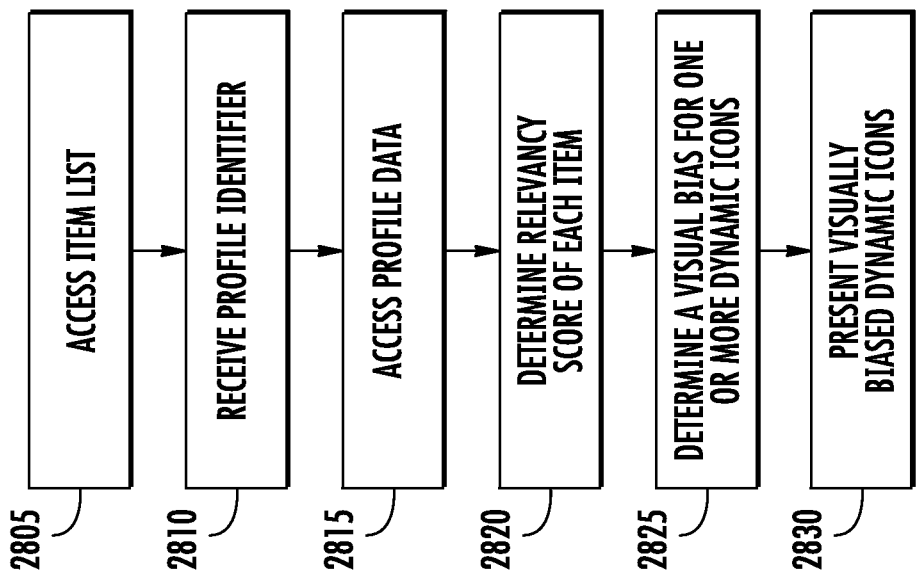
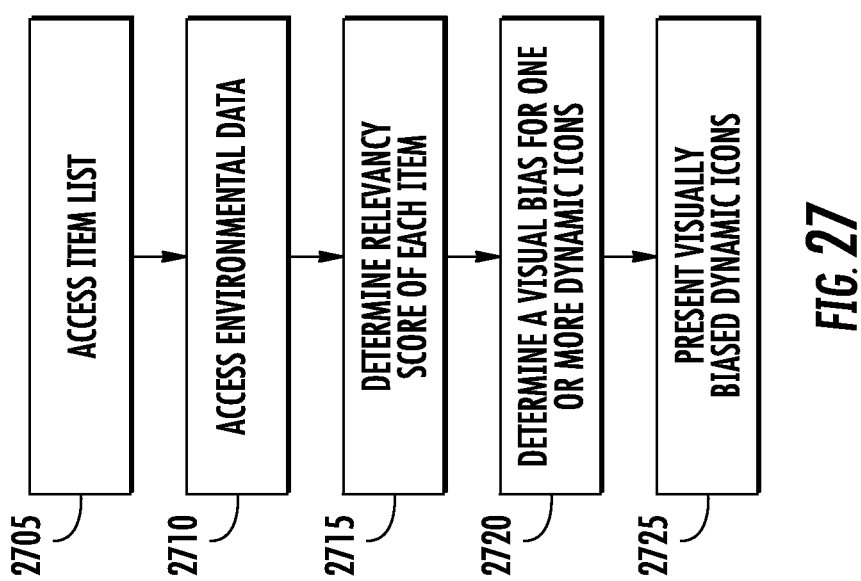

LEARNING USER INTERFACE

CROSS-REFERENCE TO RELATED APPLICATIONS

This application is claims priority under 35 U.S.C. §119 to U.S. Provisional Application No. 61/932,046, which is entitled "Living User Interface" and was filed Jan. 27, 2014, and which is incorporated by reference herein in its entirety.

BACKGROUND OF THE INVENTION

Providers may typically offer goods and/or services (i.e., items) to consumers and may effect transactions with such consumers via a point of sale ("POS") interface, terminal, or system. Applicant has identified a number of deficiencies and problems associated with conventional POS interfaces and other associated systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for facilitating a learning user interface.

In some example embodiments, a method may be provided that may include presenting, via an interface, a plurality of dynamic icons representing a plurality of items. Some embodiments of the method may include receiving, by a processor, a selection indication associated with one item of the plurality of dynamic icons. The method may include determining, via the processor, at least one suggested item of the plurality of items based on the selection indication. Additionally or alternatively, the method may include determining a visual bias for at least one suggested dynamic icon representing the at least one suggested item relative to at least one secondary dynamic icon, and may include applying the visual bias, via the interface, to the at least one suggested dynamic icon.

In some embodiments, applying the visual bias to the at least one suggested dynamic icon includes varying a common feature shared between the at least one suggested dynamic icon and the at least one secondary dynamic icon. In some embodiments, applying the visual bias to the at least one suggested dynamic icon may include varying a size of the at least one suggested dynamic icon relative to the at least one secondary dynamic icon. In some embodiments, applying the visual bias to the at least one suggested dynamic icon may include varying a color of the at least one suggested dynamic icon relative to the at least one secondary dynamic icon. In some embodiments, applying the visual bias to the at least one suggested dynamic icon may include varying a shading of the at least one suggested dynamic icon relative to the at least one secondary dynamic icon. In some embodiments, applying the visual bias to the at least one suggested dynamic icon may include varying a border of the at least one suggested dynamic icon relative to the at least one secondary dynamic icon.

In some embodiments, the visual bias may be temporary. Some embodiments include removing the visual bias after a subsequent selection indication.

In some embodiments, determining the visual bias may include determining a relevancy score for each of the plurality of items, and may include determining the visual bias for the at least one suggested dynamic icon based on the relevancy score for each for the plurality of items. The relevancy score for each of the plurality of items may be based on environmental data. The environmental data may include at least one of a time of day, time of year, weather, and location. In some embodiments, a suggested relevancy score for each of the at least one suggested items is greater than a secondary relevancy score for each of the at least one secondary items. In some embodiments, a suggested relevancy score for each of the at least one suggested items is greater than a predetermined threshold.

Some embodiments may include determining a second visual bias for a second suggested dynamic icon relative to the at least one secondary dynamic icon, and may include applying the second visual bias to the second suggested dynamic icon.

In some embodiments, determining the at least one suggested item may include accessing transaction data corresponding to each of the plurality of items, and may include determining the at least one suggested item based on the transaction data. In some embodiments, determining the at least one suggested item may include accessing a selection rate for each item of the plurality of items. The selection rate may include a rate at which each item of the plurality of items is selected in a same transaction as the one item. The at least one suggested item may be determined based on the selection rate for each item of the plurality of items.

In some embodiments, determining the at least one suggested item may include accessing a sequential selection rate for each item of the plurality of items. The sequential selection rate may include a rate at which each item of the plurality of items is selected following a selection of the one item. The at least one suggested item may be determined based on the sequential selection rate for each item of the plurality of items. In some embodiments, the at least one suggested item may include a first suggested item and a second suggested item, such that a first visual bias may be applied to a first dynamic icon representing the first suggested item and a second visual bias may be applied to a second dynamic icon representing the second suggested item based on the transaction data for each of the plurality of items.

In some alternative embodiments, an apparatus may be provided that may include at least a processor, and may include a memory associated with the processor having computer coded instructions therein. The computer instructions may be configured to, when executed by the processor, cause the apparatus to present, via an interface, a plurality of dynamic icons representing a plurality of items. Some embodiments of the apparatus may be configured to receive, by a processor, a selection indication associated with one item of the plurality of dynamic icons. The apparatus may be configured to determine, via the processor, at least one suggested item of the plurality of items based on the selection indication. Additionally or alternatively, the apparatus may be configured to determine a visual bias for at least one suggested dynamic icon representing the at least one suggested item relative to at least one secondary dynamic icon, and may be configured to apply the visual bias, via the interface, to the at least one suggested dynamic icon.

In some embodiments, applying the visual bias to the at least one suggested dynamic icon includes varying a common feature shared between the at least one suggested dynamic icon and the at least one secondary dynamic icon. In some embodiments, applying the visual bias to the at least one suggested dynamic icon may include varying a size of the at least one suggested dynamic icon relative to the at least one secondary dynamic icon. In some embodiments, applying the visual bias to the at least one suggested dynamic icon may include varying a color of the at least one suggested dynamic icon relative to the at least one secondary dynamic icon. In some embodiments, applying the visual bias to the at least one suggested dynamic icon may include varying a shading of the at least one suggested dynamic icon relative to the at least one secondary dynamic icon. In some embodiments, applying the visual bias to the at least one suggested dynamic icon may include varying a border of the at least one suggested dynamic icon relative to the at least one secondary dynamic icon.

In some embodiments, the visual bias may be temporary. Some embodiments of the apparatus may be configured to remove the visual bias after a subsequent selection indication.

In some embodiments, determining the visual bias may include determining a relevancy score for each of the plurality of items, and may include determining the visual bias for the at least one suggested dynamic icon based on the relevancy score for each for the plurality of items. The relevancy score for each of the plurality of items may be based on environmental data. The environmental data may include at least one of a time of day, time of year, weather, and location. In some embodiments, a suggested relevancy score for each of the at least one suggested items is greater than a secondary relevancy score for each of the at least one secondary items. In some embodiments, a suggested relevancy score for each of the at least one suggested items is greater than a predetermined threshold.

Some embodiments of the apparatus may determine a second visual bias for a second suggested dynamic icon relative to the at least one secondary dynamic icon, and may include applying the second visual bias to the second suggested dynamic icon.

In some embodiments, determining the at least one suggested item may include accessing transaction data corresponding to each of the plurality of items, and may include determining the at least one suggested item based on the transaction data. In some embodiments, determining the at least one suggested item may include accessing a selection rate for each item of the plurality of items. The selection rate may include a rate at which each item of the plurality of items is selected in a same transaction as the one item. The at least one suggested item may be determined based on the selection rate for each item of the plurality of items.

In some embodiments, determining the at least one suggested item may include accessing a sequential selection rate for each item of the plurality of items. The sequential selection rate may include a rate at which each item of the plurality of items is selected following a selection of the one item. The at least one suggested item may be determined based on the sequential selection rate for each item of the plurality of items. In some embodiments, the at least one suggested item may include a first suggested item and a second suggested item, such that a first visual bias may be applied to a first dynamic icon representing the first suggested item and a second visual bias may be applied to a second dynamic icon representing the second suggested item based on the transaction data for each of the plurality of items.

In some example embodiments, a computer program product may be provided that may include a non-transitory computer readable medium having computer program instructions stored therein. The instructions when executed by a processor may be provided that may include presenting, via an interface, a plurality of dynamic icons representing a plurality of items. Some embodiments of the computer program product may include receiving, by a processor, a selection indication associated with one item of the plurality of dynamic icons. The computer program product may include determining, via the processor, at least one suggested item of the plurality of items based on the selection indication. Additionally or alternatively, the computer program product may include determining a visual bias for at least one suggested dynamic icon representing the at least one suggested item relative to at least one secondary dynamic icon, and may include applying the visual bias, via the interface, to the at least one suggested dynamic icon.

In some embodiments, applying the visual bias to the at least one suggested dynamic icon includes varying a common feature shared between the at least one suggested dynamic icon and the at least one secondary dynamic icon. In some embodiments, applying the visual bias to the at least one suggested dynamic icon may include varying a size of the at least one suggested dynamic icon relative to the at least one secondary dynamic icon. In some embodiments, applying the visual bias to the at least one suggested dynamic icon may include varying a color of the at least one suggested dynamic icon relative to the at least one secondary dynamic icon. In some embodiments, applying the visual bias to the at least one suggested dynamic icon may include varying a shading of the at least one suggested dynamic icon relative to the at least one secondary dynamic icon. In some embodiments, applying the visual bias to the at least one suggested dynamic icon may include varying a border of the at least one suggested dynamic icon relative to the at least one secondary dynamic icon.

In some embodiments, the visual bias may be temporary. Some embodiments of the computer program product may remove the visual bias after a subsequent selection indication.

In some embodiments, determining the visual bias may include determining a relevancy score for each of the plurality of items, and may include determining the visual bias for the at least one suggested dynamic icon based on the relevancy score for each for the plurality of items. The relevancy score for each of the plurality of items may be based on environmental data. The environmental data may include at least one of a time of day, time of year, weather, and location. In some embodiments, a suggested relevancy score for each of the at least one suggested items is greater than a secondary relevancy score for each of the at least one secondary items. In some embodiments, a suggested relevancy score for each of the at least one suggested items is greater than a predetermined threshold.

Some embodiments of the computer program product may determine a second visual bias for a second suggested dynamic icon relative to the at least one secondary dynamic icon, and may apply the second visual bias to the second suggested dynamic icon.

In some embodiments, determining the at least one suggested item may include accessing transaction data corresponding to each of the plurality of items, and may include determining the at least one suggested item based on the transaction data. In some embodiments, determining the at least one suggested item may include accessing a selection rate for each item of the plurality of items. The selection rate may include a rate at which each item of the plurality of items is selected in a same transaction as the one item. The at least one suggested item may be determined based on the selection rate for each item of the plurality of items.

In some embodiments, determining the at least one suggested item may include accessing a sequential selection rate for each item of the plurality of items. The sequential selection rate may include a rate at which each item of the plurality of items is selected following a selection of the one item. The at least one suggested item may be determined based on the sequential selection rate for each item of the plurality of items. In some embodiments, the at least one suggested item may include a first suggested item and a second suggested item, such that a first visual bias may be applied to a first dynamic icon representing the first suggested item and a second visual bias may be applied to a second dynamic icon representing the second suggested item based on the transaction data for each of the plurality of items.

BRIEF DESCRIPTION OF THE FIGURES

Reference will now be made to the accompanying drawings, which are not necessarily drawn to scale, and wherein:

FIG. 10b illustrates a flow diagram of an example system in accordance with some embodiments discussed herein;

FIG. 11b illustrates a flow diagram of an example system in accordance with some embodiments discussed herein;

FIG. 16 illustrates an example interface having a secondary layer of dynamic icons in accordance with some embodiments discussed herein;

FIG. 22 illustrates a flow diagram of an example system in accordance with some embodiments discussed herein;

FIG. 23 illustrates a flow diagram of an example system in accordance with some embodiments discussed herein;

FIG. 27 illustrates a flow diagram of an example system in accordance with some embodiments discussed herein;

FIG. 28 illustrates a flow diagram of an example system in accordance with some embodiments discussed herein;

DETAILED DESCRIPTION

Figure 1:
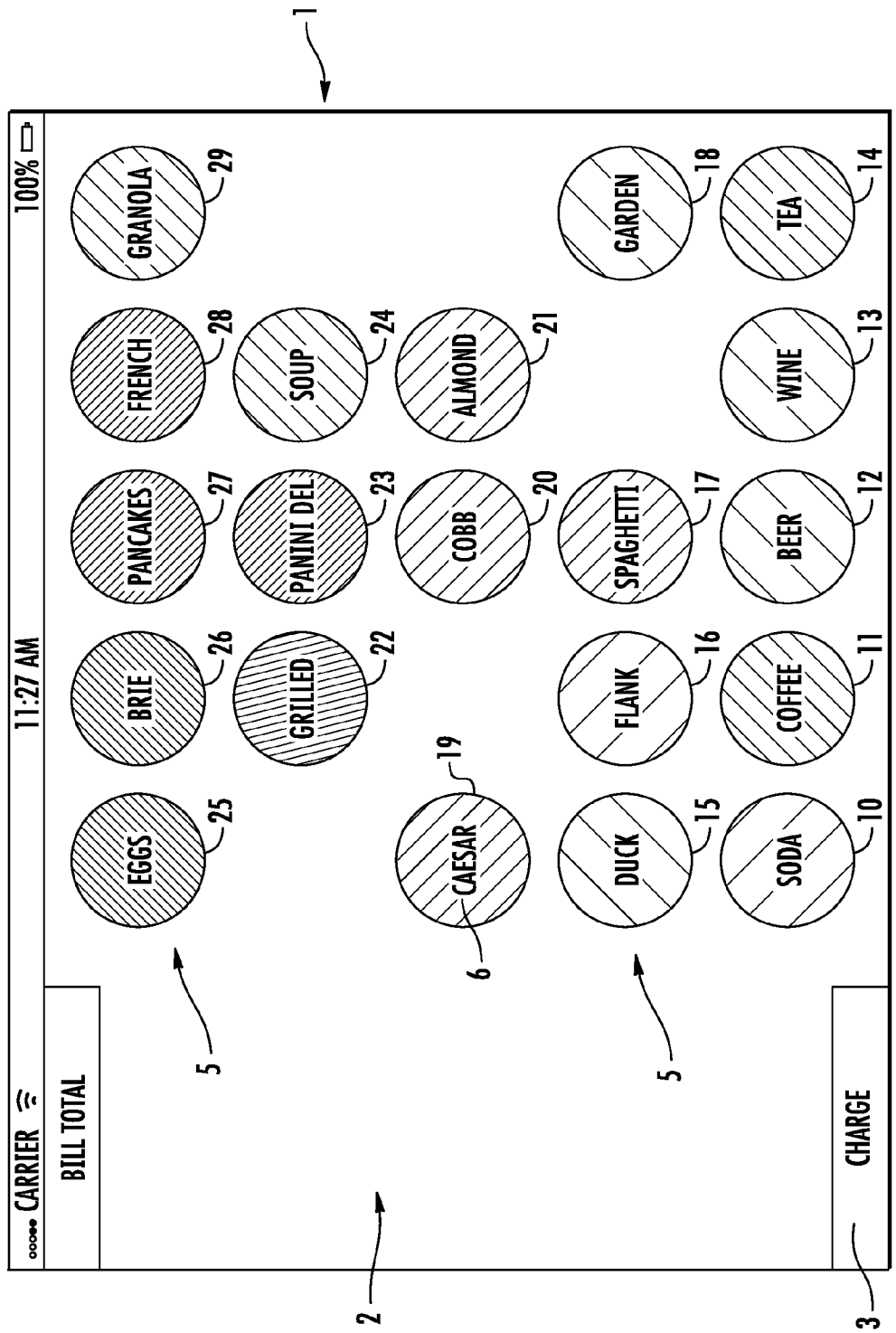
FIG. 1 illustrates an example interface having a plurality of dynamic icons in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a provider value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a provider value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the provider value is $50. In this example, the residual value may be equal to the accepted value.

As used herein, the term "item" refers to any product, good, promotion, service, option, or other tangible or intangible item that may be displayed in a user interface.

As used herein, the term "feature" refers to the size, shape, color, text, highlighting, shading, opacity, image overlay, or any other discernible attribute of a tangible or intangible visualization of an item.

As used herein, the term "item data" refers to any data related to an item, such as, but not limited to, transaction data, environmental data, item characteristic data, business data, and any other data that may serve to distinguish one or more items from each other.

As used herein, the term "profile identifier" refers to any data that identifies a user, consumer, provider, provider employee, or promotion and marketing service. For example, and without limitation, a profile identifier may include a unique identifier, an IP address, a MAC address, a merchant identifier, a customer identifier, and the like.

As used herein, the term "profile data" refers to any data associated with a profile identifier, such as, but not limited to, transaction data, biographical data, preference data, or any other data that may serve to distinguish one or more profiles from each other.

As used herein, the term "transaction data" refers to any item or profile data related to the buying, selling, or offering of an item, such as, but not limited to, sales data including historical and predicted revenue for each item, historical and predicted profits for each item, quantities sold for each item, quantity of customers purchasing each item, overall selection rate of each item, popularity of an item, or a selection rate per transaction or per customer of each item. Transaction data may also include redemption data, in the case of a promotion that must be redeemed, or may include return data for an item or promotion that is returned. In some embodiments, transaction data may include a consumer rating of an item. The transaction data may also include transactions with respect to profile information, such as transactions involving a single profile or related group of profiles.

As used herein, the term "environmental data" refers to contextual or environmental information associated with an item and/or associated with transactions involving items such as, without limitation, a time of day, time of year, weather, season, geographic or hyper-geographic location, or any other data that gives context to an item and/or to a transaction.

As used herein, the term "business data" refers to commercial or strategic data associated with an item that may define metrics for a provider or promotion and marketing service. For example and without limitation, goal data, such as sales goals, impression goals, redemption goals, revenue goals, profit goals or inventory data may serve as business data.

As used herein, the term "characteristic information" refers to any identifying attributes of an item that may serve to distinguish the item from other items, such as, but not limited to, physical characteristics (e.g. color, texture, flavor, crunchiness, etc.) and/or health characteristics (e.g. vitamin and nutrient content).

As used herein, the term "biographical data" refers to information associated with a person(s) (e.g., consumer, provider employee, etc.) identified in a profile, such as, for example, birth dates, allergies, socio-economic data, interests, place of residence, login credential information, and/or any other identifying information about a profile.

As used herein, the term "preference data" refers to one or more options associated with a profile, such that the preference data tracks the profile holder's interests and selections for various user-selectable interface options. Preference data may also include, without limitation, location data (e.g., GPS data, operating system location, etc.) associated with activity of a user associated with a profile.

As used herein, the term "dynamic icon" refers to any visualization of an item, such as, but not limited to, buttons, pictures, photos, symbols, QR codes, ID numbers, or any other visual representation of an item.

As used herein, the term "visual bias" refers to presenting, emphasizing, altering, or enhancing one or more features of a dynamic icon, via an interface, in order to convey information associated with an item represented by the dynamic icon. A visual bias may change or modify a common feature shared by one or more dynamic icons. For example, a visual bias may be used to indicate a relationship between two or more dynamic icons, such as a relative item or profile data between the items represented by the two or more dynamic icons. In another embodiment, a visual bias may identify a suggested icon as distinct from one or more secondary icons. A visual bias may also be used to convey objective information about an item represented by the dynamic icon, such as item or profile data. In some embodiments, the visual bias may be presented as a visual indication.

As used herein, the term "common feature" refers to any feature shared by two or more dynamic icons. For example, in some embodiments, two dynamic icons may both have the same shape (e.g., circles) representing two different items. In some embodiments, the interface may visually bias one of or both of the dynamic icons by changing the common circular feature of the dynamic icons, such as by altering the size, color, border, shading, or any other attribute of the common feature to indicate a distinction between the two dynamic icons.

As used herein, the term "visual indication" refers to an altering of any discernible feature of a dynamic icon, such as by highlighting, shading, flashing, pulsing, sizing, coloring, displaying text, overlaying an image, repositioning, presenting submenus or any visual biasing that may visually attract a user's attention to a dynamic icon.

Overview

Various embodiments of the invention are directed to a learning user interface 1 (referred to herein simply as "the interface," the "learning user interface," or the "LUI"), for example, as shown in FIG. 1, that is configured to be adaptive, intuitive, and to allow a user (e.g., a consumer, provider, provider employee, or promotion and marketing service) to visualize or perceive information (e.g., transaction data, business data, relevancy data, etc.) associated with a set of items. The interface 1 may be used as part of a standalone service, application, or device or it may be applied as a layer atop an existing service application or device.

The interface 1 may present one or more dynamic icons to a user. The dynamic icons may visually represent one or more corresponding items. For example, in some embodiments, the interface 1 may be a point of sale terminal that presents dynamic icons representing items for sale. The interface 1 may visually bias the dynamic icons in order to indicate a suggested icon to a user relative to a secondary icon. The suggested icon may be determined based on item data corresponding to the represented items and/or profile data corresponding to a profile identifier. The items may be visually biased in order to make the interface more intuitive and easier to use by visually emphasizing or biasing those dynamic icons that are more likely to be selected or of interest to a given user.

As will be discussed in greater detail below, the interface 1 is not limited to displaying data concerning provider items and can instead be configured to display a wide variety of data characteristics for any set of data that might be of interest to a user. The interface 1 may be used to visualize any set of item or profile data for any purpose and it may be used in connection with numerous exemplary system architectures as explained in further detail herein.

In some embodiments, the interface 1 may be configured to be used by a provider, consumer, promotion and marketing service, or a third-party and may be tailored to suit each party's interests or specific data needs. For example, the embodiment shown in FIG. 1 illustrates a point of sale restaurant interface with menu options as the available items. In some embodiments, the interface 1 may be disposed in electrical communication with a point of sale terminal. Electrical communication may include, but is not limited to, being displayed on an attached screen, being wirelessly transmitted to a remote screen, being presented to a consumer, provider, or third party screen, or any other means to associate the interface with the point of sale terminal. In other embodiments, the interface 1 may be configured as an online shopping interface. One of ordinary skill in the art will appreciate that the LUI related concepts discussed herein, may be applied to better visualize characteristics of interest for a wide variety of item and/or data sets.

Exemplary Architecture

Figure 2:
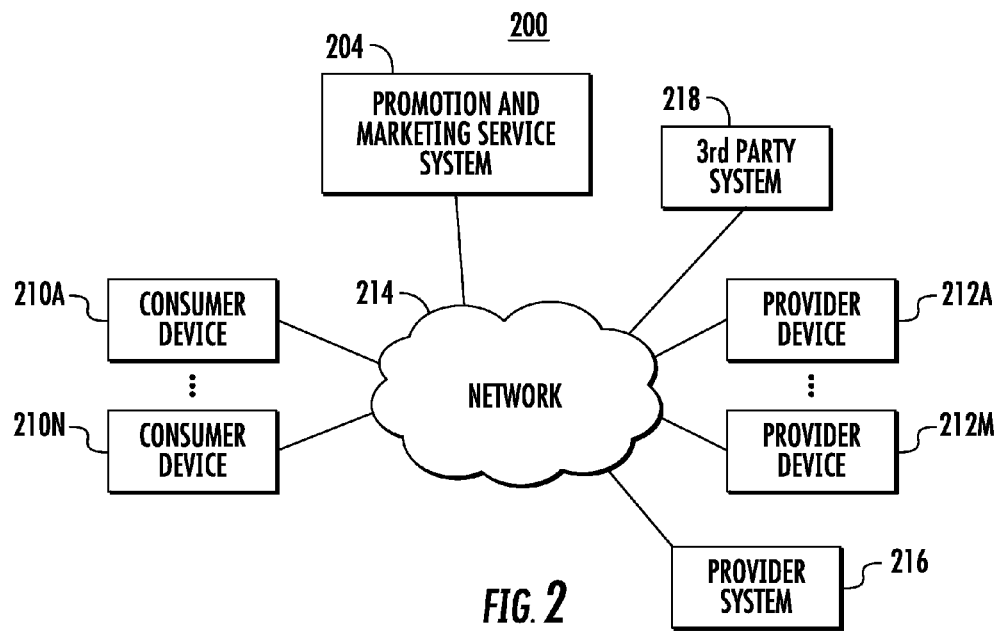
FIG. 2 illustrates an example system in accordance with some embodiments discussed herein.

FIG. 2 shows system 200 including an example network architecture for a system, which may include one or more devices and sub-systems that are configured to implement some embodiments discussed herein. For example, system 200 may include provider system 216, which can include, for example, the circuitry disclosed in FIGS. 3-4, a provider server, or provider database, among other things (not shown). The provider system 216 may include any suitable network server and/or other type of processing device. In some embodiments, the provider system 216 may determine and transmit commands and instructions for rendering one or more visually biased dynamic icons to consumer devices 210A-210N, provider devices 212A-212M, and/or one or more third party systems 218 using data from the LUI database 312.

Provider system 216 can communicate with one or more consumer devices 210A-210N and/or one or more provider devices 212A-212N via network 214. In this regard, network 214 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 214 may include a cellular telephone, an 802.11, 802.16, 802.20, and/or WiMax network. Further, the network 214 may include a public network, such as the Internet, a private network, such as an intranet, or combinations thereof, and may utilize a variety of networking protocols now available or later developed including, but not limited to TCP/IP based networking protocols.

Consumer devices 210A-210N and/or provider devices 212A-812M may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 2 of "N" consumers and "M" providers is merely for illustration purposes. In one embodiment, the consumer devices 210A-210N may be configured to display an interface on a display of the consumer device for viewing at least one dynamic icon, which may be provided by the provider system 216. According to some embodiments, the provider devices 212A-212M may be configured to display the interface on a display of the provider device for viewing, creating, editing, and/or otherwise interacting with a dynamic icon. In some embodiments, an interface of a consumer device 210A-210N may be different from an interface of a provider device 212A-212M. The consumer device 210A-210N may be used in addition to or instead of the provider device 212A-212M. System 200 may also include at least one promotion and marketing service system 204 and/or 3rd party system 218, among other things.

Figure 3:
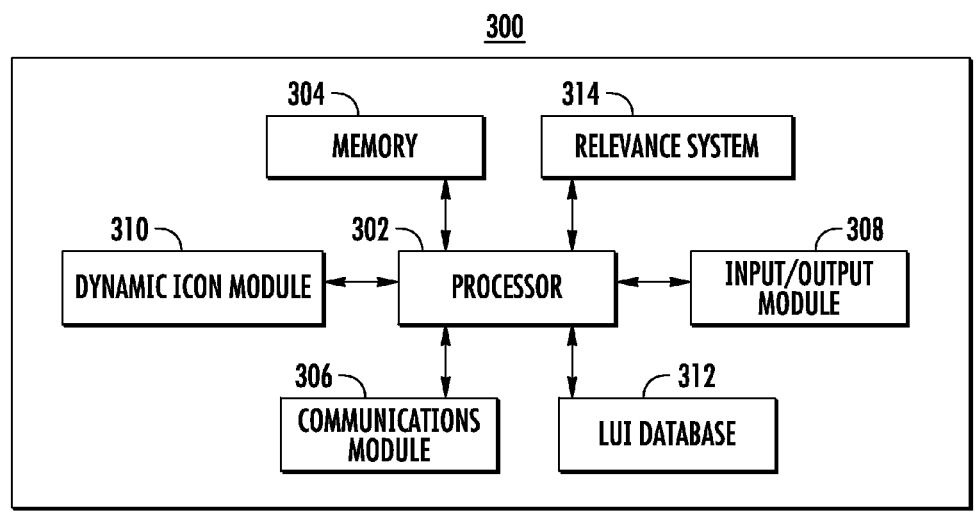
FIG. 3 illustrates a schematic block diagram of circuitry that can be included in a computing device, such as a provider device, consumer device, promotion and marketing service system and/or provider system, in accordance with some embodiments discussed herein.

FIG. 3 shows a schematic block diagram of circuitry 300, some or all of which may be included in, for example, provider system 216, promotion and marketing service system 204, consumer devices 210A-210N and/or provider devices 212A-212M. Any of the aforementioned systems or devices may include the circuitry 300 and may be configured to, either independently or jointly with other devices in a network 214 perform the functions of the circuitry 300 described herein. As illustrated in FIG. 3, in accordance with some example embodiments, circuitry 300 can includes various means, such as processor 302, memory 304, communications module 306, and/or input/output module 308. In some embodiments, dynamic icon module 310 and/or a relevance system 314 may also or instead be included. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments processor 302 comprises a plurality of processors. The plurality of processors may be embodied on a single computing device or may be distributed across a plurality of computing devices collectively configured to function as circuitry 300. The plurality of processors may be in operative communication with each other and may be collectively configured to perform one or more functionalities of circuitry 300 as described herein. In an example embodiment, processor 302 is configured to execute instructions stored in memory 304 or otherwise accessible to processor 302. These instructions, when executed by processor 302, may cause circuitry 300 to perform one or more of the functionalities of circuitry 300 as described herein.

Whether configured by hardware, firmware/software methods, or by a combination thereof, processor 302 may comprise an entity capable of performing operations according to embodiments of the present invention while configured accordingly. Thus, for example, when processor 302 is embodied as an ASIC, FPGA or the like, processor 302 may comprise specifically configured hardware for conducting one or more operations described herein. Alternatively, as another example, when processor 302 is embodied as an executor of instructions, such as may be stored in memory 304, the instructions may specifically configure processor 302 to perform one or more algorithms and operations described herein, such as those discussed in connection with FIGS. 1-48.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing device or distributed across a plurality of computing devices. In various embodiments, memory 304 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 304 may be configured to store information, data (including item data and/or profile data), applications, instructions, or the like for enabling circuitry 300 to carry out various functions in accordance with example embodiments of the present invention. For example, in at least some embodiments, memory 304 is configured to buffer input data for processing by processor 302. Additionally or alternatively, in at least some embodiments, memory 304 is configured to store program instructions for execution by processor 302. Memory 304 may store information in the form of static and/or dynamic information. This stored information may be stored and/or used by circuitry 300 during the course of performing its functionalities.

Communications module 306 may be embodied as any device or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device and/or network, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/software for enabling communications with another computing device. Communications module 306 may be configured to receive and/or transmit any data that may be stored by memory 304 using any protocol that may be used for communications between computing devices. Communications module 306 may additionally or alternatively be in communication with the memory 304, input/output module 308 and/or any other component of circuitry 300, such as via a bus.

Input/output module 308 may be in communication with processor 302 to receive an indication of a user input and/or to provide an audible, visual, mechanical, or other output to a user (e.g., provider and/or consumer). Some example visual outputs that may be provided to a user by circuitry 300 are discussed in connection with FIGS. 1-48. As such, input/output module 308 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 300 is embodied as a server or database, aspects of input/output module 308 may be reduced as compared to embodiments where circuitry 300 is implemented as an end-user machine (e.g., consumer device and/or provider device) or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300. Input/output module 308 may be in communication with the memory 304, communications module 306, and/or any other component(s), such as via a bus. One or more than one input/output module and/or other component can be included in circuitry 300.

Dynamic icon module 310 and relevance system 314 may also or instead be included and configured to perform the functionality discussed herein related to generating, ranking, arranging, presenting, and/or editing item data and/or profile data. In some embodiments, some or all of the functionality of generating, ranking, arranging, presenting, and/or editing item data and/or profile data may be performed by processor 302. In this regard, the example processes and algorithms discussed herein can be performed by at least one processor 302, dynamic icon module 310, and/or relevance system 314. For example, non-transitory computer readable media can be configured to store firmware, one or more application programs, and/or other software, which include instructions and other computer-readable program code portions that can be executed to control each processor (e.g., processor 302, dynamic icon module 310, and/or relevance system 314) of the components of system 300 to implement various operations, including the examples shown above. As such, a series of computer-readable program code portions are embodied in one or more computer program goods and can be used, with a computing device, server, and/or other programmable apparatus, to produce machine-implemented processes.

Figure 5:
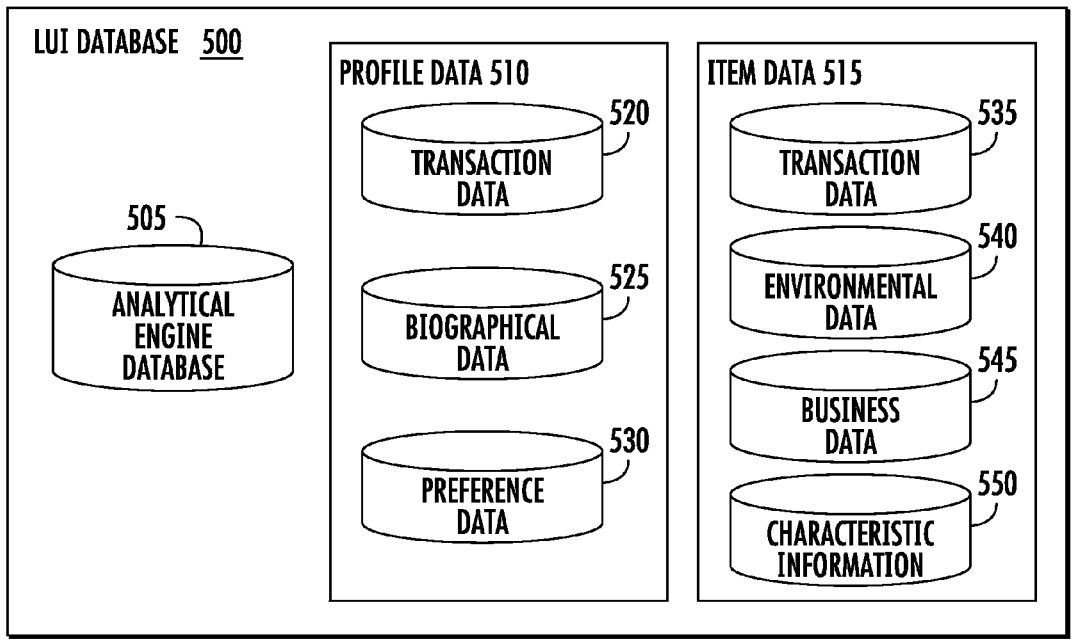
FIG. 5 illustrates an example LUI Database in accordance with some embodiments discussed herein.

In some embodiments, a LUI database 312, 430, 500 may be provided that includes item data, profile data, and/or analytical engine data. As shown in FIG. 5, item data 515 may include transaction data 535, environmental data 540, business data 545, and/or characteristic data. Profile data 510, in some embodiments, may include transaction data 520, biographical data 525, and/or preference data 530. Additionally or alternatively, the LUI database 312, 430, 500 may include analytical engine data 505, which provides any additional information needed by the relevance system 314, 400 and/or dynamic icon module 310, 600 in computing visual bias of the dynamic icons.

For example, returning to FIG. 3, dynamic icon module 310 can be configured to analyze multiple sets of item data and/or profile data (e.g., including various combinations of environmental, business, biographical, transactional data, etc.), such as the data in the LUI database 312, in view of consumer, provider, and/or promotion and marketing service needs (such as, e.g., preferences for certain items, popularity of certain items, excess inventory sales goals, and/or inventory service life information) to present one or more of visually biased dynamic icons representing items to present on a provider device and/or a consumer device. In this way, dynamic icon module 310 may support multiple algorithms, including those discussed below with respect to transaction data, environmental data, predictive sequencing, various filters, etc. Further, the present configuration can enable flexibility in terms of configuring additional contexts.

Figure 6:
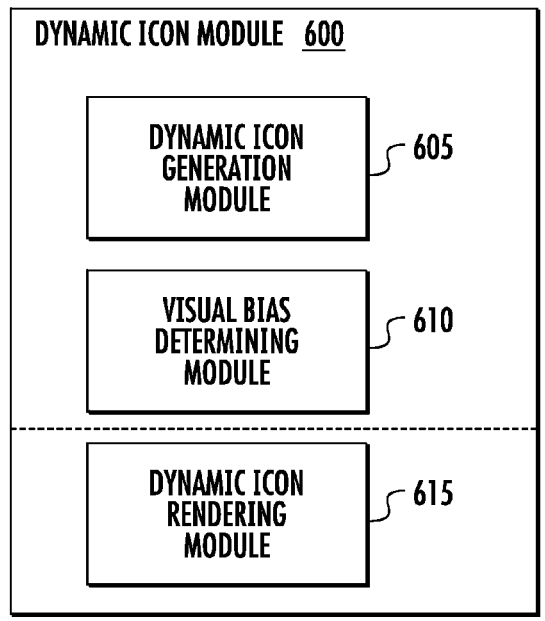
FIG. 6 illustrates an example Dynamic Icon Module in accordance with some embodiments discussed herein.

In some embodiments, with reference to FIG. 6, the dynamic icon module 310, 600 may include a dynamic icon generation module 605, a visual bias determining module 610, and/or a dynamic icon rendering module 615. The dynamic icon generating module may receive one or more items offered by a provider and/or a promotion and marketing service and may generate dynamic icons for each item. The dynamic icons may be generated based on a set of predetermined templates, may be based on a particular user or set of user preferences, and/or may be determined based on the items themselves (e.g., shaped to approximate the shape of an associated item, etc.).

During or after the generation of the dynamic icons, the dynamic icon module 310, 600 may determine a visual bias using the visual bias determining module 610. The visual bias determining module may use any of the algorithms or processes disclosed herein for determining a visual bias. For example, the visual bias module may compare various data from the LUI database 312, 430, 500, such as, but not limited to, transaction data, environmental data, business data, relevancy scores, and/or biographical data.

In some embodiments, the dynamic icon module 310, 600 may include a dynamic icon rendering module 615. In some other embodiments, such as when the circuitry 300 is embodied in a provider system 216 or promotion and marketing service system 204, the dynamic icon rendering module 615 may be located in another circuitry 300 or another device, such as the consumer devices 210A-210N or provider devices 212A-212M.

The dynamic icon module 310 can be configured to access data corresponding to multiple items, and generate an initial visual bias for the multiple items and/or an initial ranking of the multiple items. In some embodiments, the multiple items can be ranked in accordance with a transaction data, wherein multiple items are ranked based on factors such as selection rate, usage rate, popularity, profit, etc. Thereafter, the dynamic icon module 310 can adjust the initial visual biasing for the multiple items and/or the ranking of the multiple items at various periods or refresh rates. Dynamic icon module 310 may adjust the visual bias and/or the rankings of the items in one or multiple ways. For example, the dynamic icon module 310 may update the initial visual bias or subsequent visual bias for the multiple items and/or the initial ranking of the multiple items or subsequent ranking(s) of the multiple items. As another example, the dynamic icon module 310 may use one or more rules to adjust the initial visual bias, the subsequent visual bias, the initial ranking of the multiple items, or the subsequent ranking(s) of the multiple items (such as by excluding or diminishing (i.e., visually de-emphasizing) an item based on a business rule).

Alternatively and/or additionally, the dynamic icon module 310 may consider any information or data in visually biasing the dynamic icons. In some embodiments, the dynamic icons are visually biased on an absolute scale, such that the visual bias is related only to an individual item (e.g., sales or transaction data for a particular item) and not related or ranked according to the other items. In some embodiments, the dynamic icon module 310 visually biases the dynamic icons, as described above, in order to convey one or more suggested dynamic icons. The suggested dynamic icons may be determined automatically by the dynamic icon module 310 or may be chosen based on the user preference data.

In some embodiments, as detailed herein, the dynamic icon module 310 may visually bias the dynamic icons based on one or more relevancy scores for the items. Additionally or alternatively to the dynamic icon module 310, the circuitry 300 may include a relevance system 314, 400, which calculates relevancy scores for a plurality of items. The relevance system 314, 400 may be included in any one or more of the provider system 216, the promotion and marketing service system 204, the $3^{rd}$ party system 218, the consumer devices 210A-210N, and/or the provider devices 212A-212M. The relevance system 314, 400 may also interact with other systems and servers over the network 214 that contain data, which may be used to calculate relevancy. Additionally, in some embodiments, the relevance system 314, 400 may be located in a provider system 216 and/or promotion and marketing service system 204 and interact with remote devices, such as consumer 210A-210N or provider 212A-212N devices to facilitate visual biasing.

Figure 4:
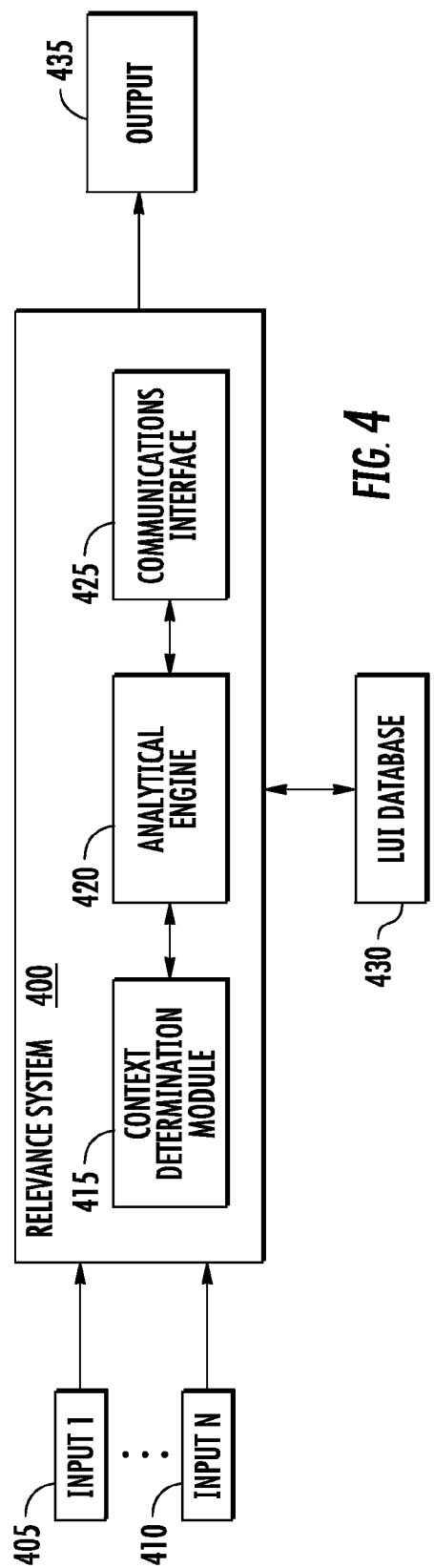
FIG. 4 illustrates an example relevance system in accordance with some embodiments discussed herein.

With reference to FIG. 4, whether used locally or over a network, the relevance system 314, 400 may be used to calculate the relevancy scores for the items used in the interface. The system may receive a plurality of inputs 405, 410 from the circuitry 300 and process the inputs within the relevance system to produce a relevance output 435, which may include a relevancy score. In some embodiments, the relevance system 314, 400 may execute context determination 415, process the data in an analytical engine 420, and output the results via a communications interface 425. Each of these steps may pull data from a plurality of sources including the LUI Database 430.

When inputs 405, 410 are received by the relevance system 314, 400, a context determination 415 may first be made. A context determination includes such information as a user preference data, what item or user are the items being compared to for the relevancy scoring, and under what circumstances has the interface or system has requested the relevancy information. These inputs may give context to the relevance system's 314, 400 analysis to determine to what reference source the relevancy score is based. For example, the context determination module 415 may instruct the relevance system to calculate relevancy scores based on a specific user. In some embodiments, the context determination module 415 may instruct the relevance system to calculate relevancy scores for the items based on item data for a specific location. The context determination module 415 may select any criteria based on any number of preferences and automatic determinations around which to calculate the relevancy scores.

The relevance system 314, 400 may then compute the relevancy scores using the analytical engine 420. The analytical engine 420 draws information about the profile and the items from the LUI database 312, 430, 500 and then, in light of the context determination module's 415 determination, computes a relevancy score for each of the items. The analytical engine 420, in some embodiments, may produce a hierarchy of relevancy scores for the items based on the similarities between a given item, or profile data, and each of the plurality of items. The analytical engine 420 may compare each item with the desired context 415 to determine the relevancy scores. The communications interface 425 then outputs 435 the relevancy scores to the dynamic icon module 310 on a local or remote circuitry 300 for visual biasing.

Additional descriptions of relevance determination algorithms for identifying promotions relevant to a consumer or other profile data that may be used alternatively or additionally are described in U.S. patent application Ser. No. 13/411,502, filed Mar. 2, 2012, titled "RELEVANCE SYSTEM FOR CONSUMER DEALS", U.S. patent application Ser. No. 13/829,581 entitled "PROMOTION OFFERING SYSTEM" filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

In some embodiments, a consumer device 210A-210N or a provider device 212A-212N may receive or access the profile identifier. The profile identifier may be received remotely, via wireless communication or tethered communication, or directly, via input into one of the devices 210A-210N, 212A-212N. For example, in some embodiments, the consumer may have a remote device, such as a mobile device or key fob that interacts with the devices 210A-210N, 212A-212N to transmit a profile identifier and other related profile data. In another example, a consumer may simply provide login credentials through the interface of their consumer device. The devices 210A-210N, 212A-212N may receive the profile identifier and transfer it to the circuitry 300. The circuitry 300 may then access the LUI database 312 to retrieve profile data 510 associated with the profile identifier and transfer the profile identifier and/or the profile data to the relevance system 314, 400 and/or the dynamic icon module 310, 600.

In some embodiments, the system 200 may be configured to present via the interface one or more visually biased dynamic icons by interacting with one or more circuitries 300 over a network 214. In some embodiments, the circuitry 300 may be a local circuit configured to visually bias the dynamic icons based on a local LUI database 312. In some embodiments, multiple devices 210A-210N, 212A-212N may present interfaces to different users and may bias a plurality of dynamic icons differently based on the particular user. The interfaces may be used in a single provider location, multiple provider locations, in the locations of multiple providers, and/or in any promotion and marketing service locations.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200, 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 302, dynamic icon module 310, and/or relevance system 314 discussed above with reference to FIG. 3, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Adaptive UI

FIG. 1 illustrates an example interface 1 structured in accordance with various embodiments of the invention. The depicted interface 1 presents items, or groups of items, as represented by dynamic icons 5. In some embodiments, the dynamic icons 5 include an item name 6; however, in other embodiments, the dynamic icons 5 may include some other means (e.g., picture, photo, symbol, QR code, ID number, etc.) to identify the item represented by the dynamic icon 5, as defined above. In one example, a dynamic icon 5 may be shaped to generally resemble the item it represents or there may be some other feature that indicates the item represented.

In some embodiments, as described in detail herein, the interface 1 is configured to present visually biased dynamic icons 5 in order to represent data associated with the items and/or a profile data or about how such information or data changes with time. The visual bias may be presented as a visual indication, as defined above, and/or in some embodiments, a feature or features of the dynamic icon may be biased. As explained in further detail below, in some embodiments, the dynamic icons 5 may visualize any data that is of interest to a user via biasing. Any feature of the dynamic icon 5 may be used to visualize the data.

Figure 7:
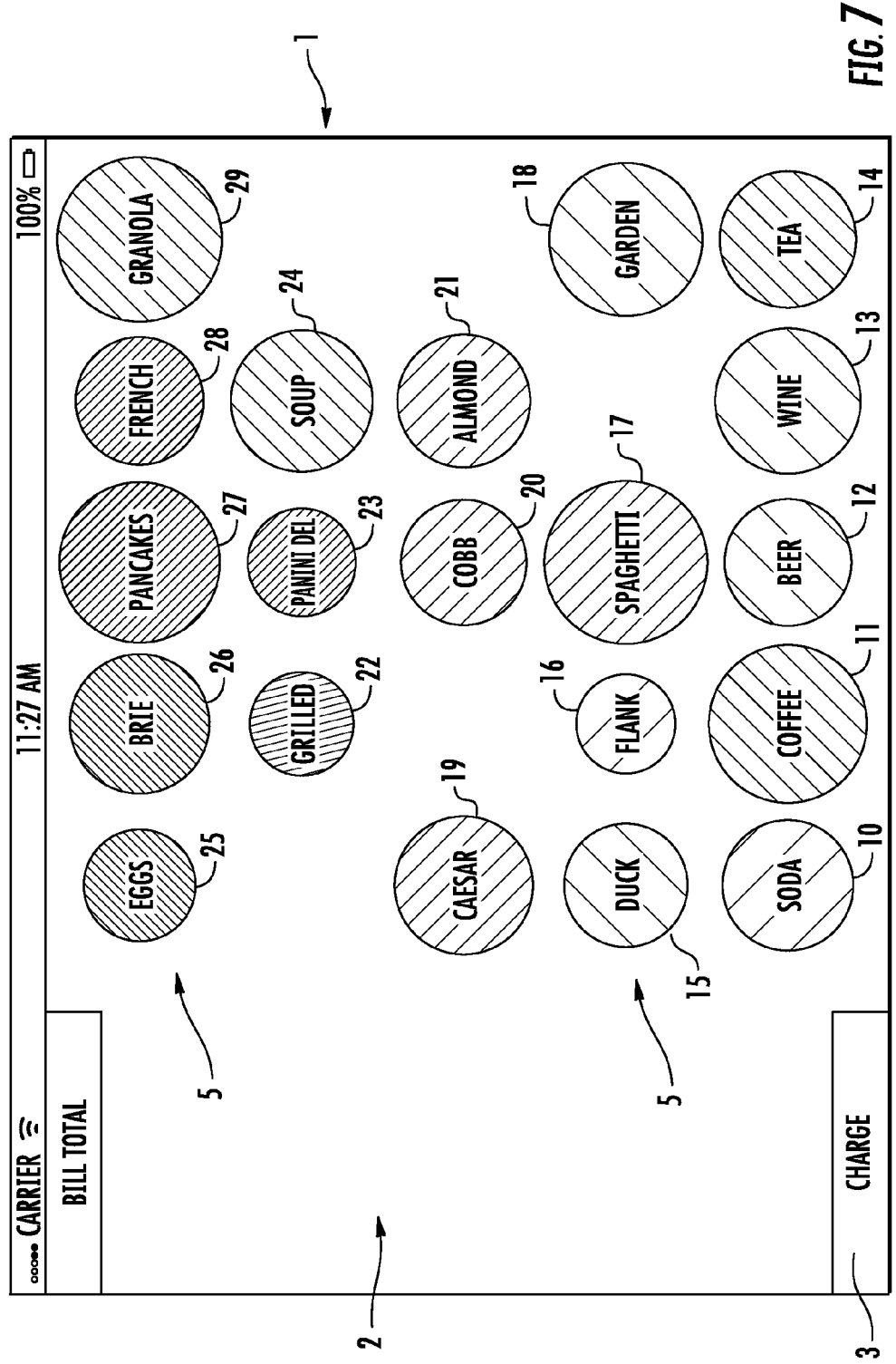
FIG. 7 illustrates an example interface having a plurality of dynamic icons depicting transaction data over a one month elapsed time period in accordance with some embodiments discussed herein.

The system may determine a visual bias, to be presented via the interface 1, which indicates a suggested item to a user, such that the visual biasing presents one dynamic icon as suggested over a secondary dynamic icon. As shown in FIG. 7, each of the dynamic icons 5 may have a common shape or other common feature, and in some embodiments the visual bias may change the common feature or attribute to indicate a suggested dynamic icon. For example, in some embodiments, two dynamic icons 5 may both have the same shape (e.g., circles). In some embodiments, the system may visually bias one of or both of the dynamic icons by changing the common circular feature of the dynamic icons, such as by altering the size, color, border, shading, or any other attribute of the common feature to indicate a distinction between the two dynamic icons. Likewise, any feature of the dynamic icons 5 may be biased, for example, and without limitation, a size, color, shading, border or any other feature of the dynamic icon. Additionally, as described herein, any number of the dynamic icons may be biased independently or relative to one another.

Additionally, as discussed in greater detail herein, the system may consider any type of information when biasing the dynamic icons. In some embodiments, the visual bias may be determined by transaction data. Transaction data, as described above, may include any item or profile data about the buying, selling, or offering of the items. For example, in some embodiments, several dynamic icons may be biased based on their relative selection rate, usage rate, popularity, or other transaction data for each item. Some embodiments may visually bias an item based on the transaction data associated with a particular profile identifier. For example, the interface may present visually biased dynamic icons that indicate a suggested item based on the transaction data of a particular profile representing a consumer.

In some embodiments, the system may determine a visual bias based on environmental data. As defined above, environmental data may include information such as a time of day, time of year, weather, season, geographic or hypergeographic location, or any other data that gives context to each item and/or item transaction. For example, some items may be more frequently purchased in winter, or on cold days, and the interface may present visually biased dynamic icons 5 representing those more popular items on days with similar weather conditions.

In some embodiments, the system may also determine the visual bias based on multiple data sources. As discussed herein, in some embodiments, the system may consider multiple factors or data sources in determining the overall bias for a dynamic icon 5. For example, in some embodiments, the system may calculate a visual bias based on transaction data for the items as well as business data (e.g. inventory information, etc.) for each of the items. Thus, in this example, a more popular, but out of stock, item may have the visual bias of its dynamic icon altered so that the interface suggests another, less popular item that is in stock. Any combination of the possible data sources disclosed herein may be used in order to determine a suggested dynamic icon or hierarchy of dynamic icons to present via the interface.

Figure 49:
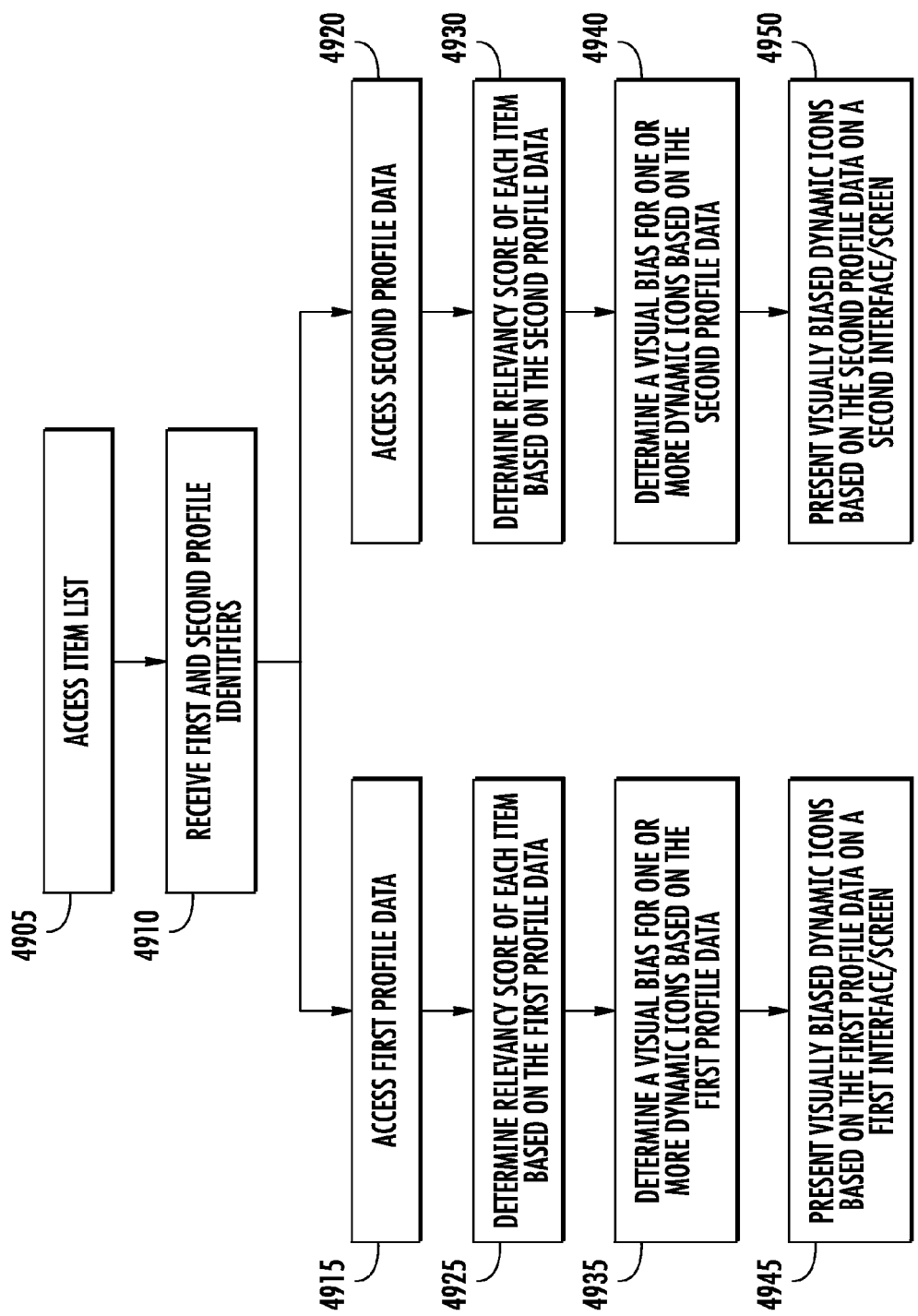
FIG. 49 illustrates a flow diagram of a first interface and a second interface in accordance with some embodiments discussed herein.

Some embodiments of the present invention, for example as shown in FIG. 49, also use a second screen to display a second interface. In some alternative embodiments, a second interface may be presented on a the same screen as the first interface. In some embodiments, the system determines a visual bias for one or more dynamic icons based on a set of data and/or a relevancy score 4935 and present visually dynamic icons 4945 via a first interface on a first screen. In some further embodiments, as shown in FIG. 49, a second interface may be presented on a second screen 4950, and may be presented to a different user. The second interface may present a different visual bias for the dynamic icons on the second screen than the first interface on the first screen, based on the information that is relevant to the particular user. In some embodiments, the system may access an item list 4905 and receive two or more profile identifiers 4910 representing at least a first profile data 4915 and second profile data 4920. The system may then access the first profile data 4915 and the second profile data 4920 corresponding to each profile identifier. The system, either in a single device or via a networked set of devices, as described herein, may determine a relevancy score for the items based on the first profile data 4925 and may determine a second relevancy score for the items based on the second profile data 4930. The system may then determine a first visual bias for the dynamic icons on the first interface based on the first profile data and the first relevancy scores 4935, and may determine a second visual bias for the dynamic icons on the second interface based on the second profile data and the second relevancy scores 4940. The visual biases for the dynamic icons may be presented on the respective first interface 4945 and second interface 4950. Although steps 4925 and 4930 recite determining a relevancy score of each item, alternative embodiments may use the profile data, or transaction data associated with the profile data as a source of comparison for either or both of the first profile data and second profile data as described herein with respect to the transaction data of FIGS. 10a, 10b, 11a, and 11b.

For example, a first screen may be consumer facing and may visually bias the dynamic icons to show relevancy of each item to the consumer. In this embodiment, the second screen may be provider or provider employee facing and may visually bias the dynamic icons based on business data or other information in order to facilitate the transaction for both the provider/provider employee and the consumer. The system may utilize any number of screens necessary to present the items as biased dynamic icons in a meaningful way to each user (e.g. provider, consumer, promotion and marketing service, etc.).

In some embodiments, the system may give different weights to different sets of data. For example, in some embodiments, the system may prefer more recent data to older data, so more recent transaction data would be given more weight in the biasing determination than stale transaction data.

FIG. 7 illustrates an exemplary embodiment of the interface 1 of the present invention, wherein the sizes of the dynamic icons 5 are visually biased to indicate transaction data of the represented items. For example, the coffee dynamic icon 11 and spaghetti dynamic icon 17 of the embodiment shown in FIG. 7 are determined to be more popular based on transaction data, i.e., more frequently purchased or more frequently selected. Thus, the coffee dynamic icon 11 and spaghetti dynamic icon 17 are visually biased (i.e., their sizes have been increased) relative to the other dynamic icons. In contrast, the flank dynamic icon 16 and eggs dynamic icon 25 of the embodiment shown in FIG. 7 are used less frequently so their sizes have been reduced. In some embodiment, visually biased dynamic icons (e.g., coffee dynamic icon 11 and spaghetti dynamic icon 17) may be referred to as suggested dynamic icons while other dynamic icons (i.e., flank dynamic icon 16, eggs dynamic icon 25, cobb dynamic icon 20) may be referred to as secondary dynamic icons.

In some embodiments, the system visually biases the features of the dynamic icons 5 relative to one another based on a comparison of their transaction data. For example, if the spaghetti dynamic icon 17 in the embodiment shown in FIG. 7 is selected more often than the eggs dynamic icon 25 (or if transaction data processed by one or more back-end servers suggest spaghetti is sold more frequently than eggs), the spaghetti dynamic icon 17 may grow relative to the eggs dynamic icon 25 and the eggs dynamic icon 25 may shrink relative to the spaghetti dynamic icon 17. In some other embodiments, the system may independently bias the features of the dynamic icons 5 without relating them to each other.

In some embodiments of visual biasing, the bias of the dynamic icons may be changed as needed by the system to indicate an item's relative transaction data (e.g., popularity) and not necessarily to indicate the overall transaction data (e.g., the absolute popularity) of an item. For example, grilled chicken 22 and flank 16 dynamic icons in FIG. 7 may still be chosen frequently on an absolute or objective basis, but the pancakes 27, granola 29, and spaghetti 17 dynamic icons 5 may be selected (or sold based on transaction data) relatively more often. Thus, in this example, the pancakes 27, granola 29, and spaghetti 17 dynamic icons 5 may be sized a bit larger than the grilled chicken 22 and flank 16 dynamic icons.

In some embodiments, the dynamic icons 5 and the interface 1 may be scaled to fit the type of display or screen being used. In an example embodiment, the dynamic icons 5 may be proportional to one another such that as one dynamic icon increases in size the remainder of the dynamic icons decrease in size so that all of the dynamic icons take up approximately the same amount of display space as before. Additionally, in some embodiments, the dynamic icons 5 may be configured to overlap one another if they grow sufficiently large, or they may be configured to deflect away from each other so as to avoid overlapping. In some other embodiments, the dynamic icons 5 may be bounded to a certain grid or zone, such that they are not permitted to expand outside of their designated zone. In some embodiments, when a dynamic icon 5 is visually biased to grow to a maximum size for its allocated grid or zone, the remainder of the dynamic icons 5 may be shrunk rather than continuing to increase the size of such visually biased dynamic icon.

Figure 8:
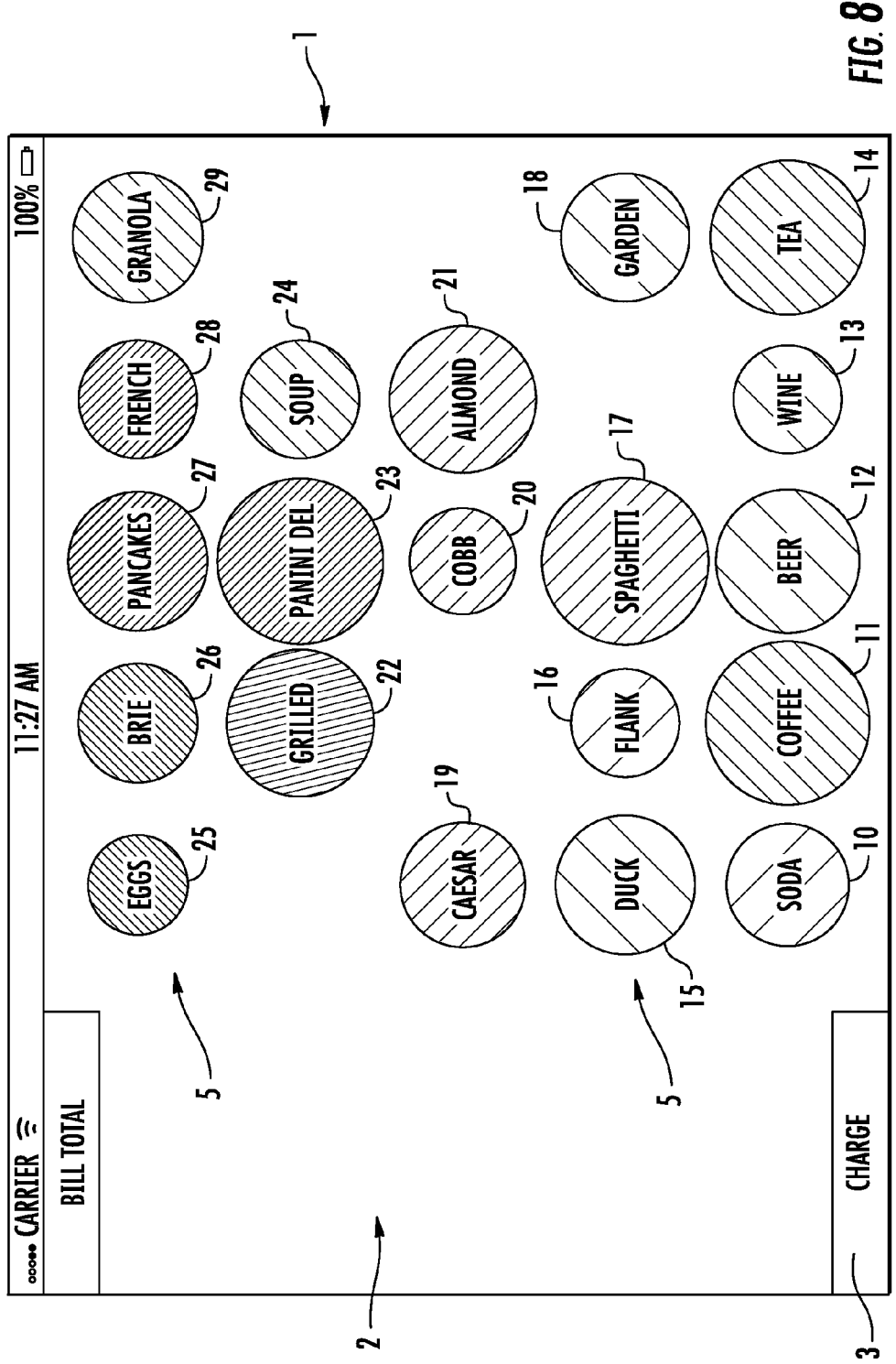
FIG. 8 illustrates the example interface of FIG. 7 having a plurality of dynamic icons depicting transaction data over a two month elapsed time period in accordance with some embodiments discussed herein.
Figure 9:
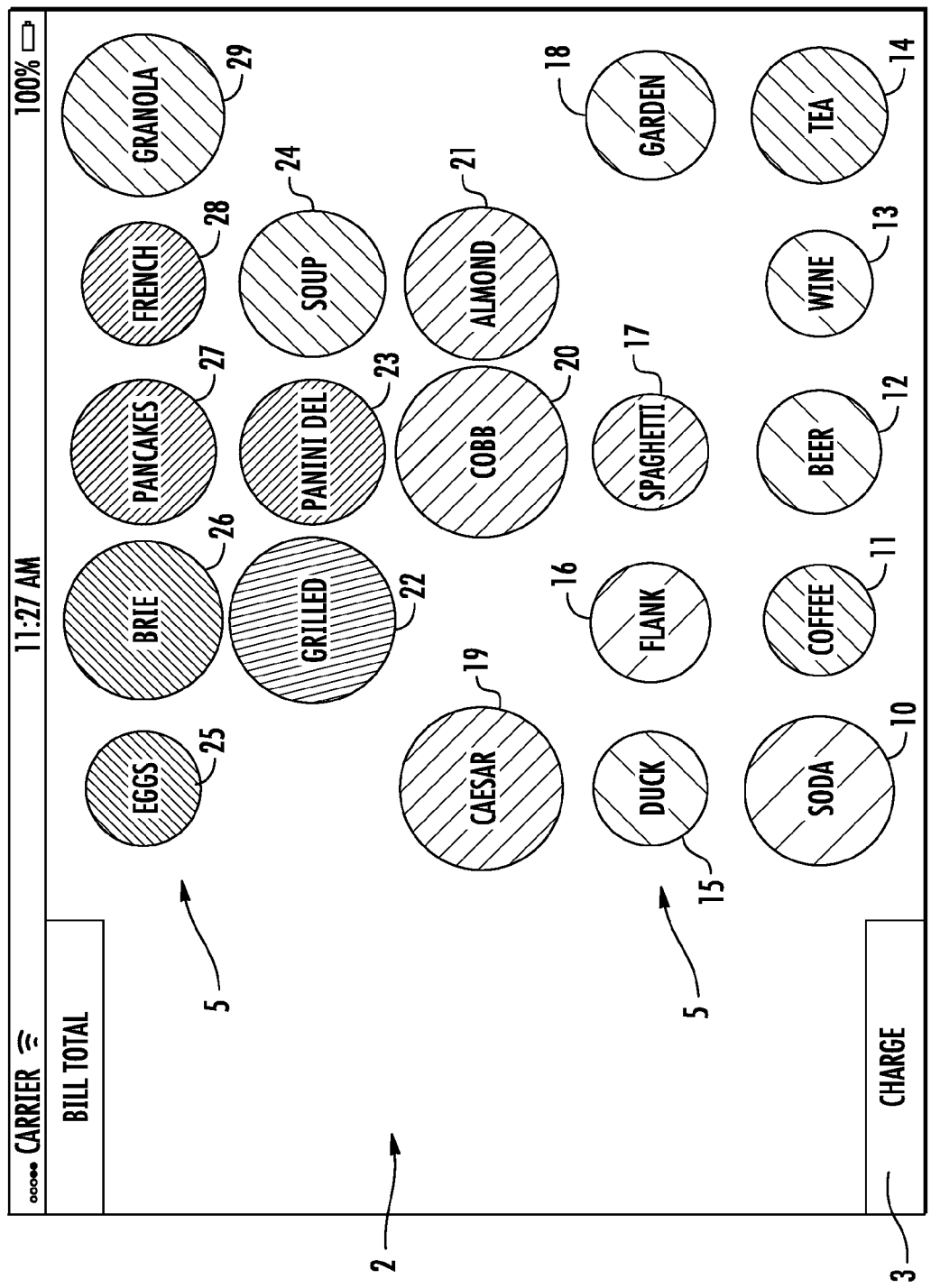
FIG. 9 illustrates the example interface of FIG. 7 having a plurality of dynamic icons depicting transaction data over a one year elapsed time period in accordance with some embodiments discussed herein.

As will be detailed below, the visualizations of the dynamic icons 5 may be biased in any increment or over any time period or set of data depending on interests of the consumer, provider, and/or promotion and marketing service and the specific application. In some embodiments, the biasing may be updated after each selection indication, or alternatively, it may be updated on a transactional or temporal basis. FIG. 7 illustrates the interface 1 of FIG. 1 having visually biased dynamic icons 5 after an exemplary time period of one month. FIG. 8 demonstrates an example interface 1 having visually biased dynamic icons 5 after an exemplary time period of two months. FIG. 9 demonstrates an example interface 1 having visually biased dynamic icons 5 after an exemplary time period of one year.

In the embodiments shown in FIGS. 7-9, the size of each dynamic icon 5 is biased relative to the respective transaction data of the dynamic icons and/or based on item transaction data processed by one or more back-end systems. For example, in these embodiments, the usage rate indicated in the transaction data of wine 13 remained generally constant during the one month period between FIG. 1 and FIG. 7, however, the transaction data of wine 13 dropped during the two month period between FIG. 1 and FIG. 8, and dropped further during the one year period between FIG. 1 and FIG. 9.

In another example, the usage rate indicated in the transaction data of cobb 20 (i.e., cobb salad) remained generally constant during the one month period between FIG. 1 and FIG. 7, however, the transaction data of cobb 20 dropped during the two month period between FIG. 1 and FIG. 8, and then increased during the one year period between FIG. 1 and FIG. 9. An interface may present visually biased dynamic icons based on data from any time period depending on a preference data (contained within the profile data), a predetermined time period, or an automatically determined time period.

Figure 10A:
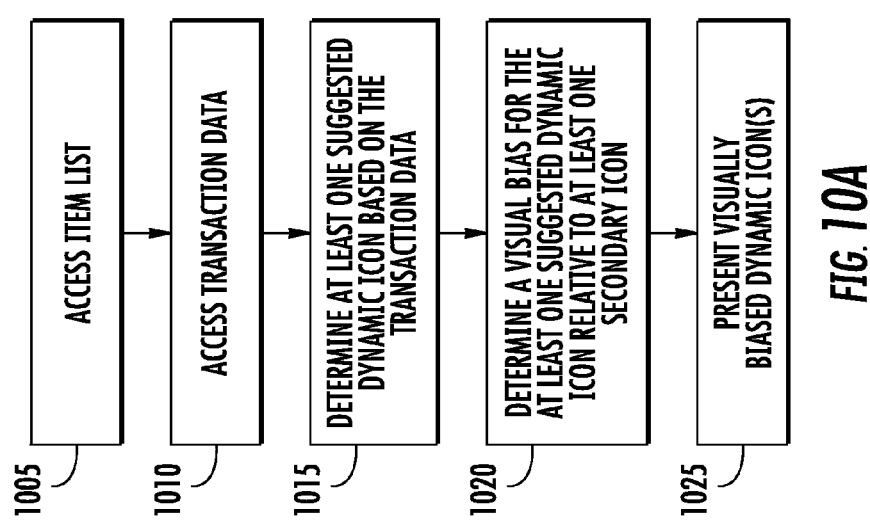
FIG. 10a illustrates a flow diagram of an example system in accordance with some embodiments discussed herein.

With reference to FIG. 10a, a flow diagram of the system described in FIGS. 7-9 is shown. The system may be configured to access the list of available items 1005 to be sold. In some embodiments, the system may then access the transaction data 1010, or more generally, item data (not shown) which contains transaction data, such as a usage rate, and other information about each item being sold. Based on the transaction data, the system may calculate at least one suggested dynamic icon 1015 based on the transaction data. The system may then determine a visual bias for the at least one suggested dynamic icon relative to a secondary icon that is not suggested 1020. The interface may then present the visually biased dynamic icons 1025.

In some embodiments, the system may receive a selection indication from a user, via the interface, and update one or more databases with the selection information. For example, in the embodiment shown in FIG. 11a, the system may access the item list 1105, may access the transaction data associated with the items 1110, may determine at least one suggested dynamic icon based on the transaction data 1115, may determine a visual bias for the at least one suggested dynamic icon relative to at least one secondary icon 1120, and presents the visually biased dynamic icons 1125. Once the icons are presented via the interface, the system may receive one or more selection indications 1130 from the user of one or more dynamic icons. As discussed in greater detail herein, the system may then update the biasing of the dynamic icons based on the selection indication 1135, and may update one or more LUI databases with the selection information 1140.

While the embodiments of FIGS. 7-9, 10a, and 11a depict a visual bias based on transaction data, one of ordinary skill in the art will appreciate that a more complex system, such as a relevance system, may be used. For example, as shown in FIG. 10b, the system may access an item list 1030, and may access the LUI database 1035 to obtain item and/or profile data. Based on the data in the LUI database, the system may determine a relevancy score of each item 1040 using the relevance systems and processes described herein. The system may then determine a visual bias for the dynamic icons based on the relevancy scores 1045 and may present the visually biased dynamic icons 1050.

Figure 11A:
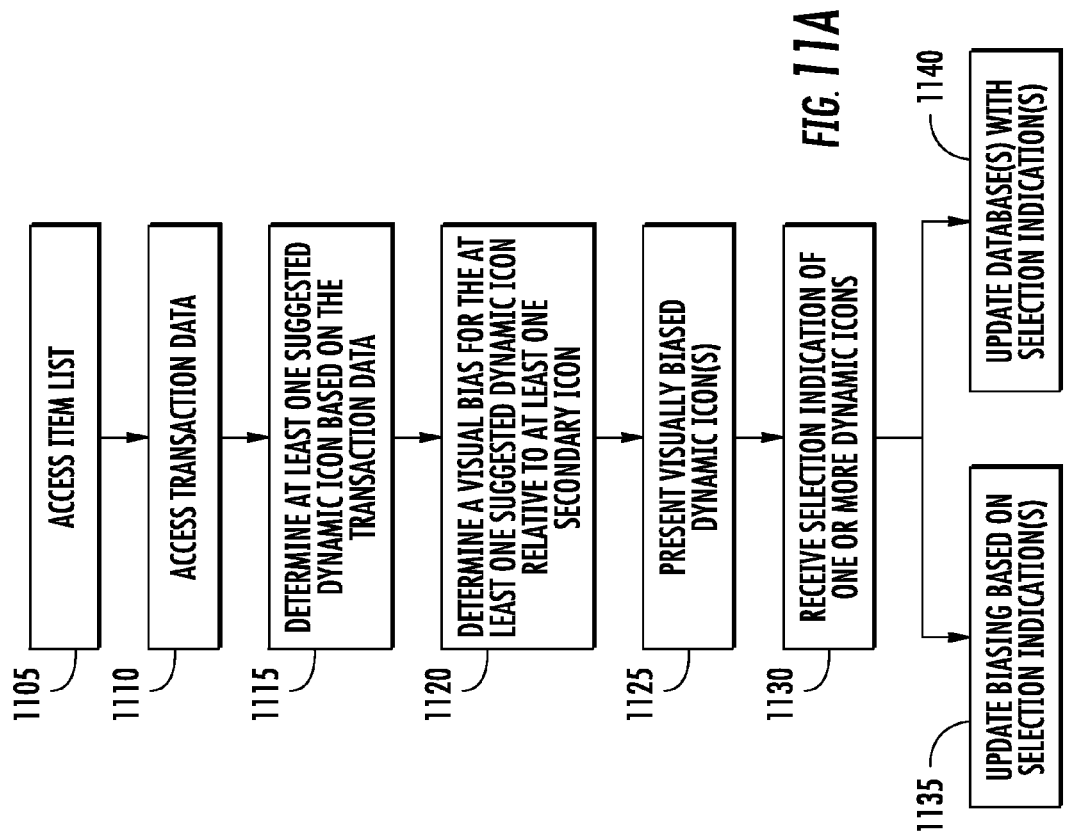
FIG. 11a illustrates a flow diagram of an example system in accordance with some embodiments discussed herein.

As detailed in FIG. 11a with respect to the system of FIG. 10a, the system of FIG. 10b may be configured to receive a selection indication from a user and update a visual bias and/or the database(s) with the selection indication as shown in FIG. 11b. As with FIG. 10b, the system may access an item list 1145, may access a LUI database 1150 to obtain item and/or profile data. The system of FIG. 11b may then determine relevancy scores for each item 1155 and may determine a visual bias for one or more dynamic icons based on the relevancy scores 1160. One of ordinary skill in the art will appreciate that the system may determine relevancy scores of a subset of the total number of items depending on the information being presented and the visible dynamic icons about which information is desired. The system may then present the visually biased dynamic icons 1165 and may receive a selection indication of one or more of the dynamic icons 1170. As discussed in greater detail herein, the system may then update the biasing of the dynamic icons based on the selection indication 1175, and may update one or more LUI databases with the selection information 1180.

While one result of the present invention is the visualization of item or profile data, one of ordinary skill in the art will appreciate that the present invention may also be used to increase user efficiency. For example, in the embodiments shown in FIGS. 7-9, biasing the features of each of the dynamic icons 5 based on the transaction data (or additionally or alternatively item or profile data) of items that are represented by the dynamic icons allows designated or suggested dynamic icons (e.g., the more frequently used as indicated by transaction data) to be more visible and, therefore, easier to access. This allows the user to spend less time searching for and targeting a desired dynamic icon 5 and speeds up the dynamic icon selection process. Biasing the size or any other feature of the dynamic icons 5 based on their relative item data also allows a user to quickly identify the suggested dynamic icons and may provide a visual recommendation to the user, which may speed the item selection process.

Figure 12:
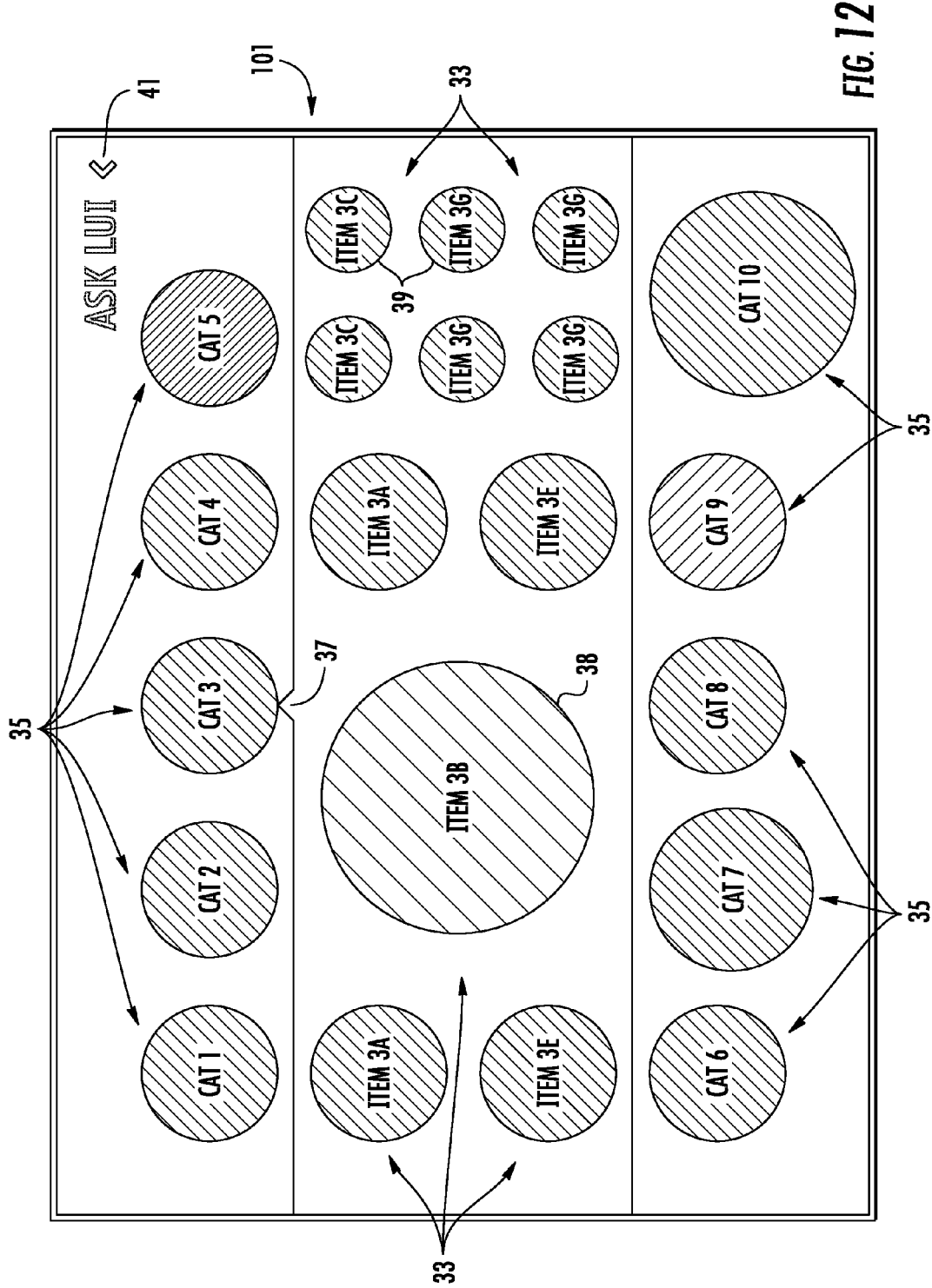
FIG. 12 illustrates an example interface having a plurality of categories and a plurality of items within each category in accordance with some embodiments discussed herein.

The interface 1 may be configured in any layout that suits the needs of the user. An alternative interface 101 embodiment is shown in FIG. 12. The layout of the embodiment shown in FIG. 12 includes a number of categories 35 with a set of dynamic icons 33 listed under each category and an arrow indicator 37 pointing to the currently selected category. In some further embodiments, the size of each category 35 may be biased based on that category's transaction data, which may be determined by the transaction data involving the category itself or transaction data corresponding to the dynamic icons 5 within each category 35, and/or based on transaction data (e.g., sales data, redemption data, inventory data, etc.) processed by a back-end system (e.g., promotion and market system 204, $3^{rd}$ party system 218, and/or provider system 216 of FIG. 2) associated with items represented by the categories and dynamic icons.

In some embodiments, the position of the dynamic icons 33 may be biased by moving the location of the suggested and secondary dynamic icons within the interface based on the item or profile data. For example, in some embodiments, the large dynamic icon 38 (i.e., an example suggested dynamic icon) may generally be positioned proximate the center of the display (i.e., an area of the display that is deemed of highest priority or accessibility to a user based on the device being used) whereas the smaller dynamic icons 39 (i.e., example secondary dynamic icons) may be positioned proximate the outside of the display (i.e., areas that are deemed of lower priority or user accessibility).

In some embodiments, positioning one or more dynamic icons 33 based on underlying suggestions (e.g. determined by item or profile data) may increase the efficiency of the user by making certain suggested dynamic icons more accessible. Placing the suggested or more likely to be selected dynamic icons closer together on the interface may also reduce click time between dynamic icon selections. Additionally, in some embodiments, the position of the dynamic icons 5, 33 may be based on the similarity of the items (e.g., similarity of their item data, such as characteristic information) or their relevant characteristics to better organize the interface. In some embodiments, the groupings of the dynamic icons 5, 33 may be dependent on the characteristics of the items represented that do not necessarily include usage.

In some embodiments, the positioning of the dynamic icons 5, 33 may further take into account the type of input devices used and the preference data of the profile. For example, in some embodiments, more commonly used dynamic icons may be placed closer to the left side of the interface to allow a left-handed user (e.g., as determined based on a user profile stored to a user database of a provider or a promotion and marketing service) to reach them more easily. Alternatively, in some embodiments, the user may be holding a portable device, which is rendering the interface on its display, and may only have one hand available for selecting the dynamic icons. In this regard, the interface may be configured to make the dynamic icons easier to reach by moving them closer to the free hand. In some embodiments, the user may need to stabilize a portable, handheld device when selecting the dynamic icons and the interface may be configured to place the more commonly used dynamic icons closer to the user's support hand to minimize deflection of the device. One of ordinary skill in the art will appreciate that numerous other configurations of the dynamic icons 5, 33 may be contemplated in accordance with various inventive concepts of the present invention.

Multiple Layering

Figure 13:
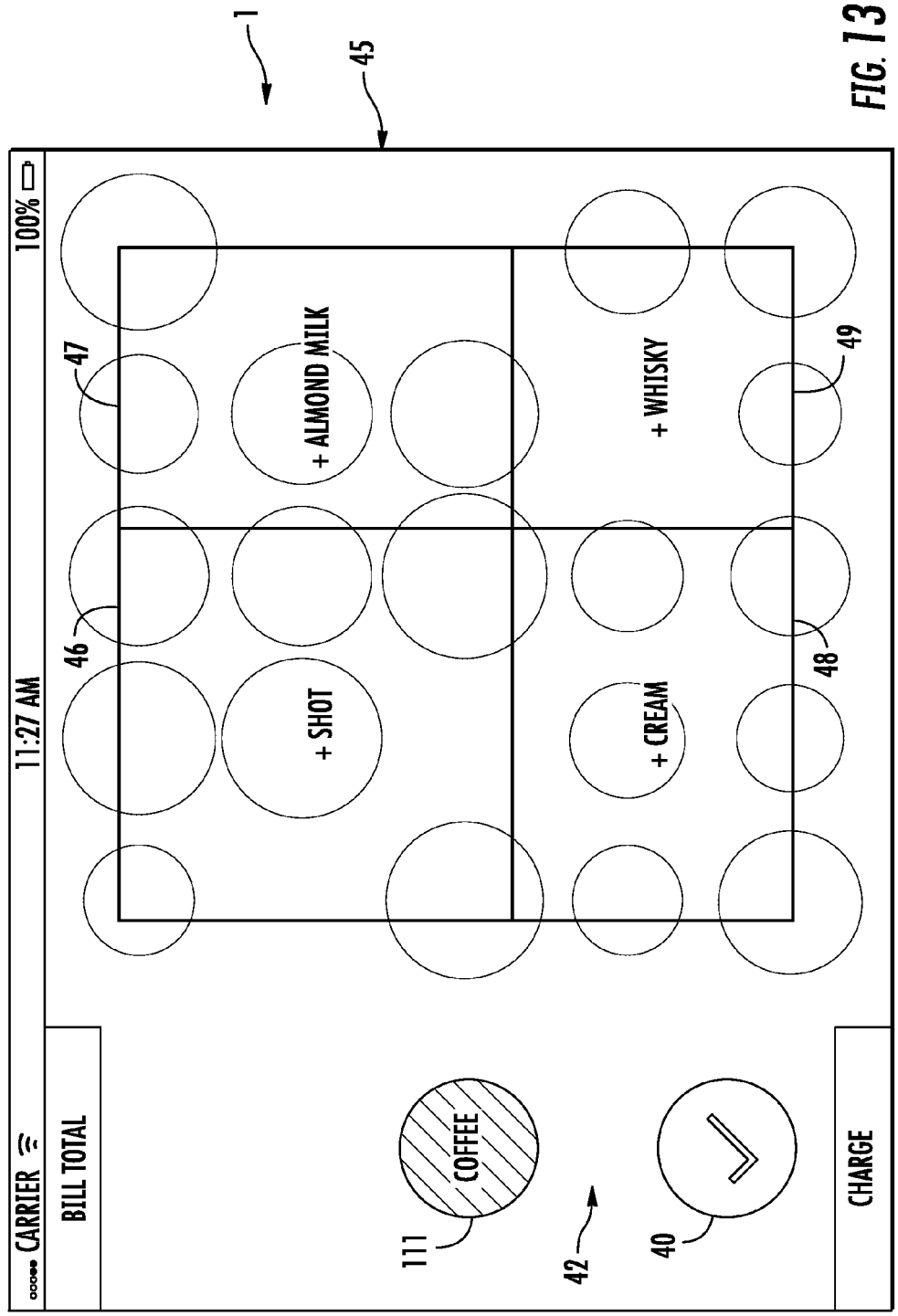
FIG. 13 illustrates an example interface having a secondary layer of dynamic icons in accordance with some embodiments discussed herein.

In some embodiments of the invention, as shown in FIGS. 12-16, the interface may present multiple layers of options for the dynamic icons representing the various items. With reference to FIG. 12, some embodiments may present a layer of dynamic icons 33 associated with (e.g., beneath or between) the categories 35 when a category is selected. With reference to FIG. 13, an example embodiment of one such layer 45 is shown with reference to the coffee dynamic icon 111. In some embodiments, such as the previous embodiments of FIGS. 7-9, when the coffee dynamic icon 11 is selected, a submenu 45 (shown in FIG. 13) of additional options 46, 47, 48, 49 are presented to the user. In the depicted embodiment, the sublayer/submenu 45 includes additional items (e.g., shots, almond milk, cream, whiskey, etc.) that are commonly associated (based on underlying transaction data) with coffee transactions.

In some embodiments, only a portion of the dynamic icons 5 may have a sublayer 45. Some embodiments may present a check dynamic icon 40 to allow the user to close the sublayer 45 once the desired options 46, 47, 48, 49 have been selected.

In some embodiments, only items that require additional choices will present a sublayer 45 to the user. In the embodiment of FIG. 13, the sublayer option dynamic icons 46, 47, 48, 49 are square shaped. However, one of ordinary skill in the art will appreciate that the dynamic icons 46, 47, 48, 49 may have any type of features (e.g., any shape, size, name, color scheme, etc.).

Figure 14:
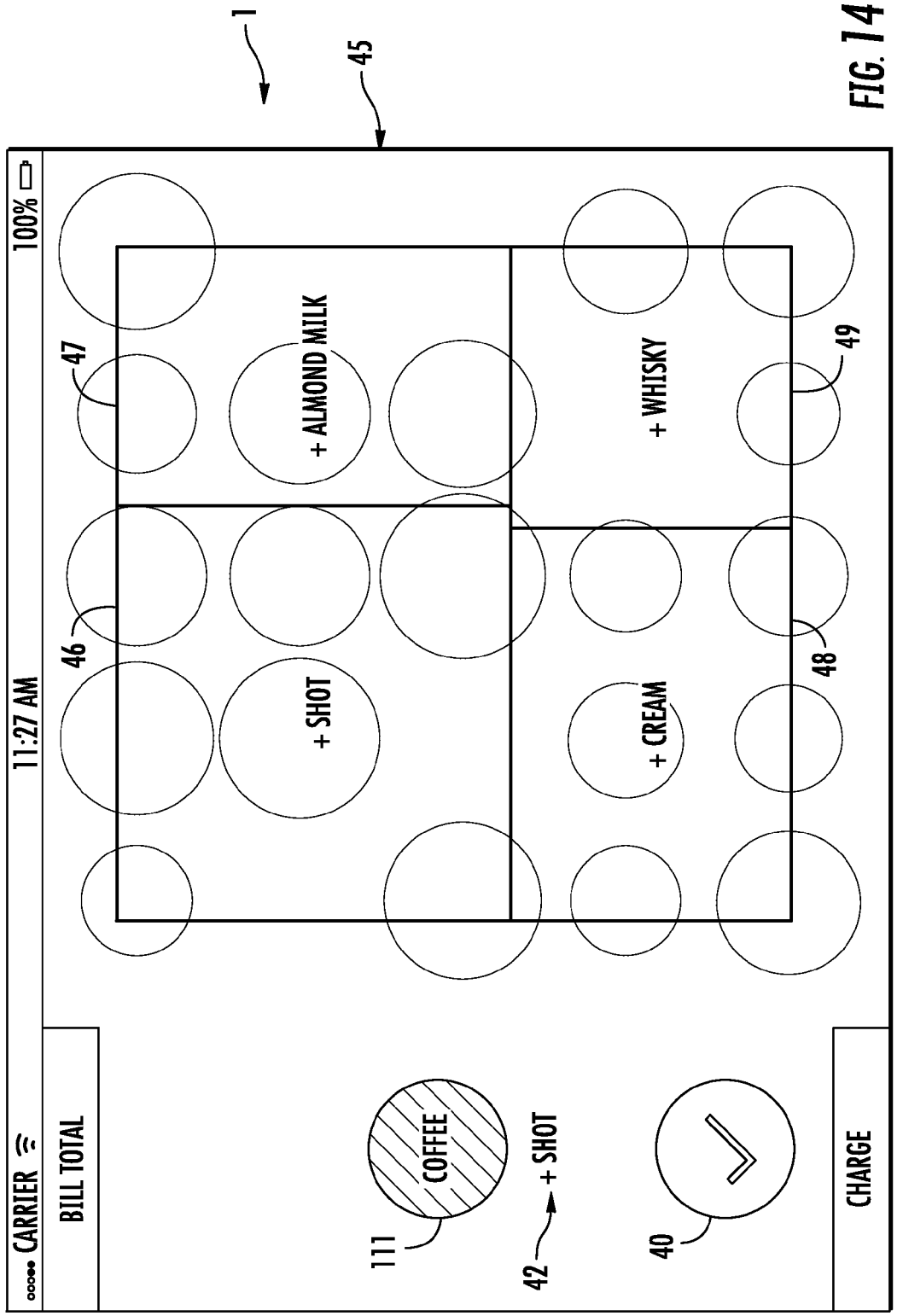
FIG. 14 illustrates the example interface of FIG. 13, wherein one dynamic icon is visually biased in accordance with some embodiments discussed herein.
Figure 15:
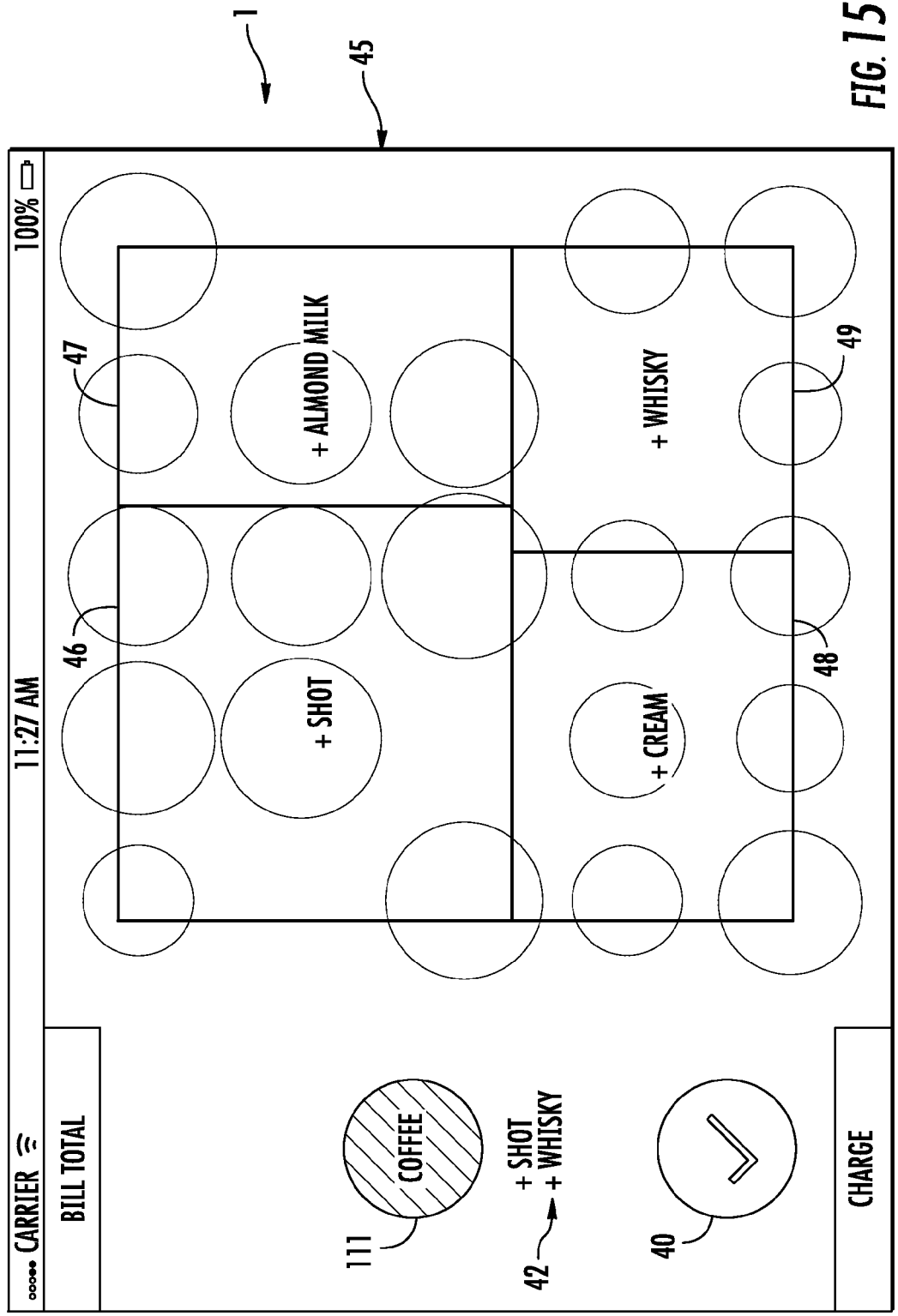
FIG. 15 illustrates the example interface of FIG. 14, wherein another dynamic icon is visually biased in accordance with some embodiments discussed herein.

In some embodiments, such as the embodiments shown in FIGS. 13-15, sublayer options 46, 47, 48, 49 may be visually biased relative to their respective item or profile data (e.g., a usage rate in the transaction data) associated with the underlying items. For example, in the embodiment shown in FIG. 14, the dynamic icon 46 representing a shot has been selected and is indicated in the column 42 to the left beneath the coffee dynamic icon 111. Once the shot dynamic icon 46 is selected, the user interface increases the size (i.e., an example form of visual biasing) of the shot dynamic icon 46 so as to indicate an incremental increase of representative transaction data as compared to the other three dynamic icons 47, 48, 49 that were not selected. In another example, the shot dynamic icon 46 may be similarly increased in size based on a back-end system receiving updated transaction data reflecting increased shot related transactions that are not necessarily related to the user viewing the interface shown in FIG. 13.

With reference to FIG. 15, in some embodiments, when a second dynamic icon 49 is chosen, the second dynamic icon is also visually biased (e.g., increased in size). As was described above with respect to the dynamic icons 5 of FIGS. 7-9, the dynamic icons 46, 47, 48, 49 of some embodiments of the sublayer 45 may change relative to one another or independently based on clicks or selections of the dynamic icons 46, 47, 48, 49 or based on changes in underlying transaction data. In the embodiment shown in FIG. 15, the whisky dynamic icon 49 has expanded into the space of the cream dynamic icon 48 but not into the spaces of the shot dynamic icon 46 and the almond milk dynamic icon 47. This visual change may suggest, based on dynamic icon selection data and/or underlying transaction data, that increased whisky interest or associated transactions tend to come at the expense of cream but not at the expense of shots or almond milk. Likewise, in the embodiment shown in FIG. 15, the shot dynamic icon 46 has expanded into the space of the almond milk dynamic icon 47, but not into the spaces of the cream dynamic icon 48 or the whisky dynamic icon 49. This visual change may suggest, based on dynamic icon selection data and/or underlying transaction data, that increased shot interest or associated transactions tend to come at the expense of almond milk but not at the expense of cream or whisky.

Any combination of relative sizing or other alterations to the features of the dynamic icons may be utilized as part of the visual biasing to convey the desired information to the user. For example, in some embodiments, the shot dynamic icon 46 and almond milk dynamic icon 47 may expand downward in the depicted display. Likewise, in some embodiments, the cream dynamic icon 48 and whisky dynamic icon 49 may expand upward in the depicted display. In FIGS. 13-15, a total outer size is maintained for the four sublayer options 46, 47, 48, 49, however, in some embodiments, the dynamic icons may also expand outward. A person of ordinary skill in the art would appreciate numerous other embodiments of the relative sizing of the depicted dynamic icons. As discussed above, in some embodiments, the visual biasing (e.g. relative sizing) of the dynamic icons 46, 47, 48, 49 may change based on dynamic icon selections and/or underlying transaction data taken over some period of time (e.g., at a refresh rate, by the hour, by the day, by the month, by the year, etc.).

FIG. 16 shows an alternative embodiment of a sublayer 245 where the available modifiers or dynamic icons 246, 247, 248, 249 take up the center of the display without rendering the selected dynamic icon or category (i.e., the coffee dynamic icon shown in FIGS. 13-15), the associated column 42, or check dynamic icon 40 being shown. As will be appreciated by one of ordinary skill in the art in view of this disclosure, the depicted interface embodiment may be particularly suited to mobile or tablet device displays where less display space is available.

Figure 17:
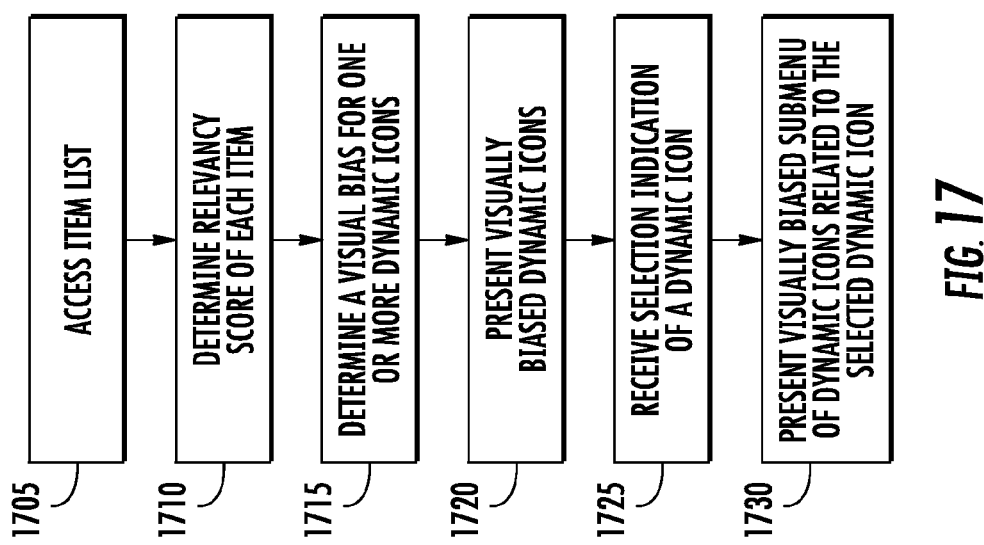
FIG. 17 illustrates a flow diagram of an example system in accordance with some embodiments discussed herein.

In the embodiment shown in FIG. 17, for example, the interface may present a sublayer of options after receiving the selection indication. The system may be configured to access the item list 1705, calculate or receive a relevancy score for each item 1710, determine a visual bias for one or more dynamic icons 1715, which may be based on the relevancy scores, and present the visually biased dynamic icons 1720 representing each item. The system may then receive a selection indication 1725 from a user of a present selection of at least one of the dynamic icons. Based on the selection indication, the system may present a submenu layer of options 1730 related to the selected dynamic icon. In some embodiments, the sublayer's icons may also be visually biased based on their relevancy. Although step 1710 recites determining a relevancy score of each item, alternative embodiments may use one or more sets of data as a simpler and/or alternative source of comparison, including but not limited to transaction data, item data, profile data, etc. as described herein with respect to FIGS. 10*a*, 10*b*, 11*a*, and 11*b*.

Figure 18:
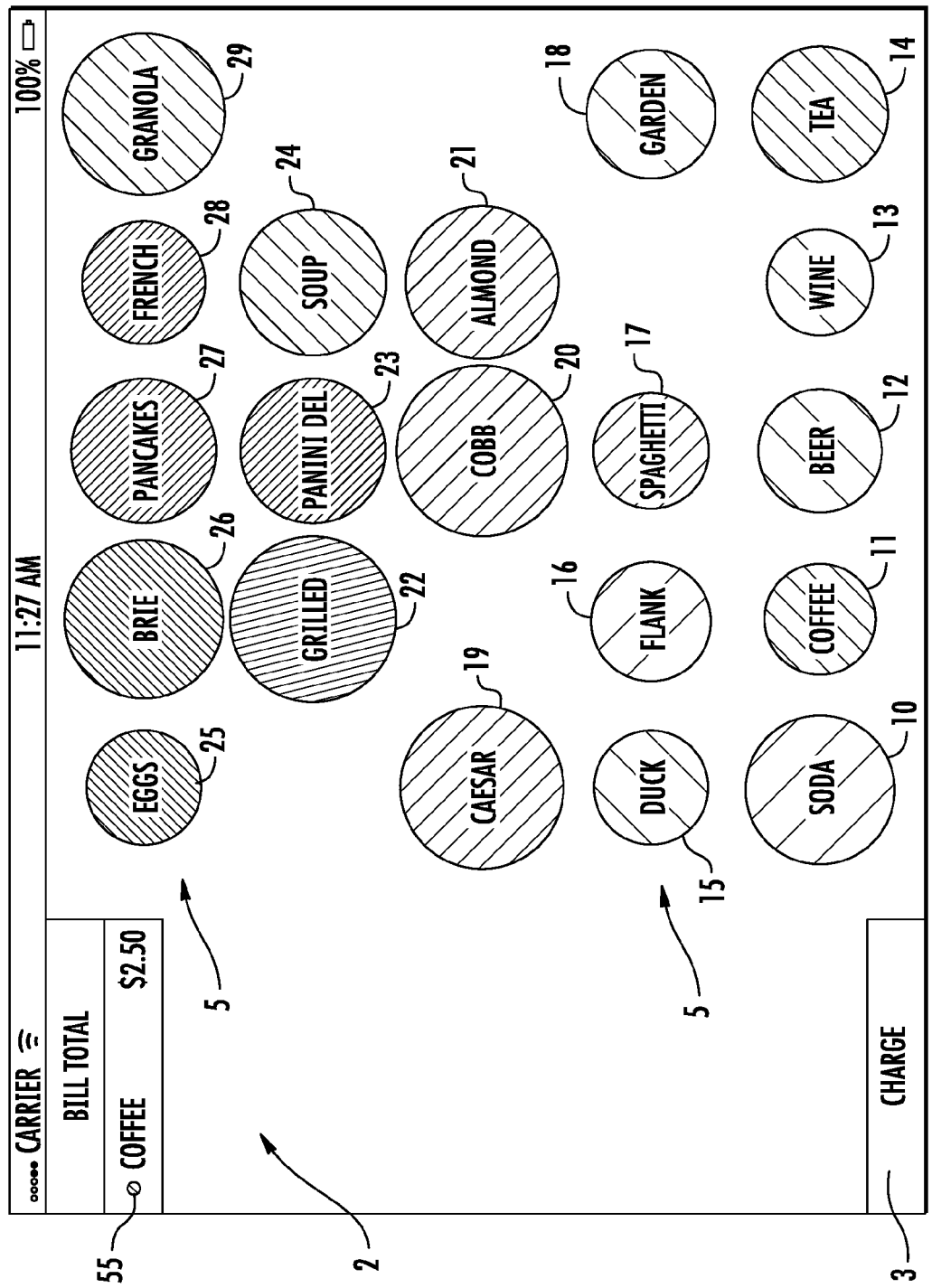
FIG. 18 illustrates an example interface depicting a coffee dynamic icon selected and presented in a present transaction listing column in accordance with some embodiments discussed herein.

With reference to FIG. 18, in some embodiments, the system may also track a bill total or "transaction item listing" in an information column 2. In other embodiments, the transaction item listing may represent a running shopping cart total or similar transaction itemization. In the depicted embodiment, the column 2 does not have to represent a bill total but may be any list of the items that may be of interest to the user. For example, the column 2 in the embodiment shown in FIG. 18 details the items presently selected during the present user transaction. The embodiment of FIG. 18 lists a coffee 55 along with the price of the item as having been chosen in the current transaction. In some embodiments, the data presented by visually biasing the dynamic icons 5 may represent transaction data taken over the long term, e.g., over multiple transactions taken over an extended period of time, while the items listed in column 2 may represent only the currently contemplated transaction.

In some embodiments, column 2 may be positioned anywhere within interface 1 that a user desires and may show any longer or shorter term data that is desired by the user. In some embodiments, column 2 may also be used to depict more detailed information associated with each item represented by the dynamic icons 5 or different types of item and profile data, such as business data (e.g. inventory data or goals) associated with transaction data concerning the items represented by the dynamic icons 5. In some embodiments, column 2 may also include a total price for the presently contemplated transaction and may include a "Charge" dynamic icon 3 or the like to allow the user to complete the transaction. In some embodiments, as shown in FIG. 18, the column 2 may list items in text form, but other visual representations of the transaction, such as the various features of the dynamic icons 5 described above, are also envisioned by the present invention.

Figure 19:
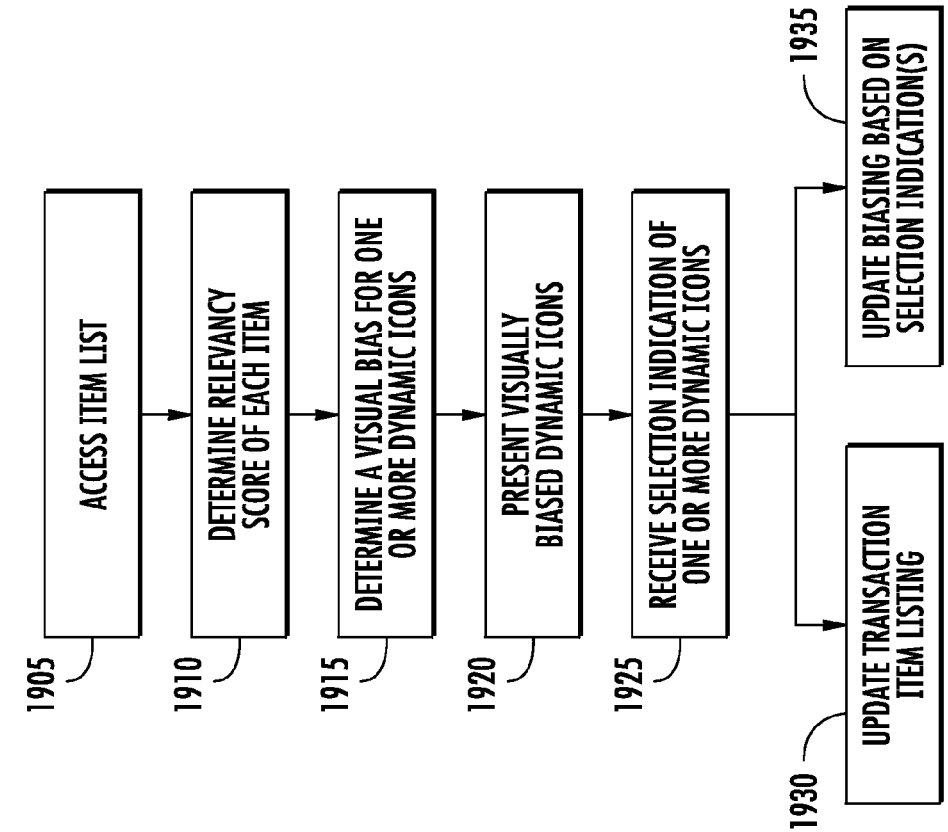
FIG. 19 illustrates a flow diagram of an example system in accordance with some embodiments discussed herein.

For example, in the embodiment shown in FIG. 19, the system may access an item list 1905, determine a relevancy score for each of the items 1910, determine a visual bias for one or more of the dynamic icons 1915, and present visually biased dynamic icons 1920, which may represent the relevancy score of each item. In some embodiments, the system may then receive a selection indication of one or more of the dynamic icons 1925. Based on the selection indication, the interface may then update the transaction item listing 1930 (shown as column 2 in FIG. 18) as well as updating the biasing information 1935 and other LUI databases based on the selection indication. Although step 1910 recites determining a relevancy score of each item, alternative embodiments may use one or more sets of data as a simpler and/or alternative source of comparison, including but not limited to transaction data, item data, profile data, etc. as described herein with respect to FIGS. 10*a*, 10*b*, 11*a*, and 11*b*.

Predictive Sequencing

Figure 20:
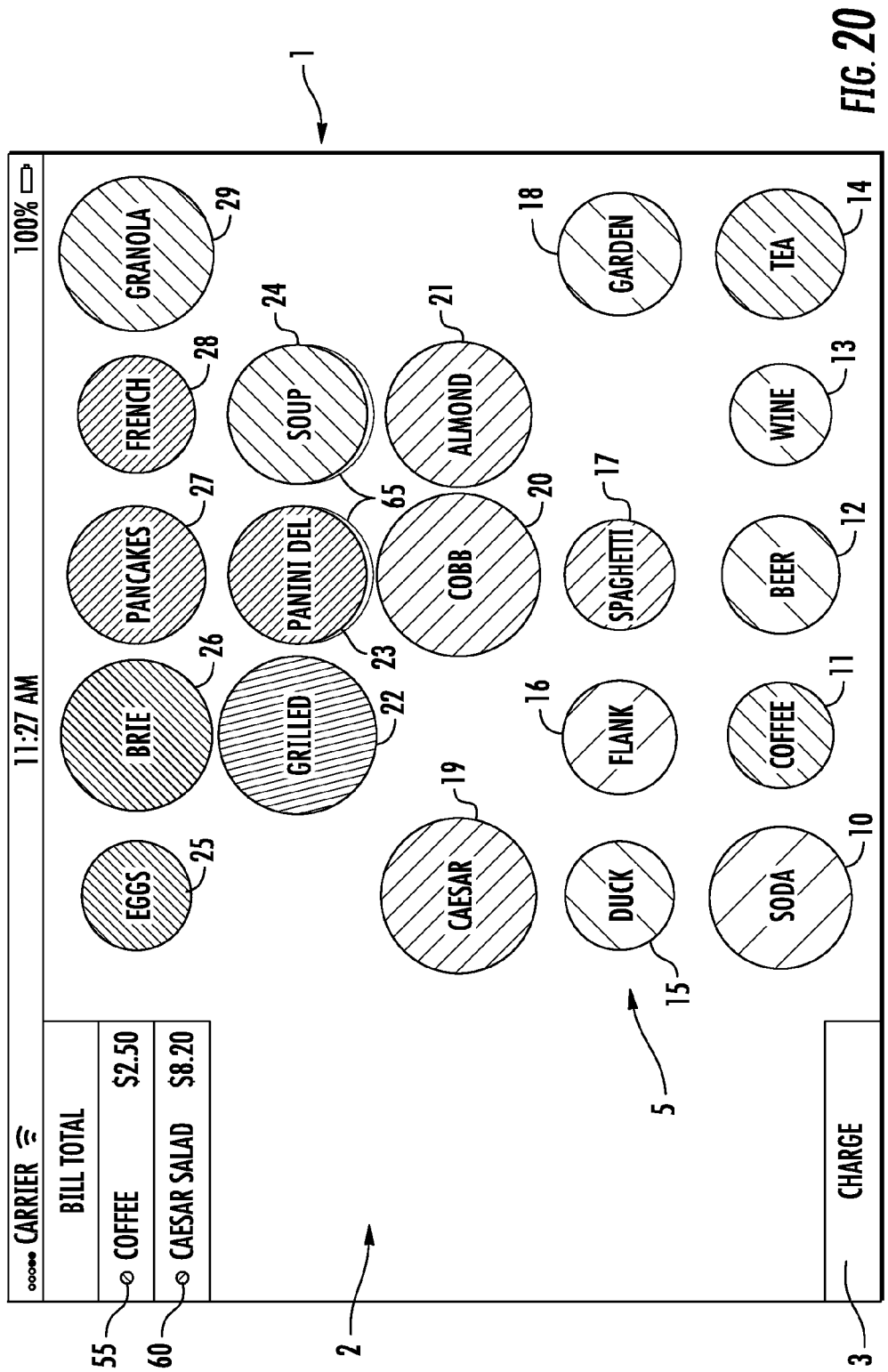
FIG. 20 illustrates an example interface having two dynamic icons shaded to indicate a predictive sequencing in accordance with some embodiments discussed herein.

With reference to FIG. 20, some embodiments of the present invention may visually bias one or more dynamic icons to indicate items that are frequently chosen together by predictive sequencing. For example, in the embodiment illustrated in FIG. 11, when the caesar (e.g., caesar salad) dynamic icon 19 is selected, the bill total in column 2 indicates that a caesar salad was selected and the two dynamic icons for panini 23 and soup 24 are visually biased via shading under the respective dynamic icons. In some embodiments, the predictive sequencing is determined based on a relevancy score and/or transaction data of each item to the selected item. In some embodiments, the shading 65, or other visual biasing, indicates that the panini dynamic icon 23 and soup 24 dynamic icon are frequently chosen after the caesar dynamic icon 19 in the transaction data and/or that underlying transaction data suggests that paninis and soup are commonly purchased with caesar salads in the same transactions.

In some embodiments, the shading 65 is configured so as to not obstruct the interactive flow of the device and the interface while yet indicating to the user, in an intuitive fashion, dynamic icons 5 that are frequently selected and/or items that are frequently purchased in conjunction with or in sequence with a currently selected item as represented by the transaction data. While the embodiment shown in FIG. 20 depicts shading 65 as an indicator of item association, the interface may use any visual biasing, permanent or temporary, such as a visual indication or changing a feature or common feature of one or more dynamic icons as detailed above in order to attract the user's attention.

Figure 21:
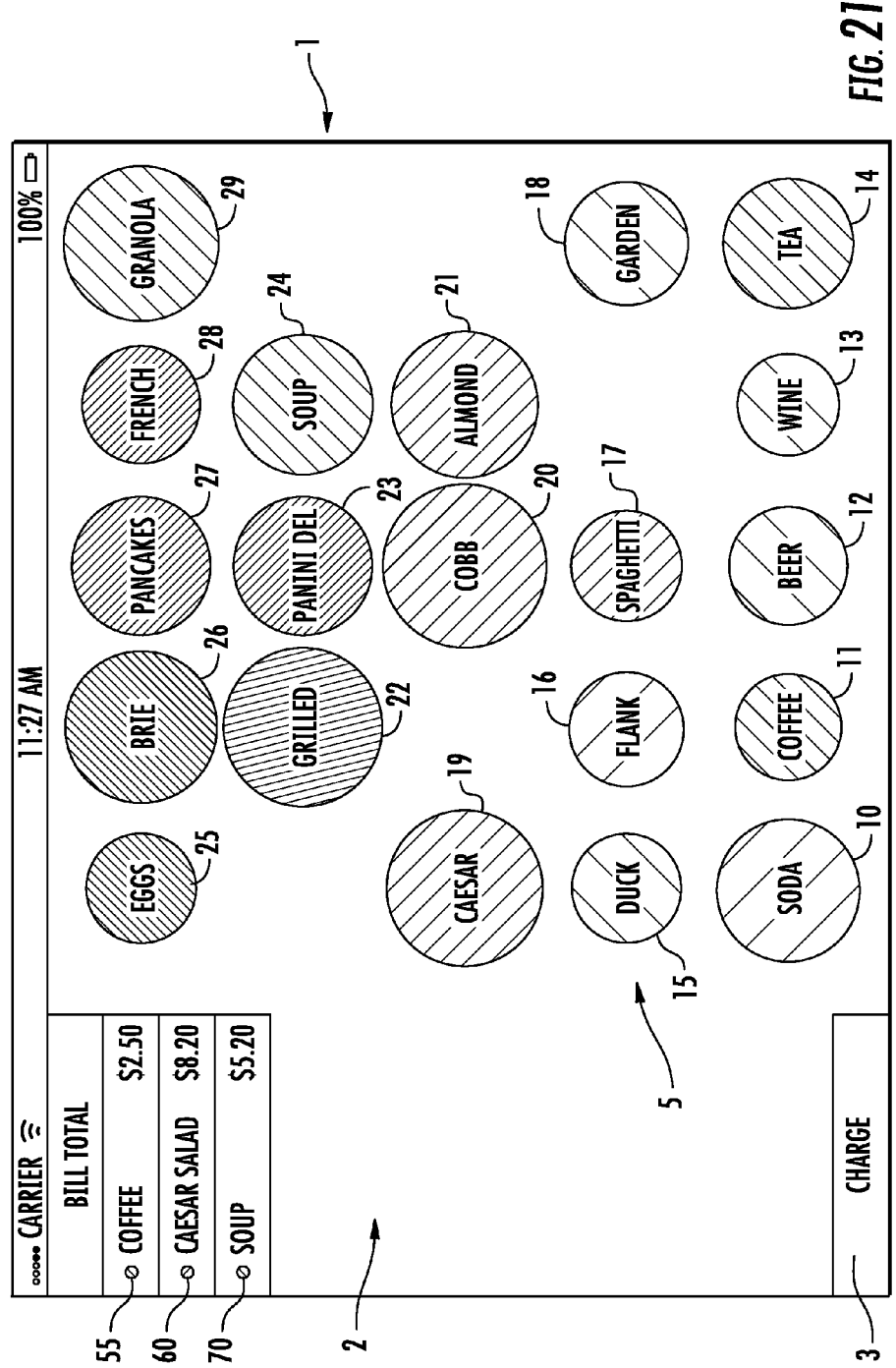
FIG. 21 illustrates the example interface of FIG. 20 having a soup dynamic icon selected and indicated in the present transaction listing column in accordance with some embodiments discussed herein.

Once the predictive sequencing has been presented by visually biasing one or more dynamic icons and a subsequent icon chosen, some embodiments of the interface 1 may present the dynamic icons 5 in their original state (e.g., non-shaded) as shown in FIG. 21. In the depicted embodiment, the soup dynamic icon 24 is selected after the caesar dynamic icon 19 and both items 60, 70 are listed in the bill total column 2. Some embodiments then remove the shading 65 or other visual biasing (shown in FIG. 20 but not in FIG. 21) from beneath the panini dynamic icon 23 and the soup dynamic icon 24, because the predictive sequence visualization has terminated or been deemed no longer of interest. In some embodiments, if a predicted item 23, 24 is not chosen immediately after a triggering item 19, the shading 65 or emphasis associated with such predicted items disappears. In other embodiments, the shading 65 or other visual biasing may remain for the duration of the transaction. In some embodiments, the duration of the predictive sequence may be user selectable, selectable by the provider or the promotion and marketing service, or programmatically determined for the interface 1 based on item and/or profile data.

An example flow diagram of the predictive sequencing is shown in FIG. 22. With reference to FIGS. 22-23, the system may be configured to access an item list 2205, 2305, determine a relevancy score for the items 2210, 2310, determine a visual bias for one or more of the dynamic icons based on the relevancy scores 2215, 2315 and present the visually biased dynamic icons 2220, 2320. The system may then receive a selection indication of a dynamic icon from the user 2225, 2325, and based on the selected icon (and the item represented by the icon) suggest one or more items via predictive sequencing 2230, 2330. In some embodiments, the suggested items are chosen by determining a relevancy of each item to the selected item 2230, 2330. The user may then select the suggested item(s) 2235, 2335 or another, non-suggested item 2240, 2340 in the system. With reference to FIG. 23, in some embodiments, when the user selects the dynamic icon representing one of the suggested items 2335, the predictive sequencing may be updated 2345 to present another item in the sequence. Alternatively, in some embodiments, if the user selects a non-suggested dynamic icon representing a non-suggested item 2340, the predictive sequence may terminate 2350. Although step 2210 of FIG. 22 and step 2310 of FIG. 23 recite determining a relevancy score of each item, alternative embodiments may use one or more sets of data as a simpler and/or alternative source of comparison, including but not limited to transaction data, item data, profile data, etc. as described herein with respect to FIGS. 10a, 10b, 11a, and 11b.

In some embodiments, an example system may be configured to present a predictive sequencing of items without a user first selecting a dynamic icon 5. For example, in some embodiments, a user may request pairing suggestions via an input/output module (e.g., touch display, keyboard, etc.) as described below, or the system may automatically display relevant pairings or sequences. For example, if the caesar dynamic icon 19 and the soup dynamic icon 24 are frequently chosen together (or the underlying items are generally purchased together based on transaction data), the interface 1 may indicate their relatedness by presenting their features to be similarly biased. For example, the dynamic icons may be presented with similar visual biasing or may be biased in close proximity to one another within the interface 1.

The frequency of selection in the transaction data that is required to trigger the predictive sequencing between two dynamic icons 5 can be any threshold or percentage of dynamic icon selections. In some embodiments, the predictive sequencing considers how many times two or more dynamic icons have been selected in the same transaction and/or how many times two or more underlying items have been redeemed or purchased together based on transaction data. In other embodiments, the system or device may consider the number of times one dynamic icon (for example, the soup dynamic icon 24) is selected immediately after another dynamic icon (for example, the caesar dynamic icon 19) to generate the sequencing.

In some embodiments, two or more dynamic icons may be suggested together via predictive sequencing after they have been chosen together a predetermined number of times and/or after their underlying items have been purchased or redeemed together a predetermined number of times based on underlying item transaction data.

In some embodiments, a predetermined threshold may be based on a percentage. For example, in some embodiments, any dynamic icon 5 that is chosen 10% or more times after another dynamic icon 5 will generate a predictive sequence. Likewise, any item that is purchased or redeemed with another item in at least 10% of corresponding transactions may also generate a predictive sequence.

In another embodiment, a dynamic icon that is chosen with a second dynamic icon a certain percentage (e.g., 15%) more than any other dynamic icon may be recommended via predictive sequencing. Similarly, an item that is purchased or redeemed with another item a certain percentage more often may produce a predictive sequencing. In some embodiments, a dynamic icon 5 that is chosen more frequently with a second dynamic icon 5 than any other pairing with that second dynamic icon 5 may be recommended. In addition, in some embodiments, and as shown in FIGS. 20-21, multiple dynamic icons 23, 24 may be recommended in connection with a single dynamic icon 5 (for example, the caesar dynamic icon 19) or multiple other dynamic icons 5. A person of ordinary skill in the art may appreciate that any distinguishing relationship between two dynamic icons, or underlying item transaction data, may trigger the predictive sequencing, and that the relative selection rates may be obtained from transaction data taken from a remote device and not necessarily a specific interface.

Figure 24:
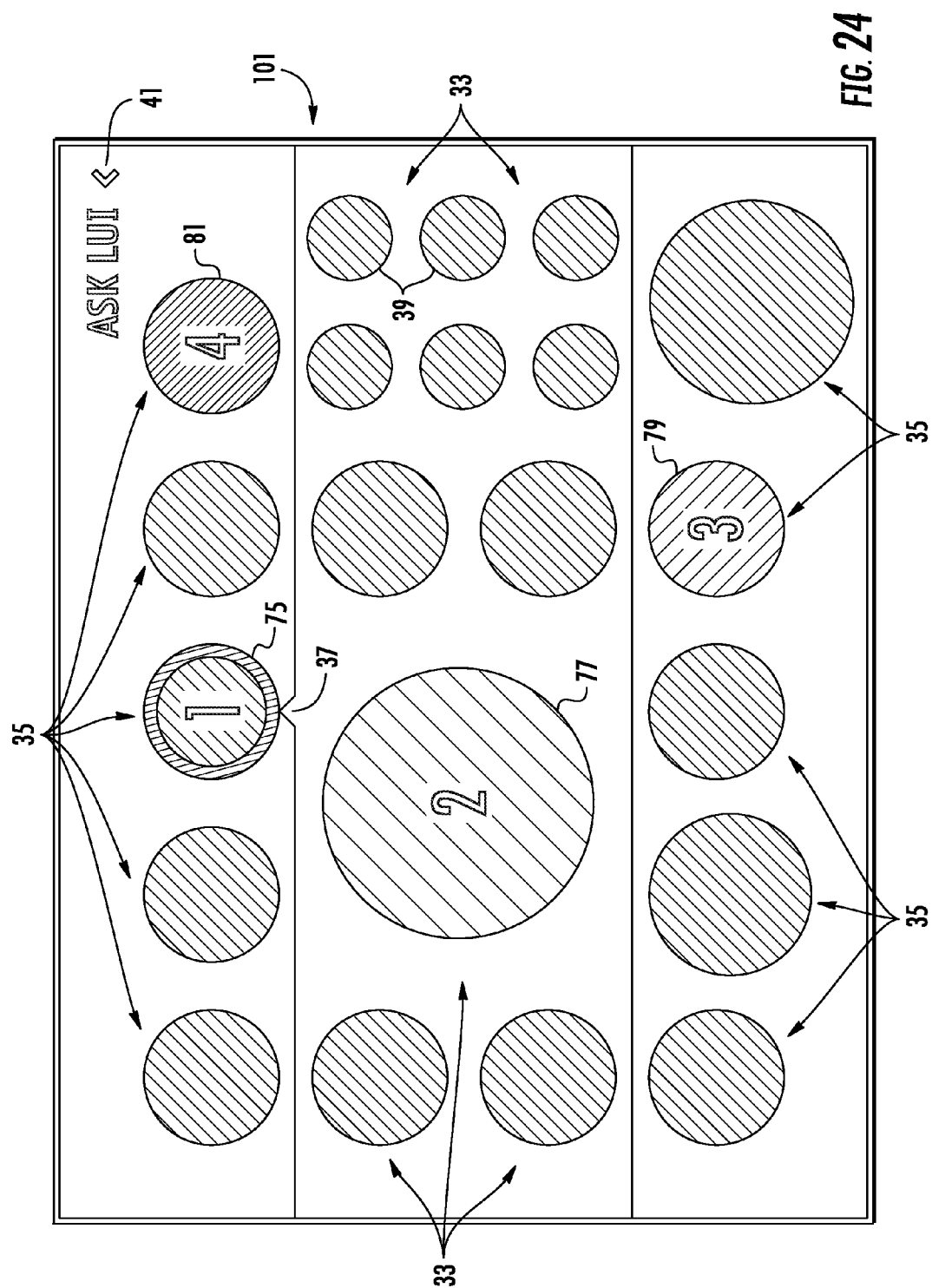
FIG. 24 illustrates an example interface having four dynamic icons altered to indicate a predictive sequencing in accordance with some embodiments discussed herein.

With reference to FIG. 24, some embodiments of the present invention may give a more detailed predictive sequencing. For example, the depicted embodiment uses the categories 35 and the individual dynamic icons 33 within each category to illustrate relative selection frequency within the predictive sequencing based on the transaction data. In the depicted embodiment, dynamic icons associated with each of the three categories 75, 77, 79 are presented proximate different and alternating background colors.

In some embodiments, when a first category 75 is selected, the interface 101 may be configured to present the second 77, third 79, and forth 81 most commonly chosen dynamic icons after that category 75 is chosen. For example, in some embodiments, the third category 79 is frequently chosen after the first category 75 but typically not as often as the second dynamic icon 77. The fourth category 81 is chosen with the first category 75, but not as often as the other two 77, 79. In this way, the interface 101 may be configured to indicate the relative frequencies of with which each option (e.g., dynamic icon) is selected relative to a first selected dynamic icon by an intuitive visual representation. In the depicted embodiment, the frequency of dynamic icon selection is indicated by biasing the dynamic icon size (e.g., dynamic icon 77 is larger than dynamic icons 79, 81) and dynamic icon shading (e.g., dynamic icon 77 is darker than dynamic icons 79, 81); however, any other feature may be biased as will be apparent to one of ordinary skill in the art in view of this disclosure.

In an alternative embodiment, multiple subsequent steps of the sequential pattern may be shown by differences in visualization of the features of the respective dynamic icons 33 based on the differences in the transaction data for the respective items. For example, in the embodiment shown in FIG. 24, the second dynamic icon 77 may be picked most frequently after the first category 75 and is presented as the darkest shade. In some further embodiments, the item typically selected after the second dynamic icon 77 is presented as the next darkest shade, such as the third category 79 in FIG. 24. And in some further embodiments, the item most commonly selected after the third category 79 is presented as the next darkest shade, such as the fourth category 81 in FIG. 24. Thus, in some embodiments, the first dynamic icon 75 may be chosen by the user and, subsequently, the interface 101 may be configured to generate a suggested list of the next three sequentially chosen options 77, 79 and 81 may be further configured to suggest visually that the user then pick the second dynamic icon 77, followed by the third dynamic icon 79, and then followed by the fourth dynamic icon 81. As discussed above, with reference to FIG. 23, the system may terminate the predictive sequencing 2350 if one of the suggested items is not chosen.

The system may be configured to suggest multiple subsequent steps flowing from each dynamic icon selection based on a dynamic icon selection pattern, based on the transaction data, typically chosen for each item by sequentially visually biasing the dynamic icons. In some embodiments, the dynamic icon selection patterns suggested by the system may be relative to the first item selected, meaning the subsequent three items 77, 79, 81 are the most common sequence of three chosen after the first item. In other embodiments, the presented sequence may be generated pairwise as the most commonly selected item after each preceding item in the sequence, meaning the second dynamic icon 77 is frequently associated with the first dynamic icon 75, the third dynamic icon 79 is frequently associated with the second dynamic icon 77, and the fourth dynamic icon 81 is frequently associated with the third dynamic icon 79. In this last embodiment, there need not be any relationship or frequency between the first dynamic icon 75 selection and the fourth dynamic icon 81 selection so long as the intermediate items in the sequence connect them.

While the above dynamic icon selection sequences and correlations are based on dynamic icon selection patterns for illustration purposes, one of ordinary skill in the art will readily appreciate that such sequences may be similarly based, alone or in combination with item data or profile data patterns. In addition, one of ordinary skill in the art will appreciate that visually biasing any number or combination of features or visual indications of dynamic icons may be used to indicate the predictive sequencing.

Data Filtering

Figure 25:
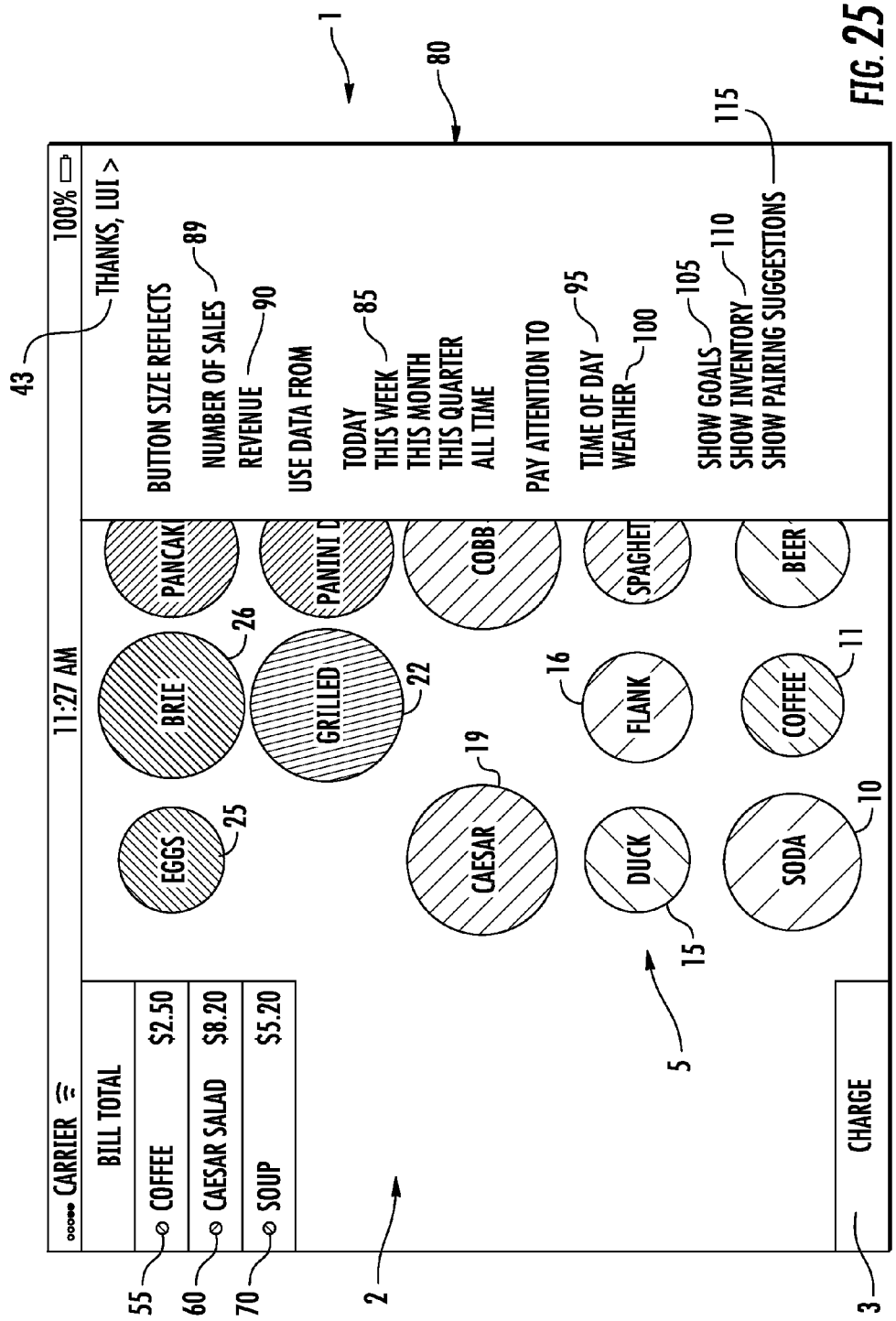
FIG. 25 illustrates an example interface having a control panel in accordance with some embodiments discussed herein.

With reference to FIG. 25, some embodiments of the present invention may present a control panel 80 that provides options for the user to configure the interface 1. In some embodiments, the user may open and close the control panel 80 by verbal command, gesture, tactile dynamic icon, on-screen dynamic icon (e.g., soft key), or other types of input indications that may be facilitate by an input/output module.

In one embodiment, the interface 1 may be configured with an "Ask Lui" dynamic icon 41 (shown in FIG. 12) that, when selected by the user, causes the interface to present the control panel. In the depicted embodiment, the control panel 80 is configured with a "Thanks, Lui" or "Thx, Lui" dynamic icon 43 that is adapted to close the control panel.

In some embodiments, the system may be configured to filter the data presented by the dynamic icons 5 to suit the needs of the user, and the control panel 80 may be configured to present the user with specific options to narrow or alter the data that the interface is configured to visually represent. In some embodiments, the filtering process may bias the dynamic icons based on a user request and/or the relevancy information relating to that user request, as explained in further detail below. Some embodiments of the present invention may automatically filter the data based on previous selections by the user or based on calculated factors that are most relevant to a given user.

Figure 26:
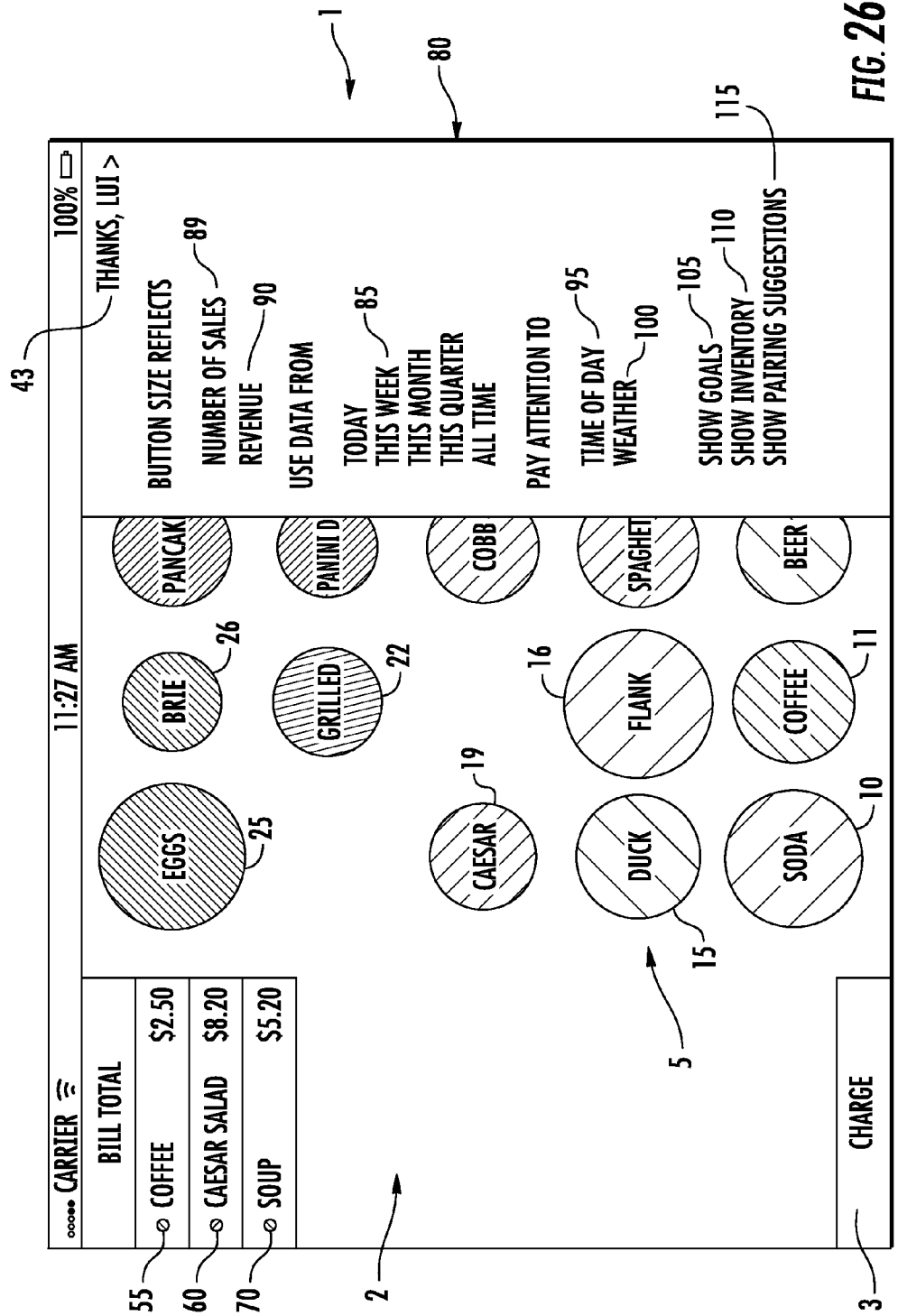
FIG. 26 illustrates the example interface of FIG. 14, wherein a "This Week" option has been selected in accordance with some embodiments discussed herein.

In some embodiments, with reference to FIG. 25, the size of the dynamic icons, or other visual biasing of the dynamic icons presented by the interface may represent total sales data 89 (e.g., all time) associated with an item based on the item data. However, with reference to FIG. 26, some embodiments of the present invention may allow the user to filter the represented data (here, sales data 89) based on a specified time period or other criteria. For example, FIG. 26 represents a selection by the user of a "this week" 85 filter within the control panel 80. The system has been thus configured to adjust the sizing of various dynamic icons based on a subset of sales data for the given week rather than the prior sizing, which was based on all time sales data. While re-sizing of the dynamic icons is shown for illustration purposes, any other feature modification of the dynamic icons may be used as will be apparent to one of ordinary skill in the art in view of this disclosure.

As described herein, in some embodiments, the system may visually bias the dynamic icons based on information other than only the transaction data. For example, with reference to FIG. 27, the system may bias the plurality of dynamic icons 2720, 2725 representing the items 2705 based on environmental data 2710, including information such as time period, weather, location, etc. The relevancy score 2715 of the items 2705 may be determined based on this environmental data. Although step 2715 recites determining a relevancy score of each item, alternative embodiments may use the environmental data or a subset thereof as a source of comparison as described herein with respect to the transaction data of FIGS. 10a, 10b, 11a, and 11b.

Likewise, the system may receive a profile identifier 2810 as discussed herein and shown in FIG. 28. The system may then be configured to access profile data 2815 associated with the profile identifier. The system may bias 2825 the plurality of dynamic icons 2830 base on the relevancy score 2820 based on the profile identifier 2810. Although step 2820 recites determining a relevancy score of each item, alternative embodiments may use the profile data, or transaction data associated with the profile data as a source of comparison as described herein with respect to the transaction data of FIGS. 10a, 10b, 11a, and 11b.

In some embodiments, a user may select between various predetermined time period filters (e.g., today, this week, this month, this quarter, all time) that are generated and presented based on the typical usage of the program and the desires of the user. In other embodiments, the system may be configured to automatically filter the data based on a relevant time period without requiring user input.

Figure 29:
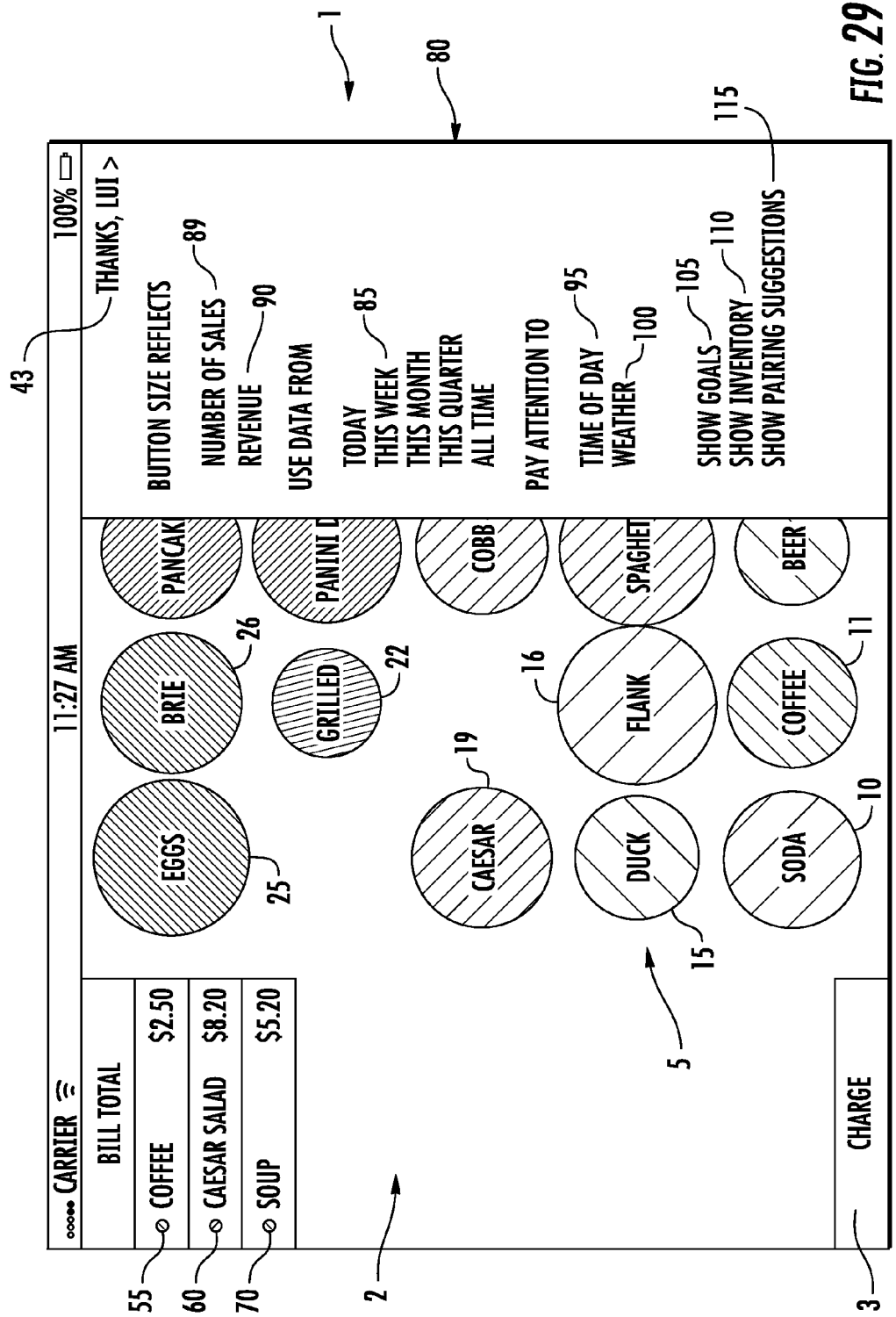
FIG. 29 illustrates the example interface of FIG. 15, wherein a "Revenue" option has been selected in accordance with some embodiments discussed herein.

In some embodiments, and with reference to FIG. 29, the control panel 80 may be configured to allow a user to select the type of data represented by the dynamic icons 5. In the example embodiments shown in FIGS. 25-26, the size or other visual biasings of the dynamic icons 5 represents the number of the total sales 89 of each item represented by the respective dynamic icons for the respective time periods noted in control panel 80. However, the dynamic icon sizes illustrated in the embodiment of FIG. 29 reflects the revenue 90 (e.g., revenue to the provider, revenue to the promotion and marketing service, etc.) generated by each item over a desired time period. In some embodiments, a system may be configured to allow a user to filter the dynamic icon represented data based on time of day 95, weather 100, or other environmental conditions as discussed herein. Any subset of the item or profile data may be selected from the control panel 80.

Figure 30:
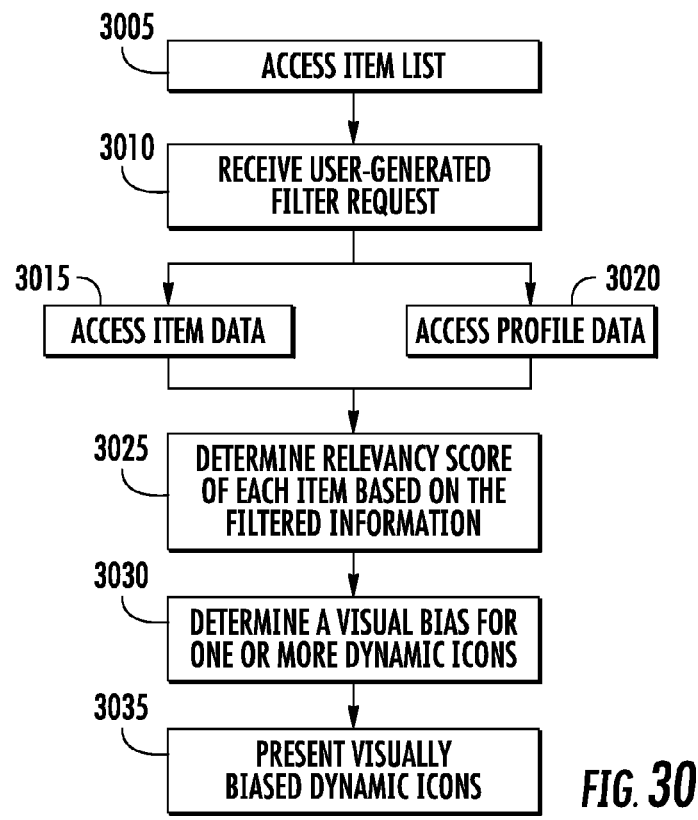
FIG. 30 illustrates a flow diagram of an example system in accordance with some embodiments discussed herein.

With reference to FIG. 30, in response to a user-request to filter the data 3010, the system may access various item 3015 and profile 3020 data. In some embodiments, the system may then determine a relevancy score 3025 for each item 3005 based on the filtered information, determine a visual bias for one or more of the dynamic icons 3030, and/or present visually biased dynamic icons 3035 representing the information desired by the user. Although step 3025 recites determining a relevancy score of each item, alternative embodiments may apply a more simple filter to one or more sources of data, including but not limited to the profile data and item data, as a source of comparison as described herein with respect to the transaction data of FIGS. 10a, 10b, 11a, and 11b.

In the embodiments shown in FIGS. 25, 26, and 29, the interface may be configured to visually bias the dynamic icons to show other item data or profile data such as a business data including, for example and without limitation, goal data 105 (e.g., sales goals, impression goals, redemption goals, etc.), inventory data 110, or pairing suggestion 115 information. In some embodiments, the goal data is determined by goal identifications, which may be received from a user, a provider, a consumer, promotion and marketing service, or any outside source. In some embodiments, a goal identification is a signal received by the system from a provider goal selection, wherein the provider indicates a goal for a particular item. Some embodiments allow a user to visualize goals 105 through the system that are predetermined or calculated targets for each item. As will be described in greater detail herein, the goals of some embodiments may be shown by visually biasing the features of the dynamic icons 5 or by biasing a secondary indicator, such as a ring 147 (shown in FIG. 41). Similarly, in some embodiments, the system may be configured to display inventory 110 information associated with each item represented by the respective dynamic icons by either biasing the features of the dynamic icons or by biasing a secondary indicator, such as a ring 147 (shown in FIG. 41). In some embodiments, the business data may be decremented or incremented based on a selection indication from a user. For example, upon receiving a selection indication of one of the dynamic icons, the system may decrement an inventory, goal, or other business data to reflect the selection. The business data may be shown using the standard visual biasing techniques described herein, or may be presented via a secondary indicator, as discussed below.

Figure 31:
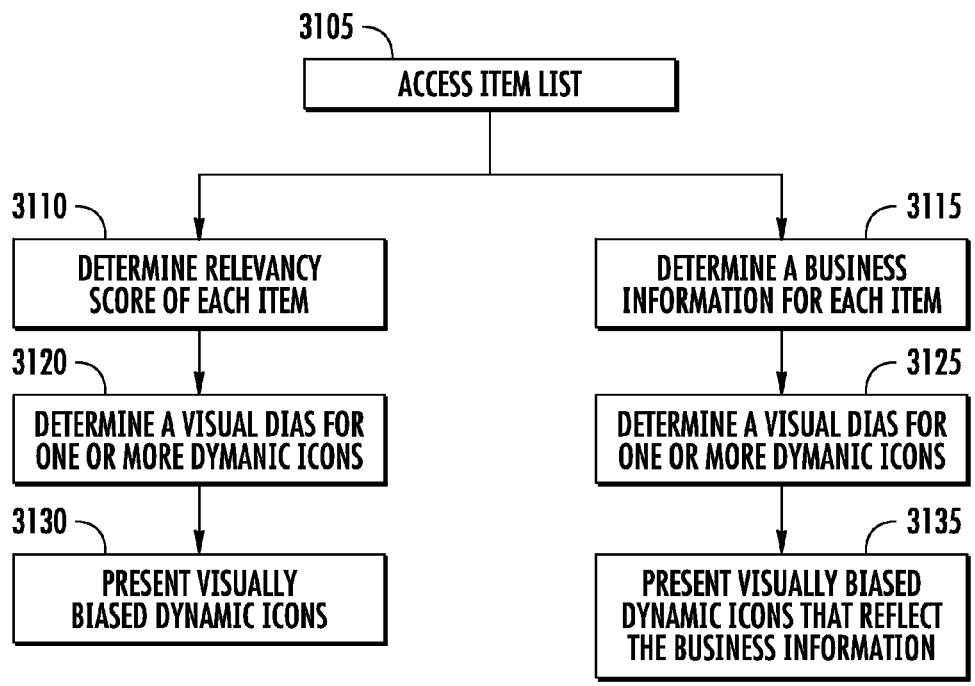
FIG. 31 illustrates a flow diagram of an example system in accordance with some embodiments discussed herein.

As shown in FIG. 31, in some embodiments, the system may access an item list 3105 and proceed with determining relevancy scores for the items 3110, determining a visual bias for one or more of the dynamic icons based on the relevancy scores 3120, and presenting the biased dynamic icons 3130 while also determining 3115, biasing 3125, and presenting 3135 the business data for the items. As discussed in further detail herein, the system may simultaneously and independently display both the relevancy information and the business data to the user. Although step 3110 recites determining a relevancy score of each item, alternative embodiments may use one or more sources of data, including but not limited to the profile data and item data, as a simpler and/or alternative source of comparison as described herein with respect to the transaction data of FIGS. 10a, 10b, 11a, and 11b.

In still other embodiments, the interface may be configured to allow a user to request pairing suggestions 115 via the interface and such suggestions may also be shown by a secondary indicator. In some embodiments, the goals 105, inventory 110, and pairing suggestions 115 may be shown by independently biasing the size of the dynamic icons and a secondary feature such that the usage of each item (as determined through dynamic icon selections and/or underlying transaction data) and the desired secondary data are both shown simultaneously.

Figure 32:
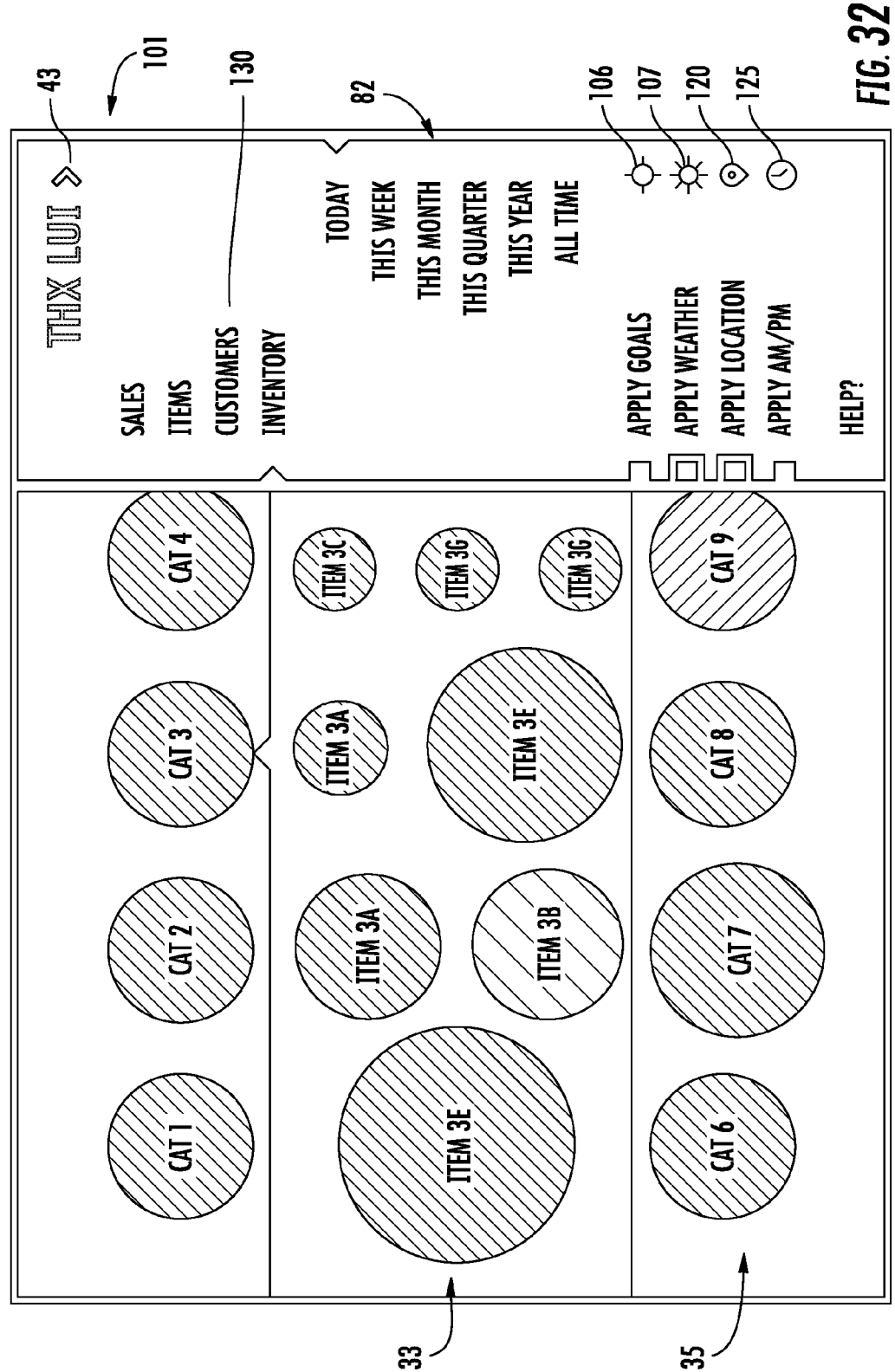
FIG. 32 illustrates an example interface having a control panel in accordance with some embodiments discussed herein.

FIG. 32 represents an alternative embodiment of an example control panel 82. In the embodiment of FIG. 32, the user may be able to filter the data based on item data, (e.g. business or environmental data, such as goals 106, weather 107, location 120, or time of day 125). In some embodiments, the features of the dynamic icon 33 may also be selectable to reflect a transaction data, such as the number of customers 130 who have bought each item.

Embodiments of the present invention may be applied to any increment or categorization of environmental data (e.g., particularly those which may affect transactions or other business goals associated with an item) including, but not limited to, various times of day such as morning, afternoon, evening, or specific hour ranges; various weather conditions such as rain, fog, sunshine, snow, various temperatures, and any other possible weather; various seasons and times of year; or various geographic areas of any size or type.

In some embodiments, various filtering options may be used to select a specific range of data or to bias all of the data based on its relevance to the selected filter. In some embodiments, the visualization of the dynamic icons 5, 33 may be biased to represent data from only the selected filter. For example, in some embodiments, when the apply weather dynamic icon 107 is selected, the dynamic icons 33 may represent only selections made during a chosen weather condition.

In some alternative embodiments, the system may be configured to filter the data by biasing all of the data based on the selected option. In one exemplary embodiment, with reference to FIG. 32 when the apply weather dynamic icon 107 is selected, the dynamic icons 33 may give more weight to the weather during the selected weather condition but not completely ignore the usage of the dynamic icons 33 during the other possible weather conditions.

The system may be configured to give the user the option of various filters and ranges in a control panel 80, 82 or the like, or the system may be configured to automatically apply a filter based on the relevant application and data. Additionally, in some embodiments, the system may be configured to use current environmental data (e.g., as determined by accessing environmental data from a mobile device weather application or from a remote server) in order to filter the data without requiring specific direction by a user to do so, or the system may be configured to allow the user to select a different environmental data (i.e., different from the one determined for the location of particular interest), time period, or other limiting data. One of ordinary skill in the art will appreciate that any item or profile data, such as length of time period or environmental data may be available as a filtering option for the user through the interface based on the user's preference and the specific application.

Reference will now be made to the embodiments shown in FIGS. 33-37, which show various sets of dynamic icons 5 having different filters selected. One embodiment, shown in FIG. 33, represents dynamic icon selection and/or transaction data for various items across all time periods with no filters applied.

Figure 33:
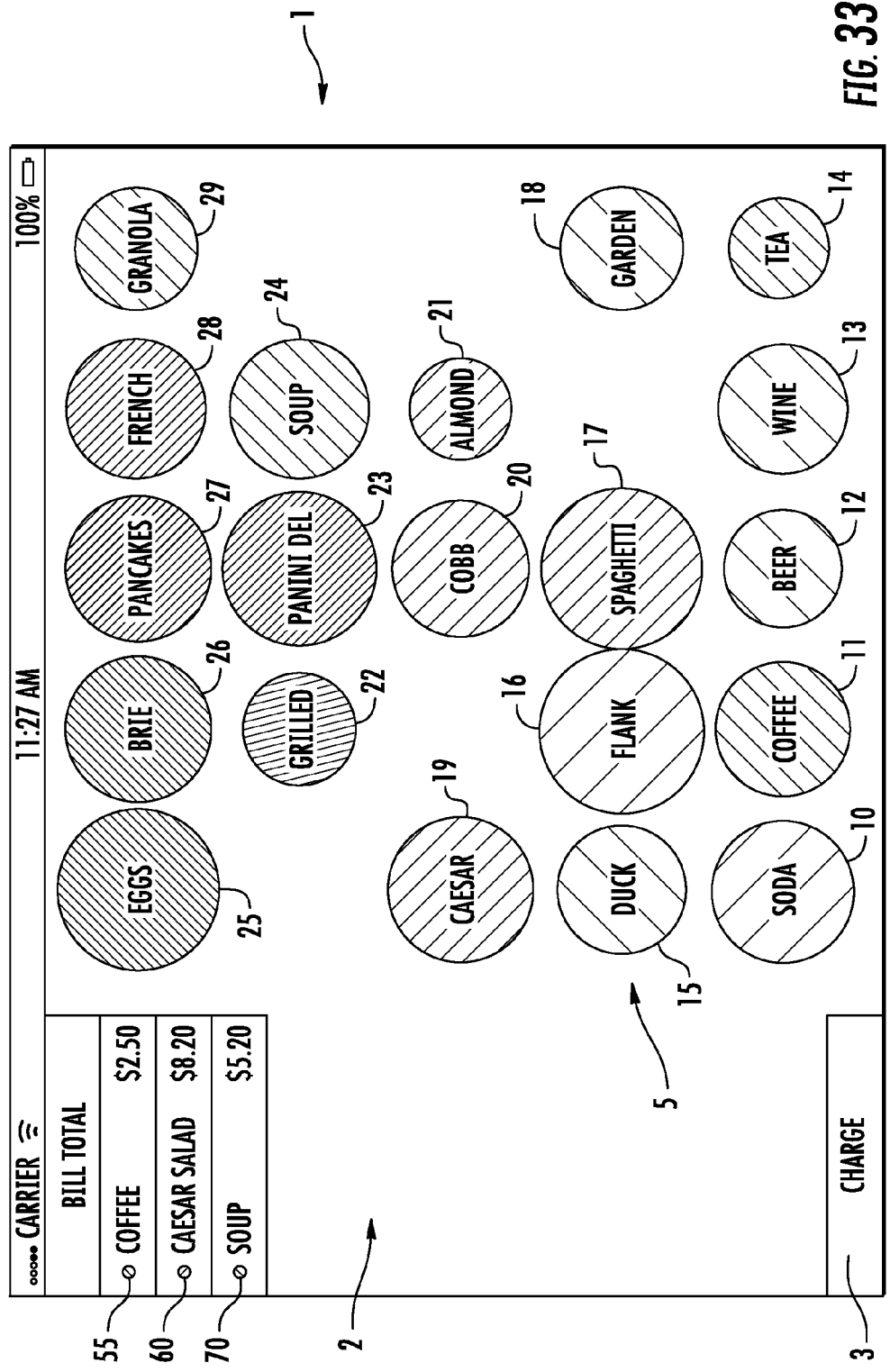
FIG. 33 illustrates an example interface in accordance with some embodiments discussed herein.
Figure 34:
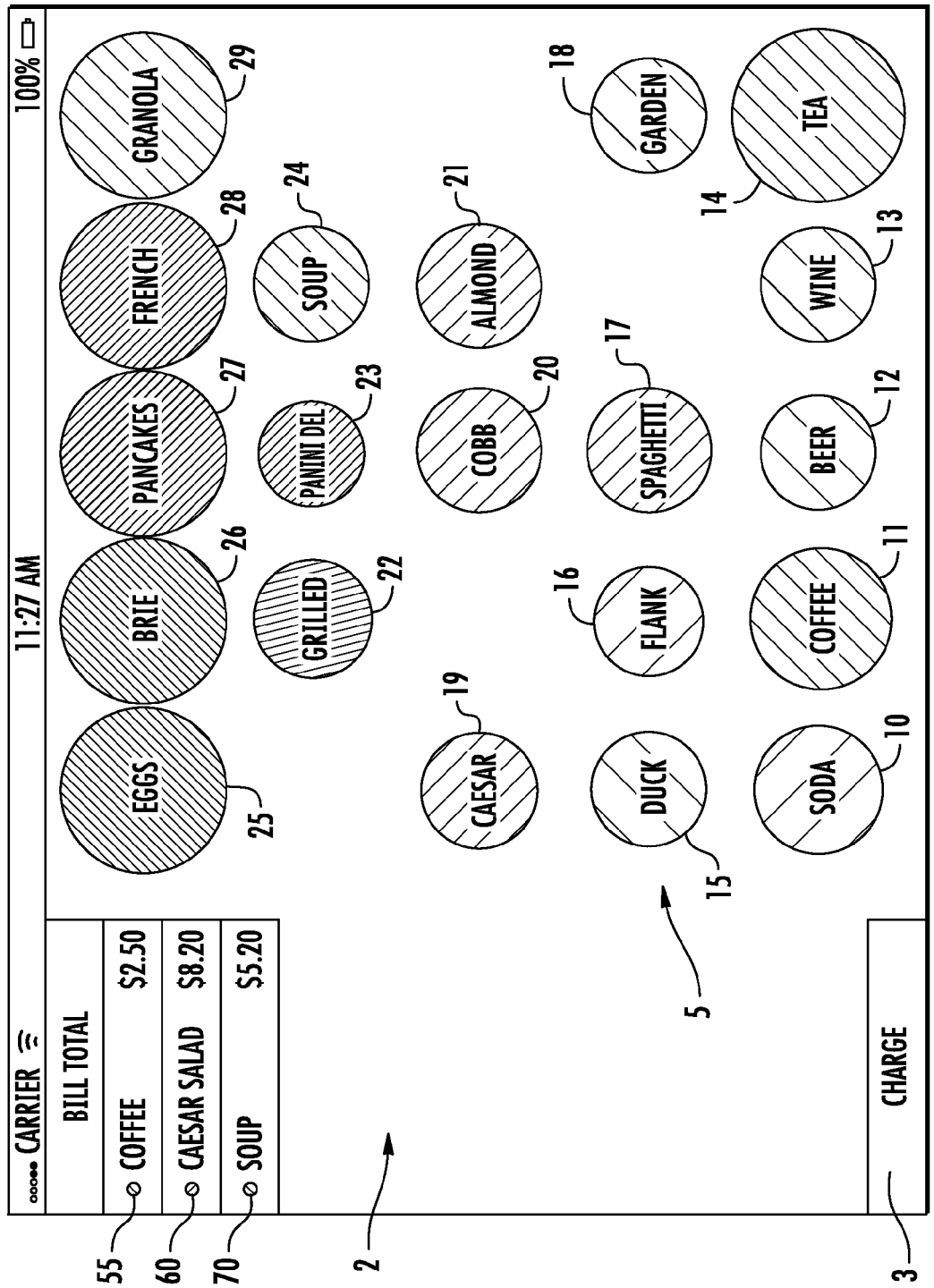
FIG. 34 illustrates the example interface of FIG. 33 having a "9:00 am" filter selected in accordance with some embodiments discussed herein.

FIG. 34 modifies the illustration of FIG. 33 by configuring the system to apply a 9:00 a.m. filter. In the depicted embodiment, the dynamic icons 5 of the items most frequently purchased at or around 9:00 a.m. are presented to the user as larger. In this exemplary embodiment, eggs 25, brie 26, pancakes 27, french toast 28 and granola 29 (e.g., breakfast foods) are selected more frequently and/or underlying items are purchased more frequently based on transaction data and thus the dynamic icons are displayed larger with the 9:00 am filter applied. The dynamic icons 5 that are not as frequently selected during the 9:00 a.m. time period in this embodiment, such as flank 16 and duck 15 (e.g., dinner foods), are displayed as smaller in size.

Figure 35:
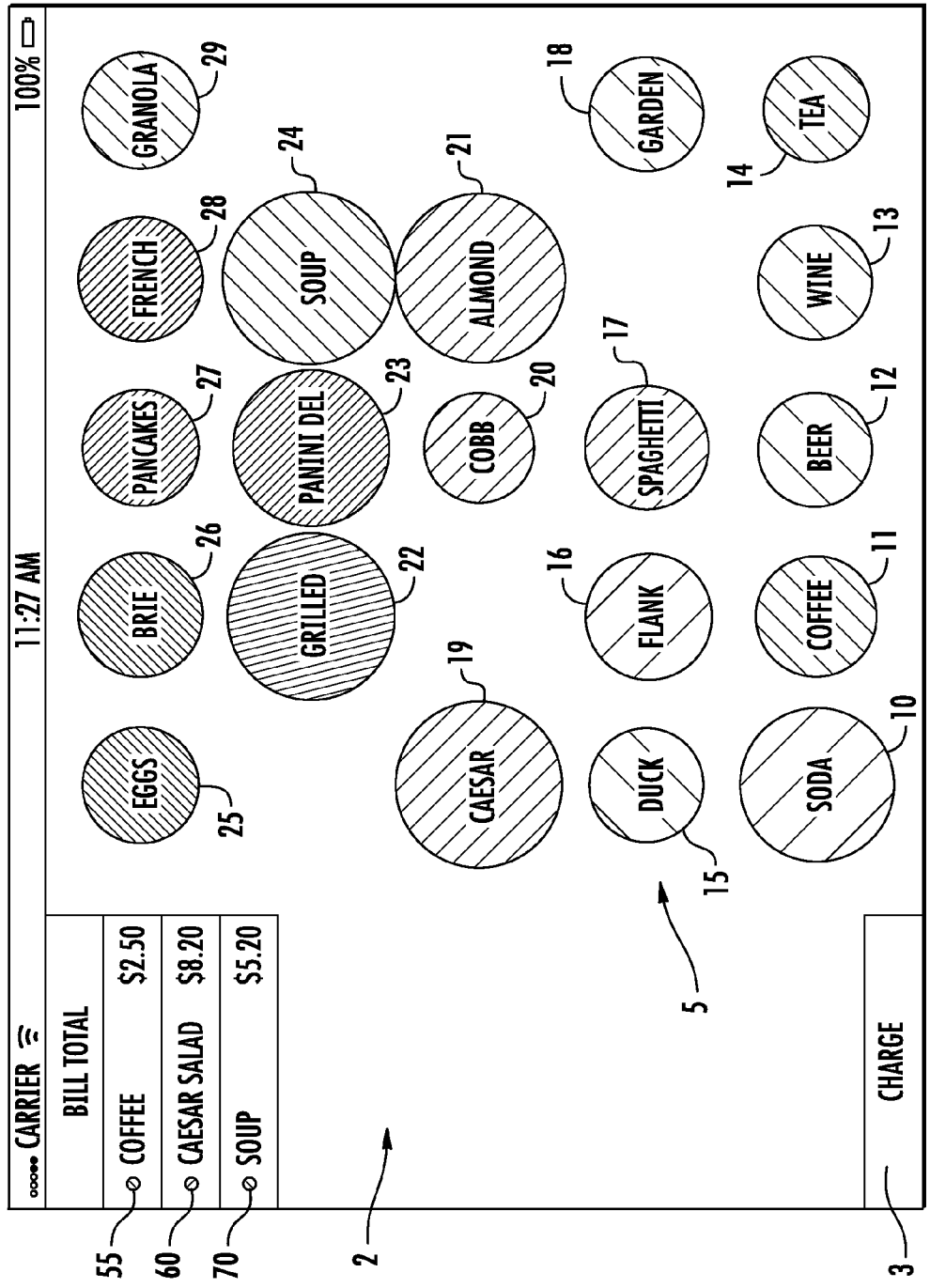
FIG. 35 illustrates the example interface of FIG. 33 having a "1:00 pm" filter selected in accordance with some embodiments discussed herein.

FIG. 35 illustrates an embodiment of the present invention where a 1:00 p.m. filter is selected. In this example the dynamic icons most frequently selected or associated with items most frequently purchased at or around 1:00 p.m., such as soup 24, soda 10, almond 21, and caesar 19 are visually biased to be larger while the dynamic icons 5 that are not as frequently selected or associated with items as frequently purchased at or around 1:00 p.m., such as beer 12, wine 13, and tea 14 are biased to be smaller.

Figure 36:
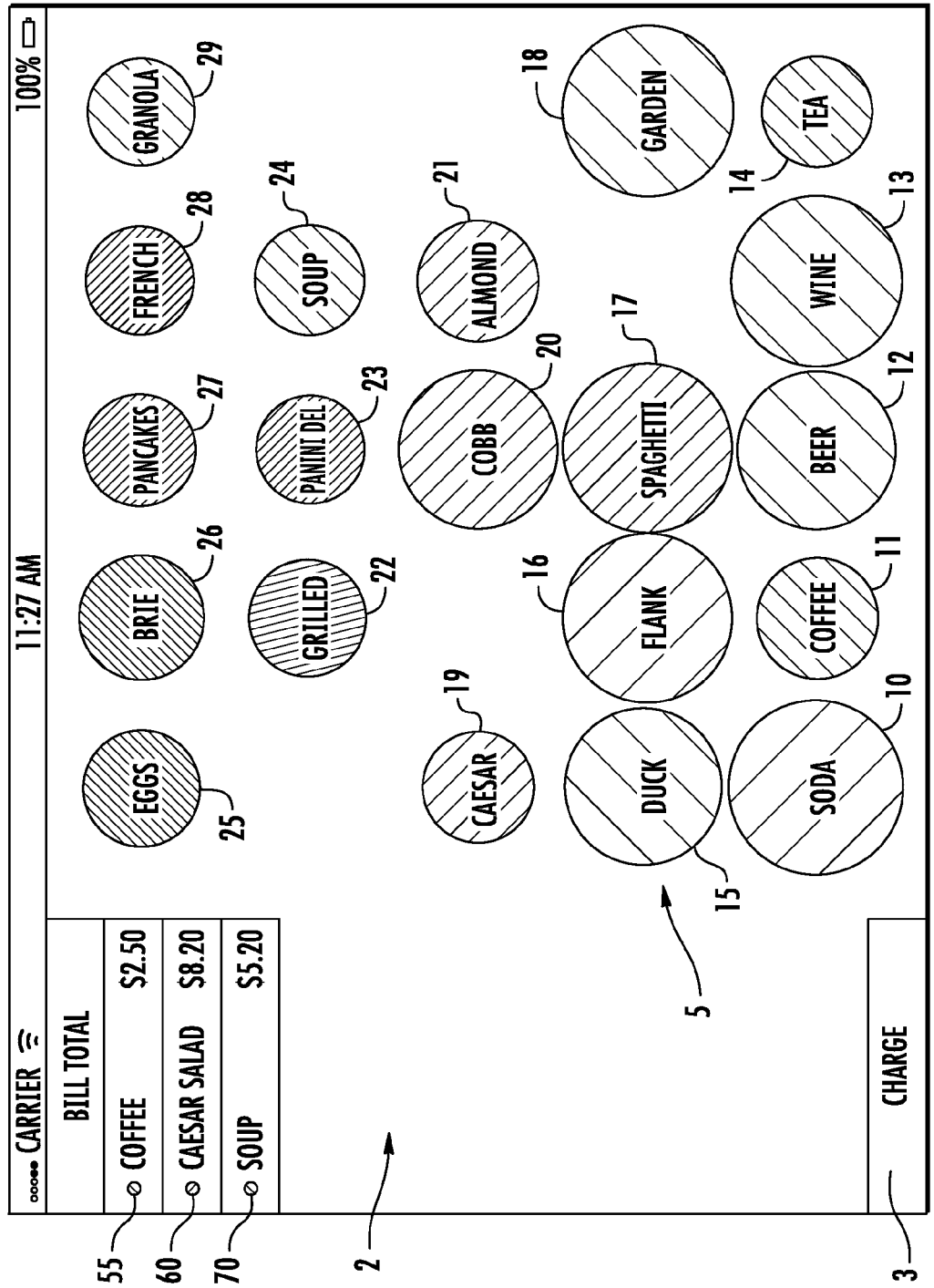
FIG. 36 illustrates the example interface of FIG. 33 having a "7:00 pm" filter selected in accordance with some embodiments discussed herein.

FIG. 36 illustrates an embodiment of the present invention where the interface has a 7:00 p.m. filter applied. In this embodiment, the cobb 20, spaghetti 17, and soda 10 dynamic icons are more frequently selected at 7:00 p.m. and are visually biased to be larger, but items such as eggs 25 and brie 26 are less popular at 7:00 pm and, thus, are visually biased to be smaller. In some embodiments, the system may be configured to filter for any predetermined range around the selected time.

Figure 37:
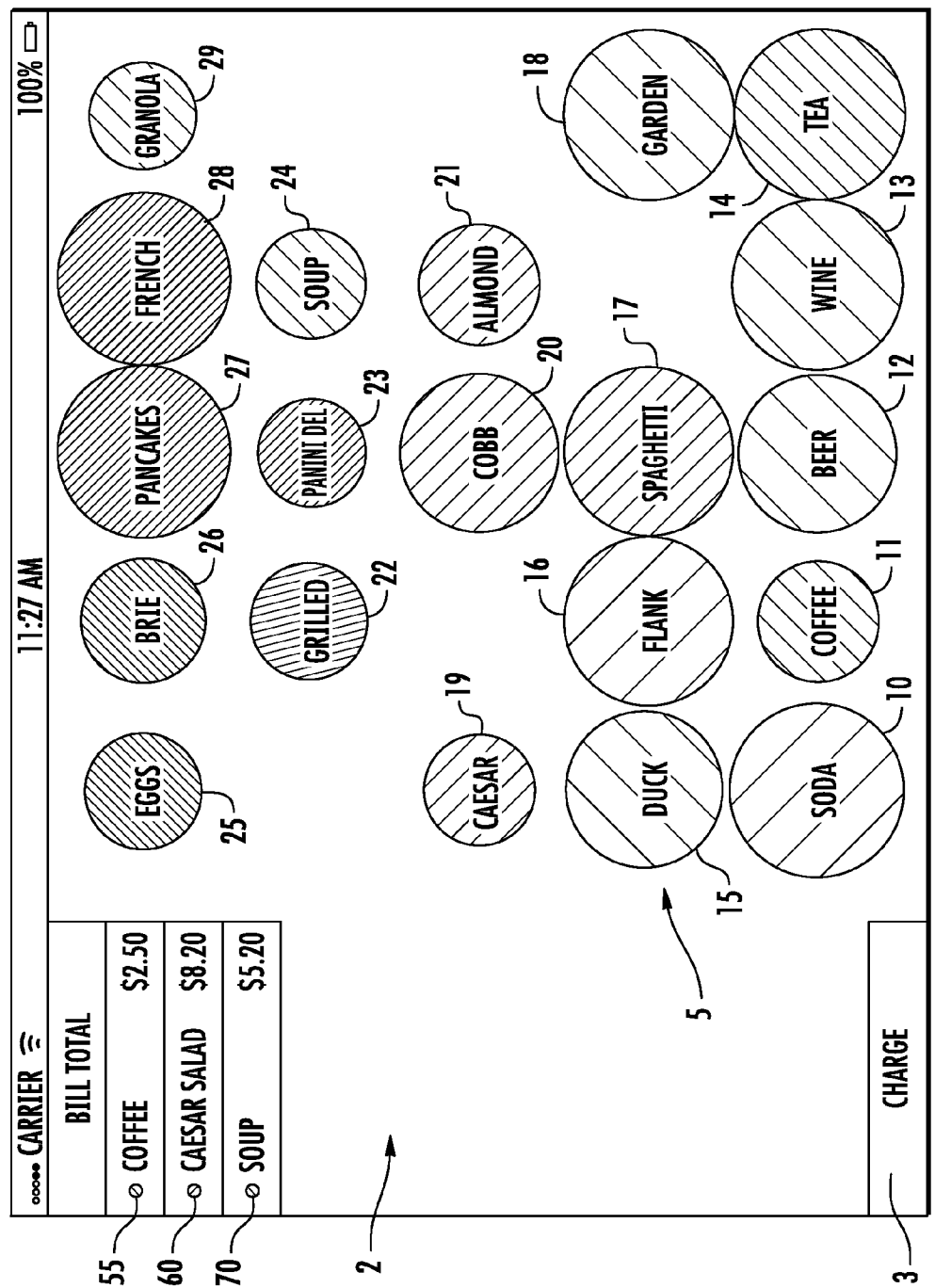
FIG. 37 illustrates the example interface of FIG. 36 having a rain filter selected in accordance with some embodiments discussed herein.

FIG. 37 illustrates an embodiment of the present invention where both a 7:00 p.m. filter and a rain filter have been applied. For example, in this embodiment, as compared to FIG. 36, pancakes 27 and french toast 28 become illustrated as more frequently selected when it's raining at or around 7:00 pm than when it is not. This frequency of selection correlation may be based on dynamic icon selection data or underlying transaction data as discussed above. In some embodiments, the filters may simply combine to show the relative popularity of items at or around, for example, 7:00 pm at the same time that it is raining. In some other embodiments, as discussed above, the filters may interact with the data differently. For example, in one exemplary embodiment, the temporal data filters may eliminate any transactions not occurring at or around the specified time, but the environmental filters may bias the data based on its relatedness to rain. For example, in the previous embodiment, if a 7:00 pm filter is applied, transactions occurring at 5:00 am may not be considered, but snow occurring around 7:00 pm will be presented and the data weighted because of snow's closeness to rain. A person of ordinary skill in the art will appreciate numerous combinations and iterations of the system filters to present the user with any relevant data.

Figure 38:
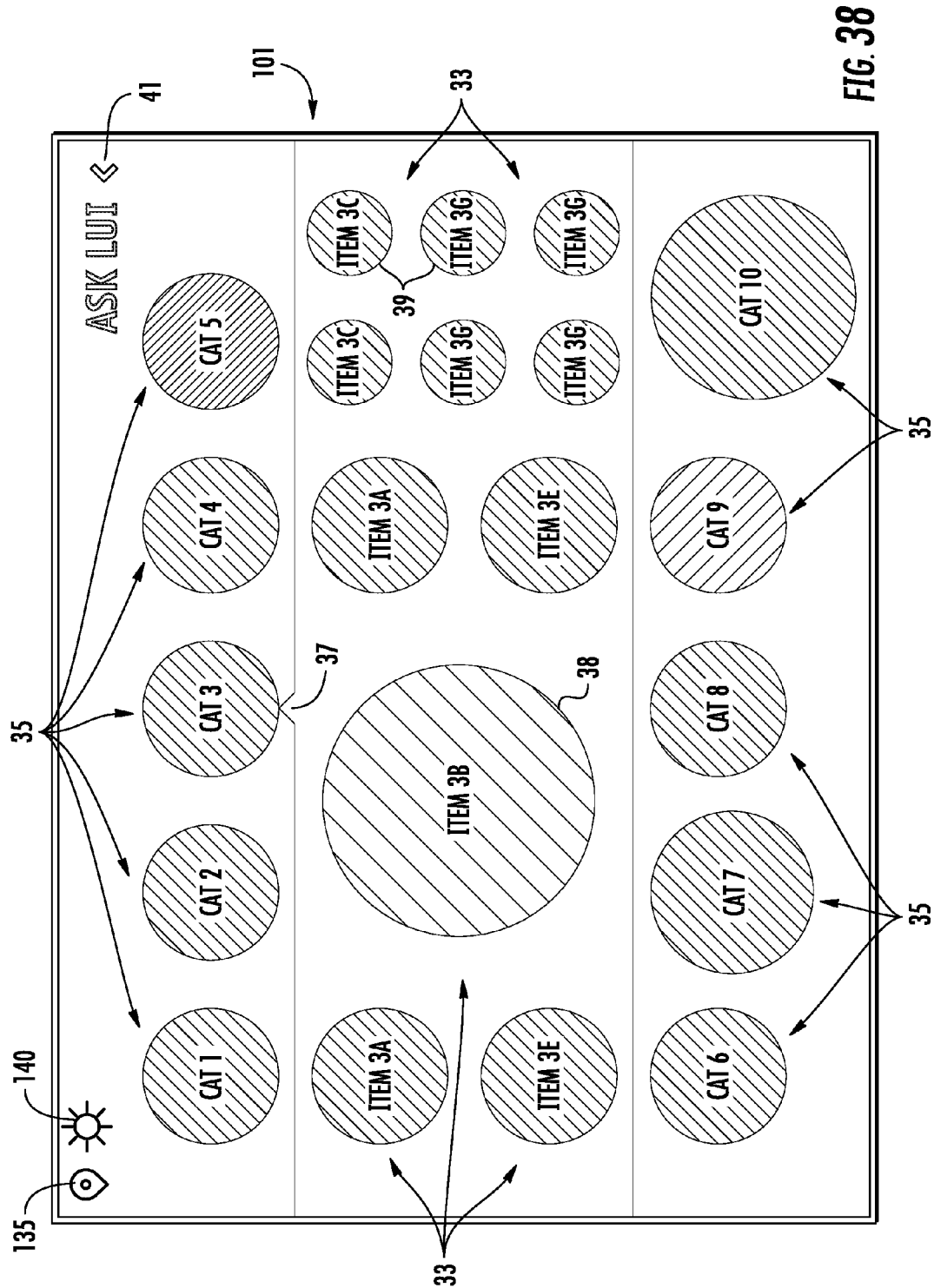
FIG. 38 illustrates an example interface having filter icons in accordance with some embodiments discussed herein.

FIG. 38 shows an alternative embodiment of the environmental filters. For example, a day time option 140 may be selected and a location option 135 may be selected and presented in the upper left corner of the interface display to indicate which filters are currently active. One of ordinary skill in the art will appreciate that numerous indicators of the active filter are feasible and may be envisioned by the present invention. In some embodiments, as described in further detail below, the information relevant to a particular user may be filtered via machine learning.

User-Dependent

As discussed herein, system may be configured to represent data differently based on the user. In particular, the system may bias the dynamic icons based on the specific user or type of user and may present any data relevant to the particular user. The interface may be presented to any type of user, including a consumer, provider, provider employee, or promotion and marketing service, and may present the information desired by and relevant to that user to facilitate a transaction or transactions.

For example, in one embodiment, a business owner (e.g., a provider) may be interested in total revenue generated by each item for all time in each of her stores, so the system may bias, for example, the size of its dynamic icons as total revenue generated for each item for all time. Alternatively, a business owner or store manager may be interested in which items sell best at specific times of day, in order to determine what is worth preparing at various times in the day. For example, if Eggs sell best in the morning and are rarely purchased after noon, the interface may be configured to present the sale of Eggs at various times in the day and the business owner may decide to stop selling Eggs after lunch. These questions or preferences may be input into the system and determined by a relevancy score calculation for each item.

In another embodiment, the interface may be used by a sales clerk (e.g., a provider employee) who may be more interested in total sales for similar times of day in the last week to determine which inventory to have on hand during that period or perhaps which items to suggest to consumers during that period. For example, the system may bias the items to show relative item sales within one hour of the current time, so that when a customer arrives at 6:45 pm, the sales clerk may recommend items that are most frequently sold between 5:45 pm and 7:45 pm. Alternatively, a provider or provider employee may wish to know which items need to be ordered more or less frequently, so the system may bias the dynamic icons to display an inventory over a given time period to demonstrate which items are in surplus and which are selling out.

In some embodiments, the interface may be configured to present information for a non-user as a recommendation. For example, in some embodiments, the interface may present a suggested dynamic icon to a provider employee, where the suggested dynamic icon is a suggestion for a consumer. In this example, the visual bias is determined by a third party consumer's likely preferences and presented to the provider employee for the purpose of making a recommendation to the consumer.

In another embodiment, the interface may be consumer-facing and may be tailored to a consumer's needs. For example, a consumer may be more interested in which items they personally have purchased over the last several months and may not care as much what other customers have purchased. Alternatively, in some embodiments, the system may present the most popular items for a consumer's specific demographic. For example, if young, female consumers typically purchase Duck, the system may bias Duck as a more popular option based if the consumer is a young female.

In another embodiment, the system may be tailored to a promotion and marketing service. In such an embodiment, the interface may display a series of providers as the available items, and display various data sets concerning the different providers. For example, the system may use a geographic filter to determine which promotions are most popular in a given city or region. The system may also display to a promotion and marketing service which providers generate the most revenue for the service overall. In some embodiments, the system may be configured to allow each user to select the display options most relevant to or interesting to them.

In some embodiments, for example, as shown in FIG. 28, a profile ID or profile identifier 2810 is tracked and received by the system to generate appropriate filters for display and/or to automatically bias the dynamic icons based on the relevant information for the particular user. In some embodiments, the profile identifier 2810 may identify a user, consumer, provider, provider employee, or promotion and marketing service and may also contain information such as a preference for a particular type of food, a filtering choice or background information about the profile. As discussed above, the profile identifier may indicate a consumer in order to present a suggested dynamic icon to a provider employee for the purpose of suggesting the dynamic icon to the consumer. Generally, the profile identifier may represent any person, entity, or group of people that the system presents information to or for.

In some embodiments, the profile identifier may be input by a user or may be received or stored by the system. For example, in some embodiments, a user may be prompted to enter a profile identifier when using the interface. In some alternative embodiments, a provider employee may enter or receive the profile identifier from a consumer, where the profile identifier represents the consumer and the system biases the dynamic icons to display relevant items to the consumer. In some embodiments, the profile may be transmitted via a remote device, such as a key fob or cellular phone to the system. In some other embodiments, the profile identifier and any associated information may be retrieved by the system from a server or other remote storage medium. In some embodiments, the process of identifying the profile and/or presenting relevant information may be achieved by heuristic or machine-learning, as explained in further detail below.

Figure 39:
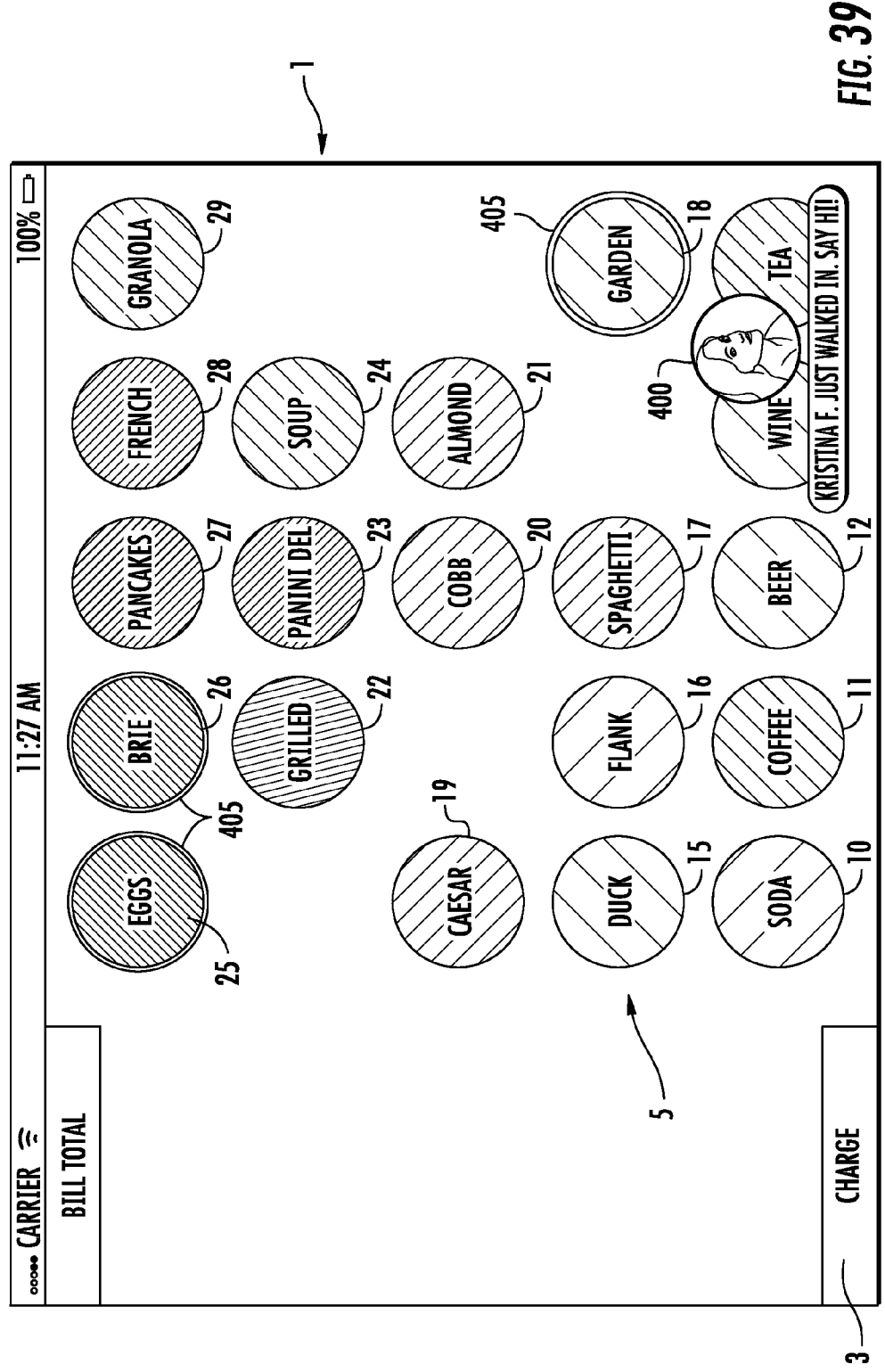
FIG. 39 illustrates an example interface presenting a profile identifier associated with a profile data in accordance with some embodiments discussed herein.
Figure 40:
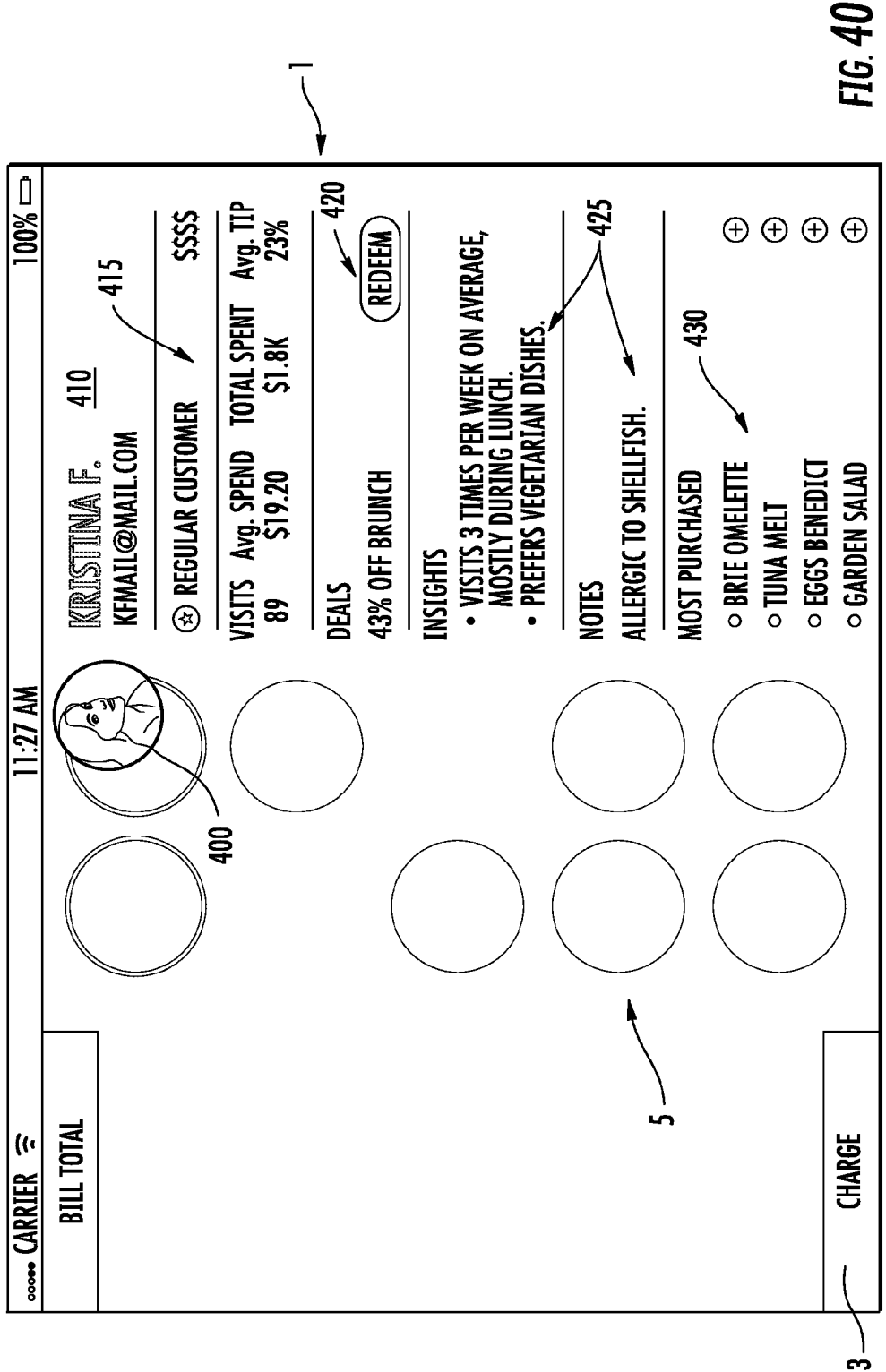
FIG. 40 illustrates an example embodiment of a learning user interface having a profile data submenu displayed in accordance with some embodiments discussed herein.

In some embodiments, the system may receive the profile identifier and present the profile data on the interface. With reference to FIG. 39, the system may receive a profile identifier and present, via the interface, a notification 400 of the profile identifier. In some embodiments, the notification 400 may be a photo associated with the profile, such as a consumer photo. The system may be designed to present the profile identifier identification to the profile-holder or to a third party, such as a provider employee. After receiving the profile identifier, the system may visually bias the dynamic icons to present a recommendation 405 based on the profile identifier and any profile data associated with the profile. In some embodiments, the profile identifier and/or profile data may cause the system to bias a feature of the dynamic icons that are suggested for the consumer or other profile identifier. For example, in the embodiment shown in FIG. 39, the system indicates that Eggs 25, Brie 26, and Garden Salad 18 are recommended by adding shading 405 around the icons.

In some further embodiments, the system may give a user the option of opening a submenu 410 containing relevant information for the profile identifier based on the profile data. For example, with reference to FIG. 40, the submenu 410 may present historical profile data including insights 425 such as allergy information and a summary of their visits to the provider. The submenu 410 may also show a transaction data 415 associated with the profile data and frequent customer status, along with the particular items most frequently purchased 430 by a consumer and any profile-specific promotions 420. This information may be presented either to the profile holder or to a third party. If presented to a consumer, the submenu 410 may allow the consumer to take advantage of any promotions 420 and may help the consumer make a quick decision when ordering. If presented to a third party, such as a provider employee, the submenu 410 may allow the employee to make recommendations to the profile holder and offer promotions that the profile holder may be interested in.

In any of the embodiments discussed above, multiple displays or interfaces may be presented to different users to facilitate a transaction. For example, a provider may use multiple interfaces for a consumer and a provider employee to display relevant information to each party individually. In particular, the consumer may be presented with the most popular items at the present time and location, while the provider employee is simultaneously shown the current inventory for each item in a separate interface in order to recommend a well-stocked item or generate a request for additional supplies. Alternatively or additionally, a provider may have an additional interface that tracks total revenue from each item while the provider employee and the consumer continue the transaction. For example, with reference to FIG. 31, the plurality of items may be visually biased based on their relevancy scores 3120 on one interface and may be visually biased relative to the business data 3125 simultaneously on another interface. One of ordinary skill in the art will appreciate the numerous combinations of interfaces and users that can be utilized to generate the most relevant information possible in order to facilitate a transaction. In some embodiments, as described in further detail below, the most relevant information to a particular user of the system may be determined via machine learning.

Machine Learning

Machine learning is often used to develop a particular pattern recognition algorithm (i.e., an algorithm that represents a particular pattern recognition problem, such as relevance in the LUI system) that is based on statistical inference. In some embodiments, the system receives large quantities of signals from a variety of sources and must determine the relevance of the signals to a particular user, a particular filter, or a particular subset of transaction information.

For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, content analysis includes a source-specific classifier that takes a source-specific representation of the content received from a particular source as an input and produces an output that categorizes that input as being likely to include a relevant data reference or as being unlikely to include a relevant data reference. In some embodiments, the source-specific classifier is a trainable classifier that can be optimized as more instances of content for analysis are received from a particular source.

In embodiments, analysis ends if the system determines that received content does not include at least one relevant data reference.

In embodiments, the system determines whether a referenced relevant data is already known to the system. In some embodiments, this determination is based on whether data representing the referenced relevant data is stored is a data repository. In embodiments, analysis ends if the system determines that a referenced relevant data already is known to the system.

If the system determines that a previously unknown relevant data is referenced within the content data, the system determines whether the content data quality needs verification. In some embodiments, the determination of whether particular content data quality needs verification is based in part on a confidence rating associated with the source that provided the content (e.g., received directly by the system, by a connected or related system, or from a secondary source). There are a variety of data quality signals upon which, alone or in combination, a source confidence rating may be based. For example, in some embodiments, the content provided by a server that specializes in notifications of relevant user data and that previously has published content that provided references to several sets of relevant data may not need further verification. In embodiments, if the system determines that the data quality of the received content does not need verification, data representing the referenced relevant data is stored in the data repository.

In embodiments, if the system determines that the data quality of the received content does need verification (e.g., untrustworthy data from an outside source), the system submits data representing the referenced relevant data for verification. Verification of a relevant data may be a manual process, an automatic process, or a combination. Verification of data quality may be based in part on attributes of the data (e.g., are the results similar to the subset of data collected by the system?), and/or on attributes of the received content (e.g. does the date indicate that this reference is stale?). In some embodiments, the system collects references to previously unknown data that were extracted from content received during a predetermined time period, (e.g., a week) and then submits the set of collected references for verification. Additionally or alternatively, in some embodiments, the system submits a relevant data reference for verification directly after identifying the reference within received content.

In embodiments, if the system determines that a reference to a previously unknown relevant data is verified, data representing the referenced relevant data is stored in the data repository.

In embodiments, a confidence rating is associated with each source that has provided content referencing a previously unknown relevant data. In embodiments, the system updates the confidence rating associated with the source that provided the reference to the relevant data based in part on the content data quality verification results. For example, in embodiments, the system may increase a confidence rating if the relevant data reference is verified and, conversely, the system may decrease a confidence rating if the relevant data reference is not verified. In another example, the system may increase a confidence rating if content received from a particular source is determined to include a relatively greater number of verified relevant data references than content received from other sources within a predetermined time period. In some embodiments in which the source is associated with a source-specific classifier, the confidence rating is based in part on a percentage of successful determinations that content includes a relevant data reference. The process ends after the system updates the confidence rating.

Signals

The system may consider at least one or more of the following signals that may be weighted, filtered, or used in connection with various heuristic or machine learning algorithms discussed in greater detail herein, including:
 a. Dynamic icon clicks, presses, selections, or mouseovers
 b. Category clicks, presses, selections, or mouseovers
 c. Item clicks, presses, selections, or mouseovers
 d. Popularity, as indicated by usage rate, selection rate, sell-out rate, or any other indication of an item's desirability
 e. Item data, including:
  i. transaction data
  ii. business data
  iii. environmental data
  iv. characteristic information
 f. Transaction data, including:
  i. sales data, such as past and predicted revenue, the amount of an item sold, profits, or any other sales metric
  ii. redemption data
  iii. return data
  iv. transaction metadata (e.g. data associated with a transaction including: hyper-geographic location; time of day; season; weather; consumer identification data including gender, age, socioeconomic status; item information; or provider information)

g. Profile ID or Profile identifier (e.g. IP address, MAC address, customer number, merchant number, store number, etc.)
h. Profile Data, including:
   i. transaction data
   ii. biographical data
   iii. preference data
i. Inventory data
j. Other business data, including:
   i. goals
   ii. quotas
   iii. revenue
   iv. number of customers
   v. sales
k. Environmental signals, including:
   i. time of day
   ii. season
   iii. weather
   iv. geographic or hyper-geographic location
l. Any time periods Various embodiments of the disclosure herein may reference dynamic icon presses, clicks, or transactions as signals, however, any of the above signals may be used in the LUI system. Each of these signals may be used in connection with machine learning techniques discussed herein, and those generally known to one of ordinary skill in the art, to identify patterns, to rank items, and to determine visual biasing of dynamic icons as discussed herein.

Multiple Indicators

Some embodiments of the present invention have the capability of showing more than one set of data at the same time as discussed above. In some embodiments multiple features of the dynamic icons 5 may be visually biased, independently of one another or relative to one another and multiple indicators on the dynamic icons may be biased to visualize different sets of data for each item as desired by the user.

Figure 41:
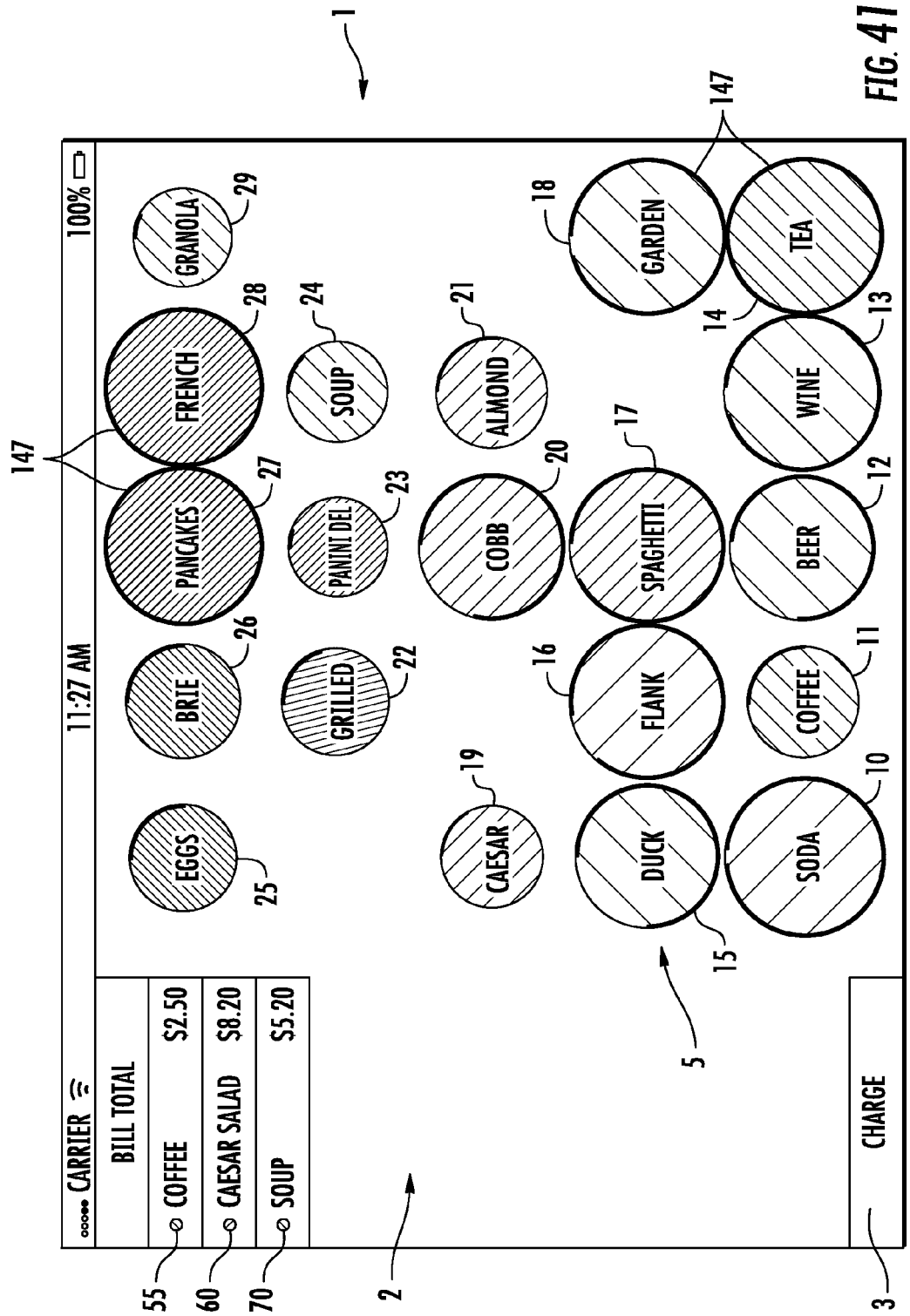
FIG. 41 illustrates an example interface having dynamic icons with secondary indicator rings activated and dynamic icons with highlighting presented in accordance with some embodiments discussed herein.
Figure 42:
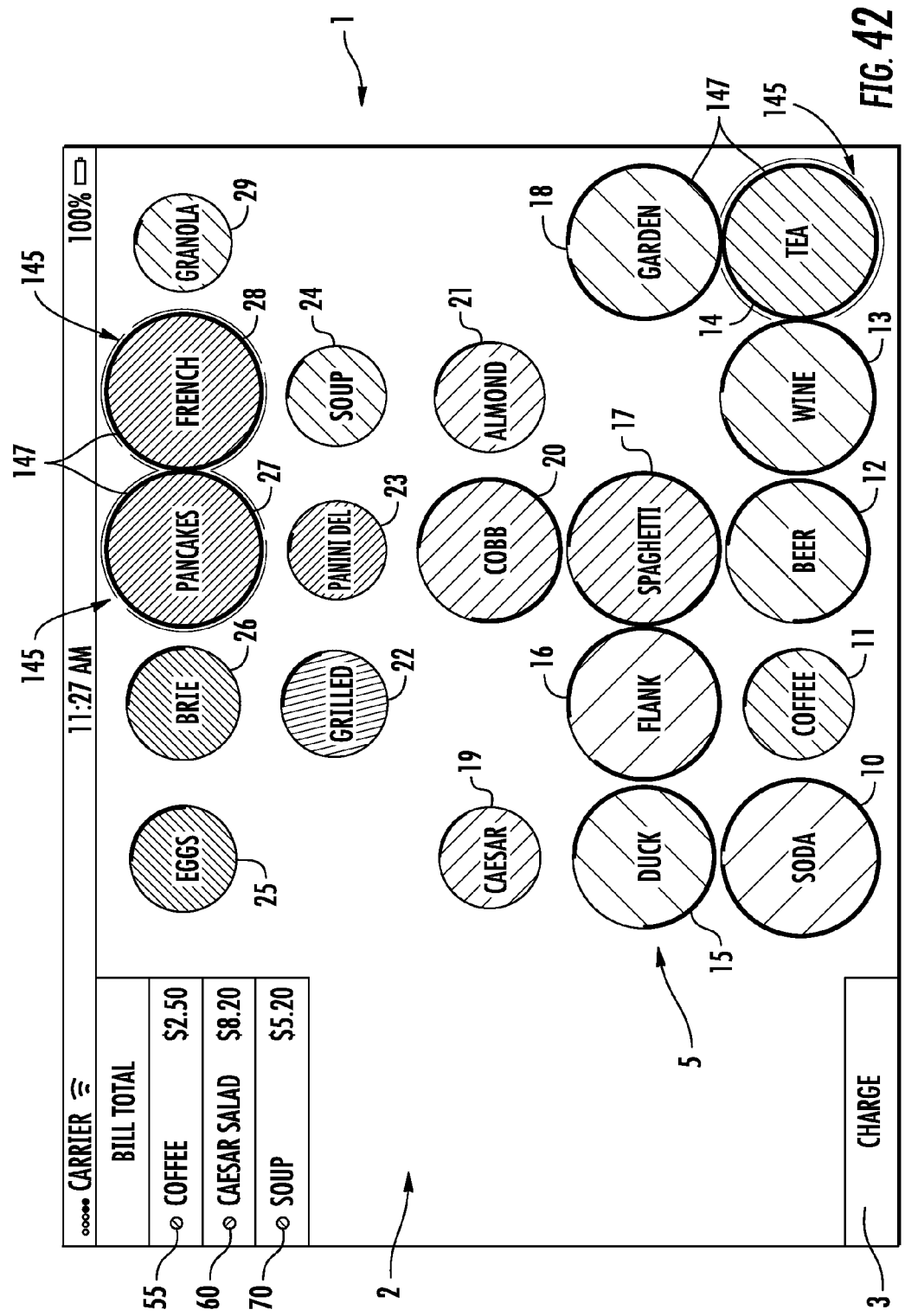
FIG. 42 illustrates the example interface of FIG. 41, wherein the highlighting is no longer presented in accordance with some embodiments discussed herein.

With reference to FIG. 41, an example embodiment shows a ring 147 around each dynamic icon 5 that indicates a secondary data about each item. In the embodiment shown in FIG. 42, the ring 147 around each item reflects a goal for the item (e.g., 500 items sold). In this embodiment, once the secondary ring 147 display is activated or once the goal or other metric has been reached, the interface 1 is configured to present an indication of the goal or other metric being reached via subtle visual indication 145 or other visual biasing means. In some embodiments, with reference to FIG. 43, the visual indication 145 may settle or disappear after a short time of the goal or other metric display being activated or the goal or other metric being reached. With reference to FIG. 31, the dynamic icons may be visually biased using the rings to display the business data 3135 and may be visually biased separately to display the relevancy information 3130.

FIGS. 41-47 illustrate embodiments of biasing the dynamic icons wherein a ring 147 on each dynamic icon 5 represents a goal and the completeness of the ring 147 represents how close the particular dynamic icon 5 is to its respective goal. For example, in the embodiment shown in FIG. 42, the rings 147 around the pancakes 27, french toast 28, and tea 14 dynamic icons are complete and full indicating that the goals for those three dynamic icons have been reached for a predetermined time period. The goal, in some embodiments, may be set by the user or set automatically based on previous usage of each dynamic icon 5 from a predetermined time period and/or based on underlying transaction data associated with the items represented by the dynamic icons. In some alternative embodiments, the ring 147 may instead count down, meaning each of the rings 147 may begin as full and incrementally shortens around its respective dynamic icon 5 until the goal is reached and the ring 147 is no longer visible.

Figure 43:
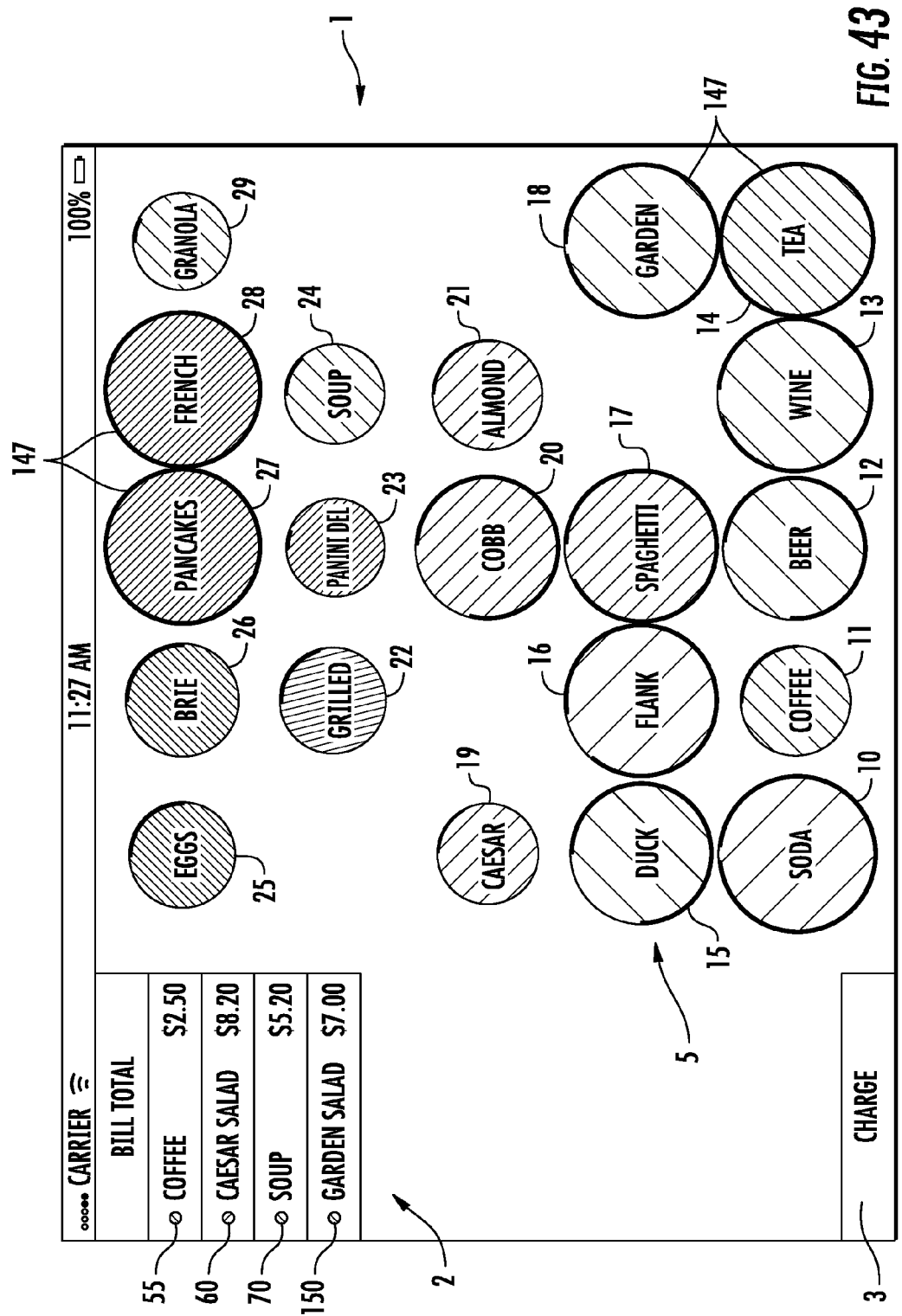
FIGS. 43-45 illustrate the example interface of FIG. 42 having the garden dynamic icon selected and the ring around the garden dynamic icon incrementally filling in accordance with some embodiments discussed herein.
Figure 44:
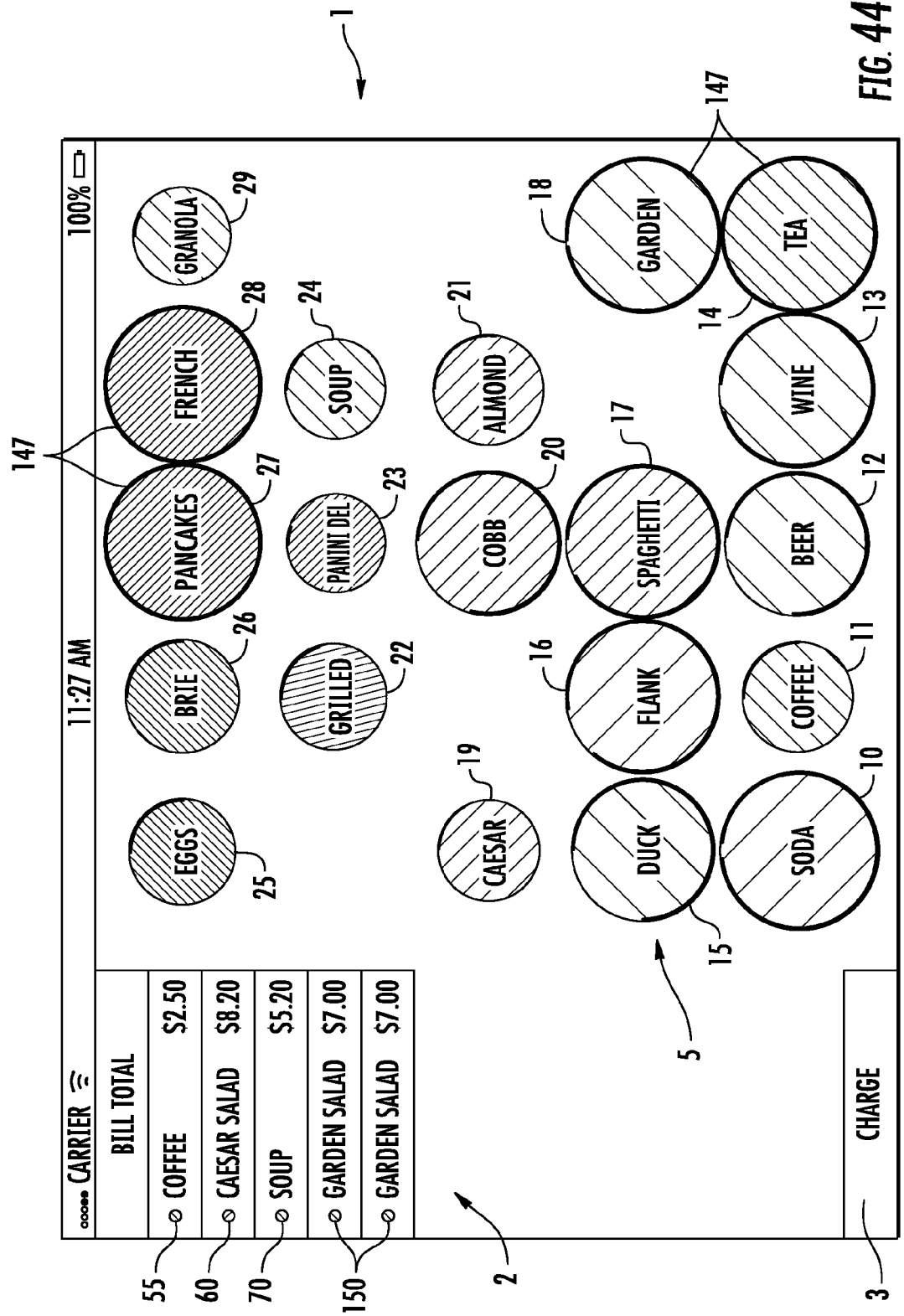
Figure 45:
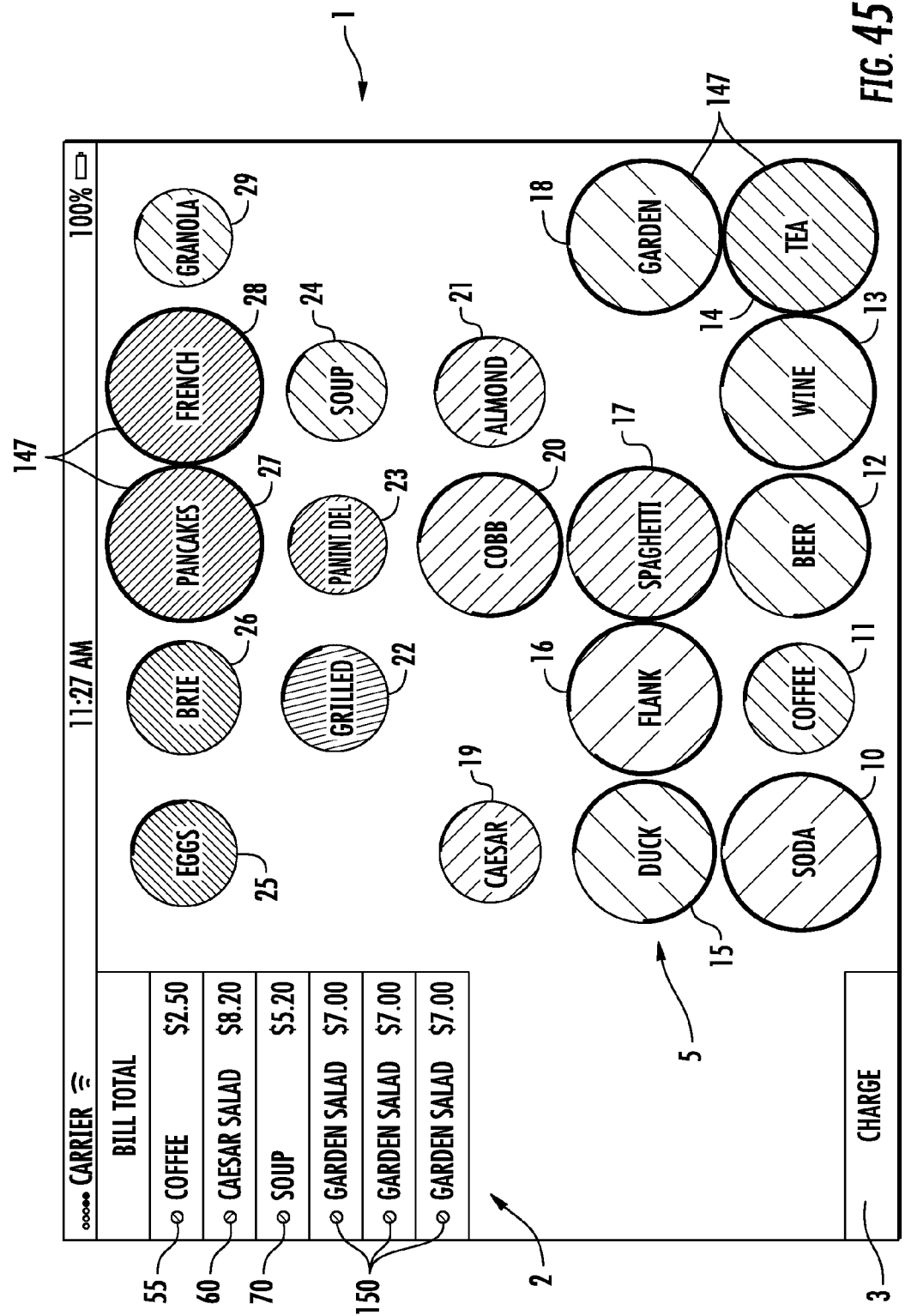
Figure 46:
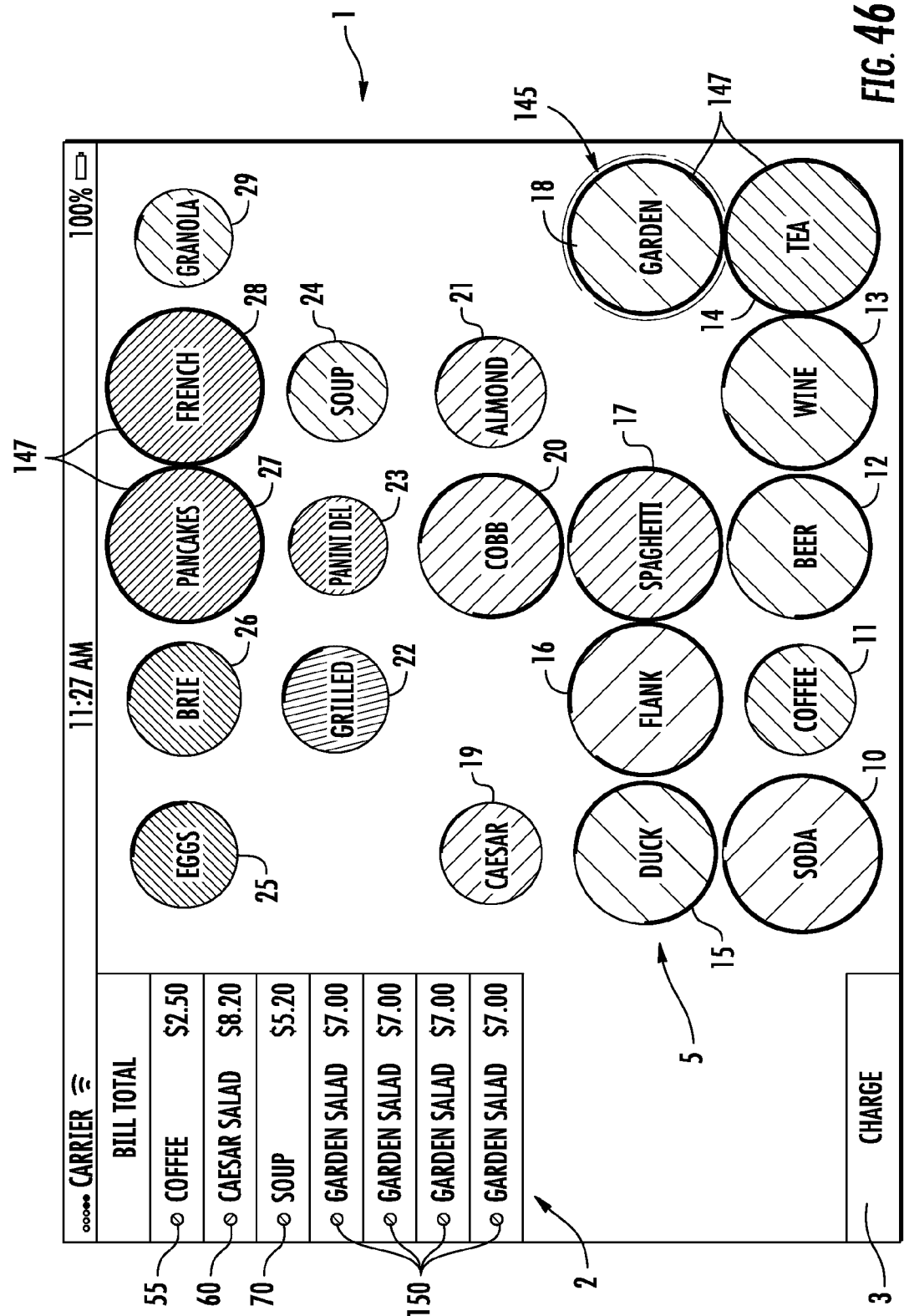
FIG. 46 illustrates the example interface of FIG. 42 having the ring around the garden dynamic icon filled and highlighting presented in accordance with some embodiments discussed herein.
Figure 47:
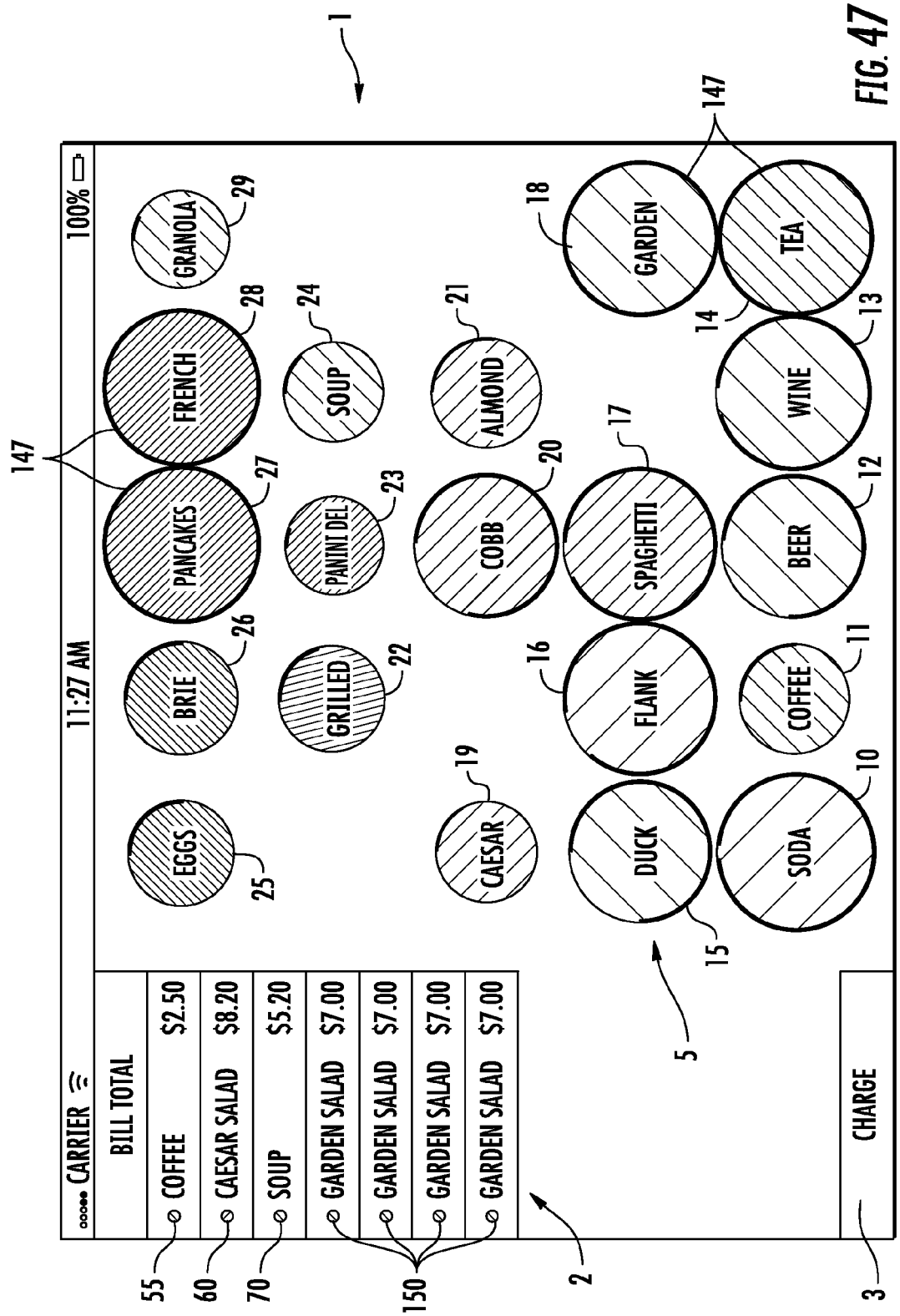
FIG. 47 illustrates the example interface of FIG. 46 wherein the highlighting is no longer presented in accordance with some embodiments discussed herein.

FIGS. 43-45 show the garden dynamic icon 18 being selected multiple times, as indicated by the garden salad 150 appearing in the column 2 to the left. After each selection, the ring 147 around the garden dynamic icon 18 is biased so as to incrementally fill. In some embodiments, with reference to FIG. 46, when the garden salad reaches its goal, the ring 147 fills completely around the garden dynamic icon 18 and the goal being reached is indicated to the user by biasing the icon with a visual indication 145. In some embodiments a visual indication 145 or other means may be used as an alert to signal to the user that the business data (e.g., goal, average sales metric, desired revenue, inventory restock point, etc.) has reached a predetermined threshold. Again, in some embodiments, once the goal is reached the visual indication 145 may dissipate after a certain amount of time. FIG. 47 shows the garden dynamic icon 18 after the visual indication 145 has faded and the dynamic icons 5 have returned to an initial state.

Additionally, in some embodiments, the goal or other metric may either reset immediately or reset at the end of a predetermined time period (e.g., reset at the end of the day, quarter, or other business cycle) and begin counting again. In some embodiments, the goals or other metric of the ring 147 for each of the dynamic icons 5 may all reset at the same time, or they may individually reset as they are updated, for example, in the case of inventory replenishment.

Alternatively, the rings 147, in some embodiments, may show any other item or profile data such as an inventory. The inventory display may be indicated by the size of the dynamic icons 5 or may be indicated secondarily by the rings 147 while still tracking the usage of the dynamic icons 5 by their size. In this case, the fullness of the ring 147 around each dynamic icon 5 may indicate an inventory remaining and the ring 147 may either fill around the dynamic icon 5 or reduce around the dynamic icon 5 until the inventory is gone. As detailed above, the goals, inventory, or other data may be presented by the visualization of the dynamic icon 5 itself instead of the usage data, and need not use a secondary ring 147. The secondary ring, as with the dynamic icons 5 themselves, may be biased to visualize any type of data and any metric desired by the user.

Figure 48:
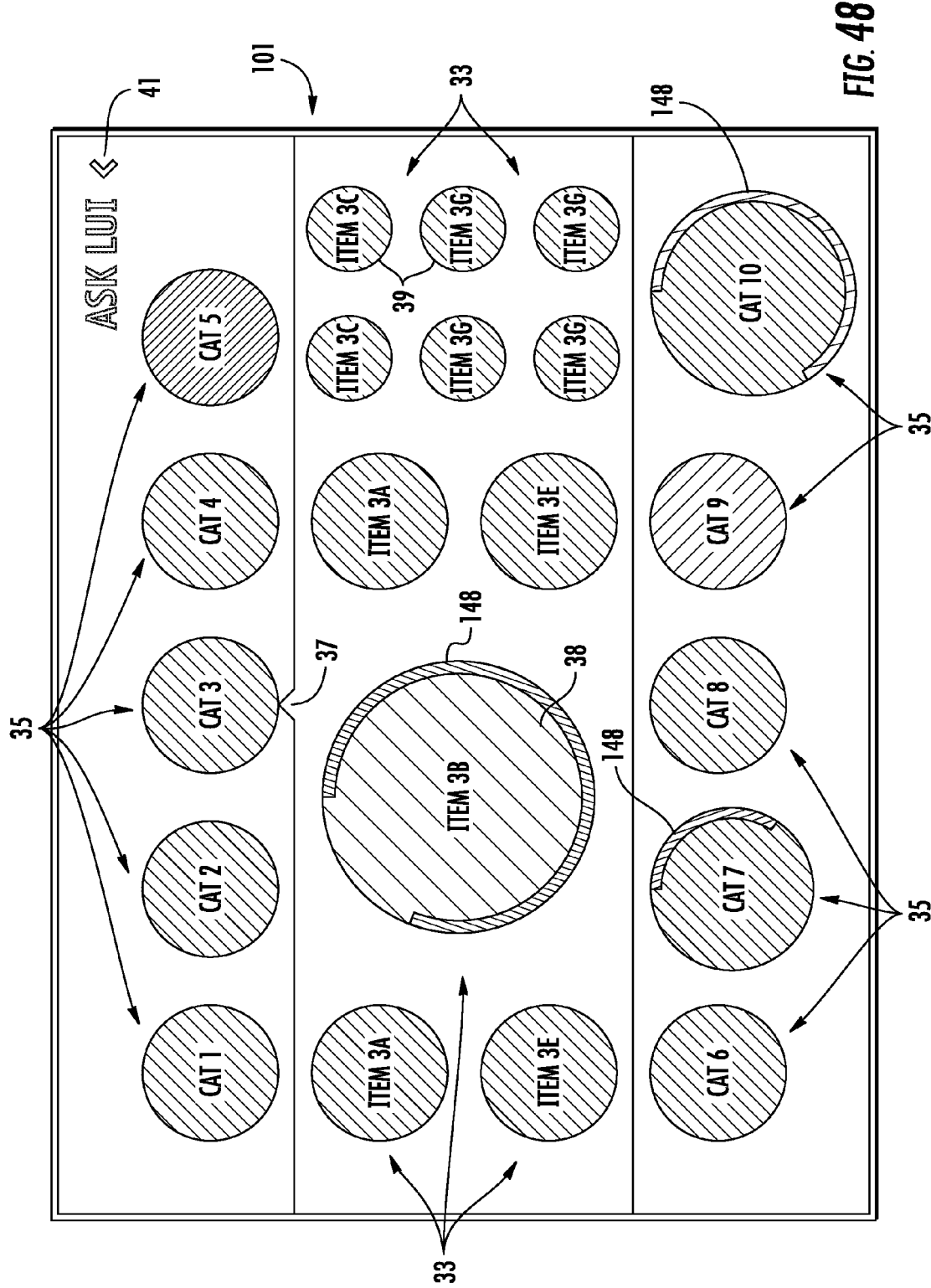
FIG. 48 illustrates an example interface having a secondary indicator ring in accordance with some embodiments discussed herein.

With reference to FIG. 48 an alternative embodiment of the secondary indication is shown where the rings 148 are visualized as shading around both the dynamic icons 5 and the categories 35 such that goals, inventory, or any other desired metrics for each item and total goals or metrics for each category are tracked and indicated.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    presenting, via an interface, a plurality of dynamic icons representing a plurality of items, wherein the plurality of dynamic icons comprises at least one suggested dynamic icon representing at least one suggested item of the plurality of items and at least one secondary dynamic icon representing a secondary item of the plurality of items; wherein the plurality of dynamic icons are configured to be selectable by a user;
    receiving, by a processor, a selection indication of a dynamic icon associated with one item of the plurality of items;
    determining, via the processor, the at least one suggested item of the plurality of items based on the selection indication, wherein the at least one suggested item is different than the one item, wherein determining the at least one suggested item comprises calculating a relevancy score for each item of the plurality of items relative to the one item, wherein the relevancy score for each item is based upon a selection rate of each item in a same transaction as a selection of the one item, and wherein a relevancy score of the at least one suggested item is greater than a threshold relevancy score;
    determining a visual bias for the at least one suggested dynamic icon representing the at least one suggested item relative to the at least one secondary dynamic icon; and
    applying the visual bias, via the interface, to the at least one suggested dynamic icon.

2. The method of claim 1, wherein applying the visual bias to the at least one suggested dynamic icon comprises varying a common feature shared between the at least one suggested dynamic icon and the at least one secondary dynamic icon.

3. The method of claim 1, wherein applying the visual bias to the at least one suggested dynamic icon comprises varying a size of the at least one suggested dynamic icon relative to the at least one secondary dynamic icon.

4. The method of claim 1, wherein applying the visual bias to the at least one suggested dynamic icon comprises varying a color of the at least one suggested dynamic icon relative to the at least one secondary dynamic icon.

5. The method of claim 1, wherein applying the visual bias to the at least one suggested dynamic icon comprises varying a shading of the at least one suggested dynamic icon relative to the at least one secondary dynamic icon.

6. The method of claim 1, wherein applying the visual bias to the at least one suggested dynamic icon comprises varying a border of the at least one suggested dynamic icon relative to the at least one secondary dynamic icon.

7. The method of claim 1, wherein the visual bias is temporary.

8. The method of claim 7, further comprising removing the visual bias after a subsequent selection indication.

9. The method of claim 1, wherein determining the visual bias comprises:
    determining a relevancy score for each of the plurality of items, and
    determining the visual bias for the at least one suggested dynamic icon based on the relevancy score for each for the plurality of items.

10. The method of claim 9, wherein the relevancy score for each of the plurality of items is based on environmental data.

11. The method of claim 10, wherein the environmental data comprises at least one of a time of day, time of year, weather, and location.

12. The method of claim 9, wherein a suggested relevancy score for each of the at least one suggested items is greater than a secondary relevancy score for each of the at least one secondary items.

13. The method of claim 9, wherein a suggested relevancy score for each of the at least one suggested items is greater than a predetermined threshold.

14. The method of claim 9, further comprising:
    determining a second visual bias for a second suggested dynamic icon relative to the at least one secondary dynamic icon; and
    applying the second visual bias to the second suggested dynamic icon.

15. The method of claim 1, wherein determining the at least one suggested item comprises:
    accessing transaction data corresponding to each of the plurality of items, and
    determining the at least one suggested item based on the transaction data.

16. The method of claim 15, wherein determining the at least one suggested item further comprises:
    accessing a selection rate for each item of the plurality of items, wherein the selection rate comprises a rate at which each item of the plurality of items is selected in a same transaction as the one item, wherein the at least one suggested item is determined based on the selection rate for each item of the plurality of items.

17. The method of claim 15, wherein determining the at least one suggested item further comprises:
    accessing a sequential selection rate for each item of the plurality of items, wherein the sequential selection rate comprises a rate at which each item of the plurality of items is selected following a selection of the one item, wherein the at least one suggested item is determined based on the sequential selection rate for each item of the plurality of items.

18. The method of claim 15, wherein the at least one suggested item comprises:
    a first suggested item and a second suggested item, such that a first visual bias is applied to a first dynamic icon representing the first suggested item and a second visual bias is applied to a second dynamic icon representing the second suggested item based on the transaction data for each of the plurality of items.

19. An apparatus is provided comprising at least a processor, and a memory associated with the processor having computer coded instructions therein, with the computer instructions configured to, when executed by the processor, cause the apparatus to:
    present, via an interface, a plurality of dynamic icons representing a plurality of items, wherein the plurality of dynamic icons comprises at least one suggested dynamic icon representing at least one suggested item of plurality of items and at least one secondary dynamic icon representing a secondary item of the plurality of items; wherein the plurality of dynamic icons are configured to be selectable by a user;
    receive, by a processor, a selection indication of a dynamic icon associated with one item of the plurality of items;
    determine, via the processor, the at least one suggested item of the plurality of items based on the selection indication, wherein the at least one suggested item is different than the one item, wherein determining the at least one suggested item comprises calculating a relevancy score for each item of the plurality of items relative to the one item, wherein the relevancy score for each item is based upon a selection rate of each item in a same transaction as a selection of the one item, and wherein a relevancy score of the at least one suggested item is greater than a threshold relevancy score;
determine a visual bias for the at least one suggested dynamic icon representing the at least one suggested item relative to the at least one secondary dynamic icon; and
apply the visual bias, via the interface, to the at least one suggested dynamic icon.

20. The apparatus of claim 19, wherein applying the visual bias to the at least one suggested dynamic icon comprises varying a common feature shared between the at least one suggested dynamic icon and the at least one secondary dynamic icon.

21. The apparatus of claim 19, wherein applying the visual bias to the at least one suggested dynamic icon comprises varying a size of the at least one suggested dynamic icon relative to the at least one secondary dynamic icon.

22. The apparatus of claim 19, wherein applying the visual bias to the at least one suggested dynamic icon comprises varying a color of the at least one suggested dynamic icon relative to the at least one secondary dynamic icon.

23. The apparatus of claim 19, wherein applying the visual bias to the at least one suggested dynamic icon comprises varying a shading of the at least one suggested dynamic icon relative to the at least one secondary dynamic icon.

24. The apparatus of claim 19, wherein applying the visual bias to the at least one suggested dynamic icon comprises varying a border of the at least one suggested dynamic icon relative to the at least one secondary dynamic icon.

25. The apparatus of claim 19, wherein the visual bias is temporary.

26. The apparatus of claim 25, further configured to remove the visual bias after a subsequent selection indication.

27. The apparatus of claim 19, wherein determining the visual bias comprises:
determining a relevancy score for each of the plurality of items, and
determining the visual bias for the at least one suggested dynamic icon based on the relevancy score for each for the plurality of items.

28. The apparatus of claim 27, wherein the relevancy score for each of the plurality of items is based on environmental data.

29. The apparatus of claim 28, wherein the environmental data comprises at least one of a time of day, time of year, weather, and location.

30. The apparatus of claim 27, wherein a suggested relevancy score for each of the at least one suggested items is greater than a secondary relevancy score for each of the at least one secondary items.

31. The apparatus of claim 27, wherein a suggested relevancy score for each of the at least one suggested items is greater than a predetermined threshold.

32. The apparatus of claim 27, further configured to:
determine a second visual bias for a second suggested dynamic icon relative to the at least one secondary dynamic icon; and
apply the second visual bias to the second suggested dynamic icon.

33. The apparatus of claim 19, wherein determining the at least one suggested item comprises:
accessing transaction data corresponding to each of the plurality of items, and
determining the at least one suggested item based on the transaction data.

34. The apparatus of claim 33, wherein determining the at least one suggested item further comprises:
accessing a selection rate for each item of the plurality of items, wherein the selection rate comprises a rate at which each item of the plurality of items is selected in a same transaction as the one item, wherein the at least one suggested item is determined based on the selection rate for each item of the plurality of items.

35. The apparatus of claim 33, wherein determining the at least one suggested item further comprises:
accessing a sequential selection rate for each item of the plurality of items, wherein the sequential selection rate comprises a rate at which each item of the plurality of items is selected following a selection of the one item, wherein the at least one suggested item is determined based on the sequential selection rate for each item of the plurality of items.

36. The apparatus of claim 33, wherein the at least one suggested item comprises:
a first suggested item and a second suggested item, such that a first visual bias is applied to a first dynamic icon representing the first suggested item and a second visual bias is applied to a second dynamic icon representing the second suggested item based on the transaction data for each of the plurality of items.

37. A computer program product is provided comprising a non-transitory computer readable medium having computer program instructions stored therein, said instructions when executed by a processor:
presenting, via an interface, a plurality of dynamic icons representing a plurality of items, wherein the plurality of dynamic icons comprises at least one suggested dynamic icon representing at least one suggested item of the plurality of items and at least one secondary dynamic icon representing a secondary item of the plurality of items; wherein the plurality of dynamic icons are configured to be selectable by a user;
receiving, by a processor, a selection indication of a dynamic icon associated with one item of the plurality of items;
determining, via the processor, the at least one suggested item of the plurality of items based on the selection indication, wherein the at least one suggested item is different than the one item, wherein determining the at least one suggested item comprises calculating a relevancy score for each item of the plurality of items relative to the one item, wherein the relevancy score for each item is based upon a selection rate of each item in a same transaction as a selection of the one item, and wherein a relevancy score of the at least one suggested item is greater than a threshold relevancy score;
determining a visual bias for the at least one suggested dynamic icon representing the at least one suggested item relative to the at least one secondary dynamic icon; and
applying the visual bias, via the interface, to the at least one suggested dynamic icon.

* * * * *

UNITED STATES PATENT AND TRADEMARK OFFICE
CERTIFICATE OF CORRECTION

PATENT NO. : 9,582,145 B2  
APPLICATION NO. : 14/230980  
DATED : February 28, 2017  
INVENTOR(S) : Gomez-Rosado et al.

Page 1 of 1

It is certified that error appears in the above-identified patent and that said Letters Patent is hereby corrected as shown below:

In the Claims

<u>Column 42,</u>
Line 57, "of plurality" should read --of the plurality--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*